United States Patent [19]

Ikegami et al.

[11] Patent Number: 4,835,735

[45] Date of Patent: May 30, 1989

[54] CARD IMAGE DATA PROCESSING SYSTEM

[75] Inventors: Yoshiki Ikegami, Inagi; Yoshio Hayakawa, Kawaguchi; Yasuaki Sato, Sagamihara, all of Japan

[73] Assignee: Fujitsu Limited, Kawasaki, Japan

[21] Appl. No.: 111,117

[22] Filed: Oct. 21, 1987

Related U.S. Application Data

[63] Continuation of Ser. No. 619,553, filed as PCT JP83/00337 on Oct. 11, 1983, published as WO84/01640 on Apr. 26, 1984

[30] Foreign Application Priority Data

| Oct. 11, 1982 | [JP] | Japan | 57-177801 |
| Oct. 11, 1982 | [JP] | Japan | 57-177802 |
| Oct. 11, 1982 | [JP] | Japan | 57-177810 |
| Oct. 11, 1982 | [JP] | Japan | 57-177811 |
| Oct. 11, 1982 | [JP] | Japan | 57-177812 |
| Oct. 11, 1982 | [JP] | Japan | 57-177814 |

[51] Int. Cl.[4] .............................. G06F 9/00
[52] U.S. Cl. .................................... 364/900
[58] Field of Search ... 364/200 MS File, 900 MS File; 364/712

[56] References Cited

U.S. PATENT DOCUMENTS

| 4,383,298 | 5/1983 | Huff et al. | 364/300 |
| 4,412,294 | 10/1983 | Watts et al. | 364/518 |
| 4,414,628 | 11/1983 | Ahuja et al. | 364/200 |
| 4,417,322 | 11/1983 | Berry et al. | 364/900 |
| 4,454,576 | 6/1984 | McInroy et al. | 364/200 |
| 4,459,678 | 7/1984 | McCaskill et al. | 364/900 |
| 4,481,603 | 11/1984 | McCaskill et al. | 364/900 |
| 4,484,302 | 11/1984 | Cason et al. | 364/900 |
| 4,506,343 | 3/1985 | Shipp, Jr. et al. | 364/900 |
| 4,574,364 | 3/1986 | Tabata et al. | 364/900 |
| 4,586,035 | 4/1986 | Baker et al. | 340/712 |

OTHER PUBLICATIONS

Larry Tesler, "The Small Talk Environment", Byte Magazine, vol. 6, No. 8, Aug. 1981, p. 90.

Primary Examiner—Gareth D. Shaw
Assistant Examiner—John Mills
Attorney, Agent, or Firm—Staas & Halsey

[57] ABSTRACT

In a card image data processing system wherein a plurality of card images are recognized as one box (2, 2'), the card images are defined by form data common to the box and card data written in fields is defined by field definition information which is of the form data, and the fields are designated for processing contents of the fields, i.e., card data; the card images, including the form data, is displayed in a first window (41, 42) of the display unit, fields of the displayed card images are designated and processing instructions for the card data prepared, and the processing instructions are displayed in an instruction window (43) of the display unit and registered in the instruction code buffer. Processing of the card data of the card images is executed based on the registered processing instructions.

19 Claims, 80 Drawing Sheets

Fig. 1

| CUSTOMER CARD | | YR MO DAY |
|---|---|---|
| | CUSTOMER NO. ⎯⎯⎯⎯⎯⎯ | |
| CUSTOMER'S NAME | . . . . . . . . . . . . . . . . . . . . | |
| ADDRESS | . . . . . . . . . . . . . . . . . . . .<br>. . . . . . . . . . . . . . . . . . . . | |
| PHONE | . . . . . . . . . . . . . . . . . . . . | |
| AGE | ⎯⎯⎯ | |
| NAME | . . . . . . . . . . . . . . . . . . . . | |

Fig. 2

DELIVERY OF GOODS

MESSERS. FUJITSU TRADING

| YR MO DAY | NAME |
|---|---|
| ] ] ] | . . |

| ARTICLE | QUANTITY | UNIT PRICE | AMOUNT |
|---|---|---|---|
| . . . . . . | ] ] ] ] ] ] ] ] ] ] ] ] ] ] ] ] ] ] | ] ] ] , ] ] ] ] ] ] , ] ] ] ] ] ] , ] ] ] ] ] ] , ] ] ] | ] ] ] , ] ] ] , ] ] ] ] ] ] , ] ] ] , ] ] ] ] ] ] , ] ] ] , ] ] ] ] ] ] , ] ] ] , ] ] ] |
| | | TOTAL | ] ] ] , ] ] ] , ] ] ] |

Fig. 4

```
─①BILL ─────────────────────────── P.0007 ─
              B I L L
    ADDRESS: KAMIODANAKA, KAWASAKI, KANAGAWA
    NAME   : TARO FUJITSU                        ⎫41
        PLEASE ACKNOWLEDGE THE FOLLOWING BILL
```

| PREVIOUS BILL | PAYMENT | CLAIMED PAYMENT |
|---|---|---|
| --,--- | --,--- | --,--- |

─②RECEIPT SLIP ─────────────────── P.0007 ─
              RECEIPT SLIP
              NAME: TARO FUJITSU

| MO | DUE | PAYMENT | CLAIMED PAYMENT |
|---|---|---|---|
| 1 | 5000 | 0 | 5000 |
| 2 | 5000 | 0 | 10000 |
| 3 |  |  |  |
| 4 |  |  |  |

②CLAIMED PAYMENT 2 = CLAIMED PAYMENT

Fig. 5A

| ARTICLE | QUANTITY | UNIT PRICE | TOTAL |
|---------|----------|------------|-------|
| MY OASIS | 100 | | |

③ RECEIPT SLIP
P. 0001

Fig. 5B

| ARTICLE | QUANTITY | UNIT PRICE | TOTAL |
|---------|----------|------------|-------|
| MY OASIS | 100 ■ | | |

③ RECEIPT SLIP
P. 0001

Fig. 5C

RECEIPT SLIP — P. 0001

| ARTICLE | QUANTITY | UNIT PRICE | TOTAL |
|---|---|---|---|
| MY OASIS | 100 ■ | | |

QUANTITY 01 X▶

RECEIPT SLIP — P. 0001

| ARTICLE | QUANTITY | UNIT PRICE | TOTAL |
|---|---|---|---|
| MY OASIS | 100 | ■ | |

QUANTITY 01 X▶

RECEIPT SLIP — P. 0001

| ARTICLE | QUANTITY | UNIT PRICE | TOTAL |
|---------|----------|------------|-------|
| MY OASIS | 100 | ■ | |

QUANTITY 01 X UNIT PRICE 01 = ◆

RECEIPT SLIP — P. 0001

| ARTICLE | QUANTITY | UNIT PRICE | TOTAL |
|---------|----------|------------|-------|
| MY OASIS | 100 | | |

QUANTITY 01 X UNIT PRICE 01 = ◘

| ARTICLE | QUANTITY | UNIT PRICE | TOTAL |
|---------|----------|------------|-------|
| MY OASIS | 100 | | |

③ RECEIPT SLIP — P. 0001

QUANTITY 01 X ■ UNIT PRICE 01 =

Fig. 5H

| ARTICLE | QUANTITY | UNIT PRICE | TOTAL |
|---------|----------|------------|-------|
| MY OASIS | 100 | | |

③ RECEIPT SLIP — P. 0001

QUANTITY 01 X ■

Fig. 5I

| ARTICLE | QUANTITY | UNIT PRICE | TOTAL |
|---------|----------|------------|-------|
| MY OASIS | 100 | | |

③RECEIPT SLIP  P. 0001

QUANTITY 01X▶

Fig. 6

```
─④ CUSTOMER CARD──────────────────────────── P. 0008─
                    CUSTOMER CARD
       NAME    : HANAKO FUJITSU
       SEX     : FEMALE
       AGE     : 28
       ADDRESS : JIYUGAOKA SETAGAYA TOKYO

─────────────────────────────────────────────────
   CARD RETRIEVAL
              [?SETAGAYA? ] = ADDRESS
        AND [ FEMALE     ] = SEX
        AND [ 20         ] ≦ AGE    < [ 30        ]
        AND [            ] =           [          ]
```

Fig. 7

```
─⑤ESTIMATE ─────────────────────── P.0001─
              ┌──────────┐
              │ ESTIMATE │
              └──────────┘
   MESSERS. · · · · · · · ·
   ┌──┬──┬──┬────────┐
   │YR│MO│DY│CUSTOMER│
   │  │  │  │CODE    │         ┌─────────┐
   ├──┼──┼──┼────────┤         │ESTIMATED│  __,___,___
   │__│__│__│ _____ │         │AMOUNT   │
   └──┴──┴──┴────────┘         └─────────┘

┌────┬──────────────┬──────┬──────────┬──────────────┐
   │ITEM│ ARTICLE      │QUANTI│UNIT PRICE│ AMOUNT       │
   │    │              │TY    │          │              │
   ├────┼──────────────┼──────┼──────────┼──────────────┤
   │  1 │· · · · · · · │_____ │__,___,___│__,___,___,___│
   │  2 │· · · · · · · │_____ │__,___,___│__,___,___,___│
   │  3 │· · · · · · · │_____ │__,___,___│__,___,___,___│
   │  4 │· · · · · · · │_____ │__,___,___│__,___,___,___│
   │  5 │· · · · · · · │_____ │__,___,___│__,___,___,___│
   │  6 │· · · · · · · │_____ │__,___,___│__,___,___,___│
   │  7 │· · · · · · · │_____ │__,___,___│__,___,___,___│
   │  8 │· · · · · · · │_____ │__,___,___│__,___,___,___│
   │  9 │· · · · · · · │_____ │__,___,___│__,___,___,___│
   │ 10 │· · · · · · · │_____ │__,___,___│__,___,___,___│
   └────┴──────────────┴──────┴──────────┴──────────────┘

01  CARD REPETITION  P.0001~P.0030
02  ROW REPETITION  ARTICLE 01    ~ARTICLE 10
03  QUANTITY 01 X UNIT PRICE 01 = AMOUNT 01
04  END OF ROW REPETITION
05  TOTAL(AMOUNT 01~ AMOUNT 10) = ESTIMATE
06  END OF CARD REPETITION
07
```

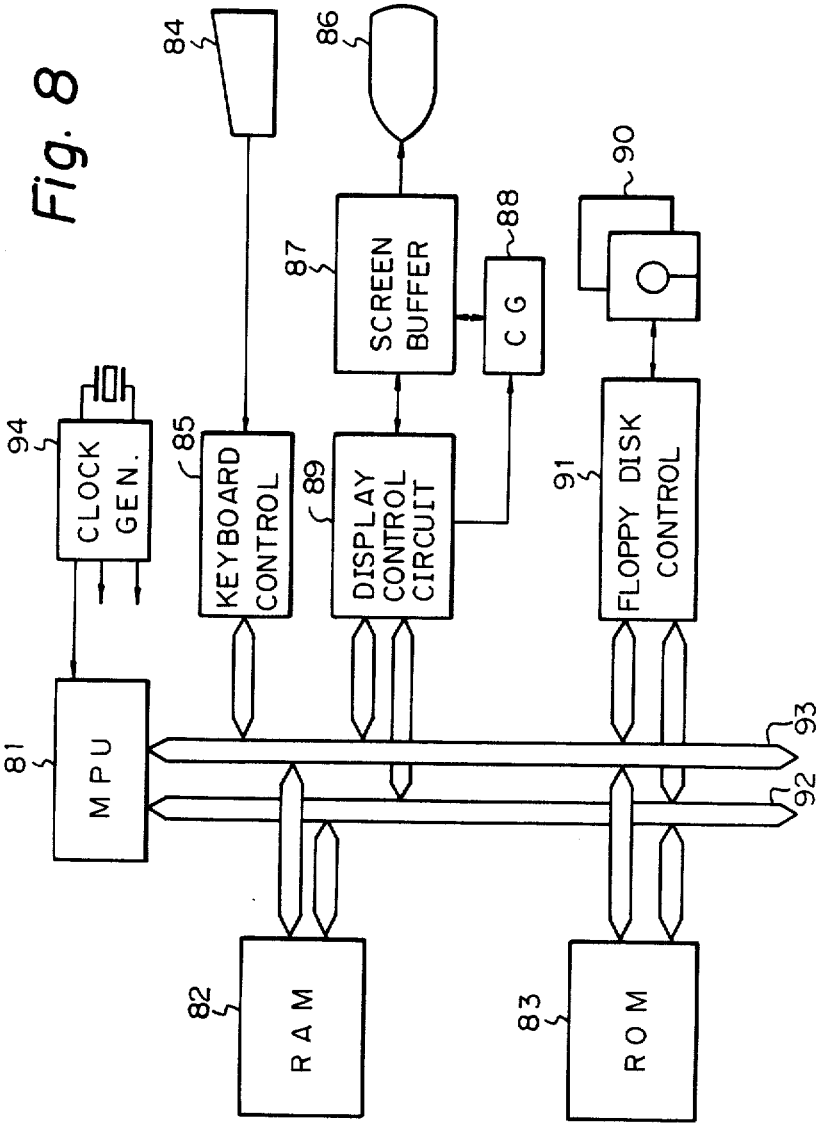

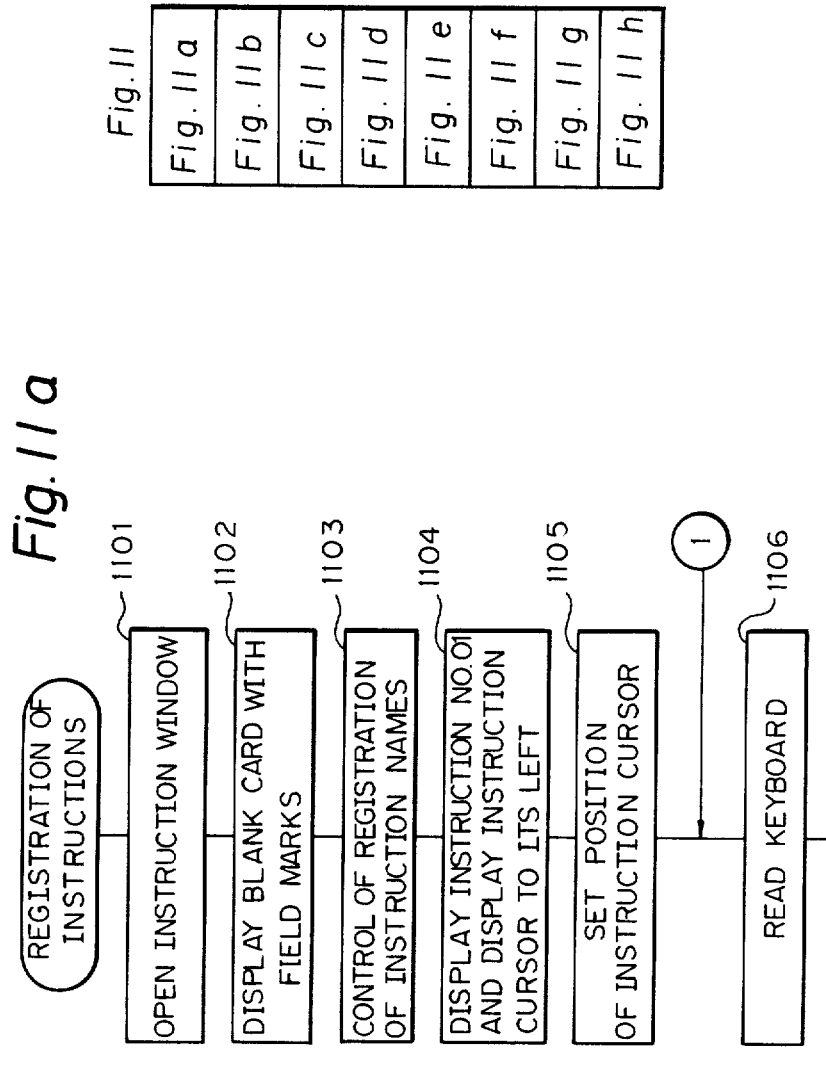

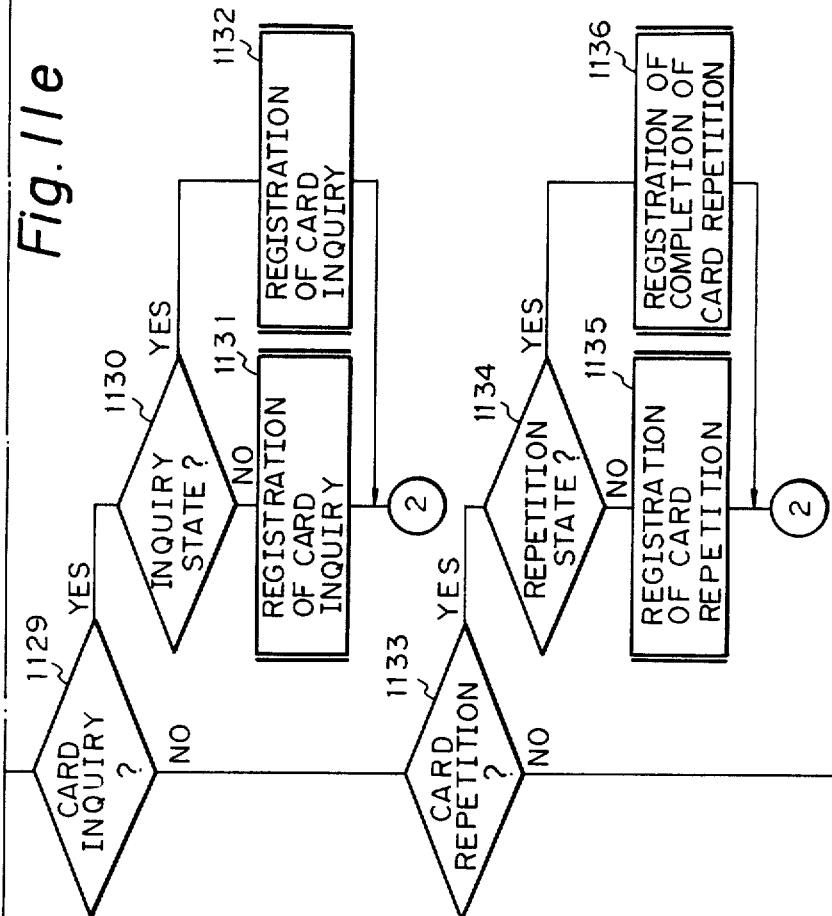

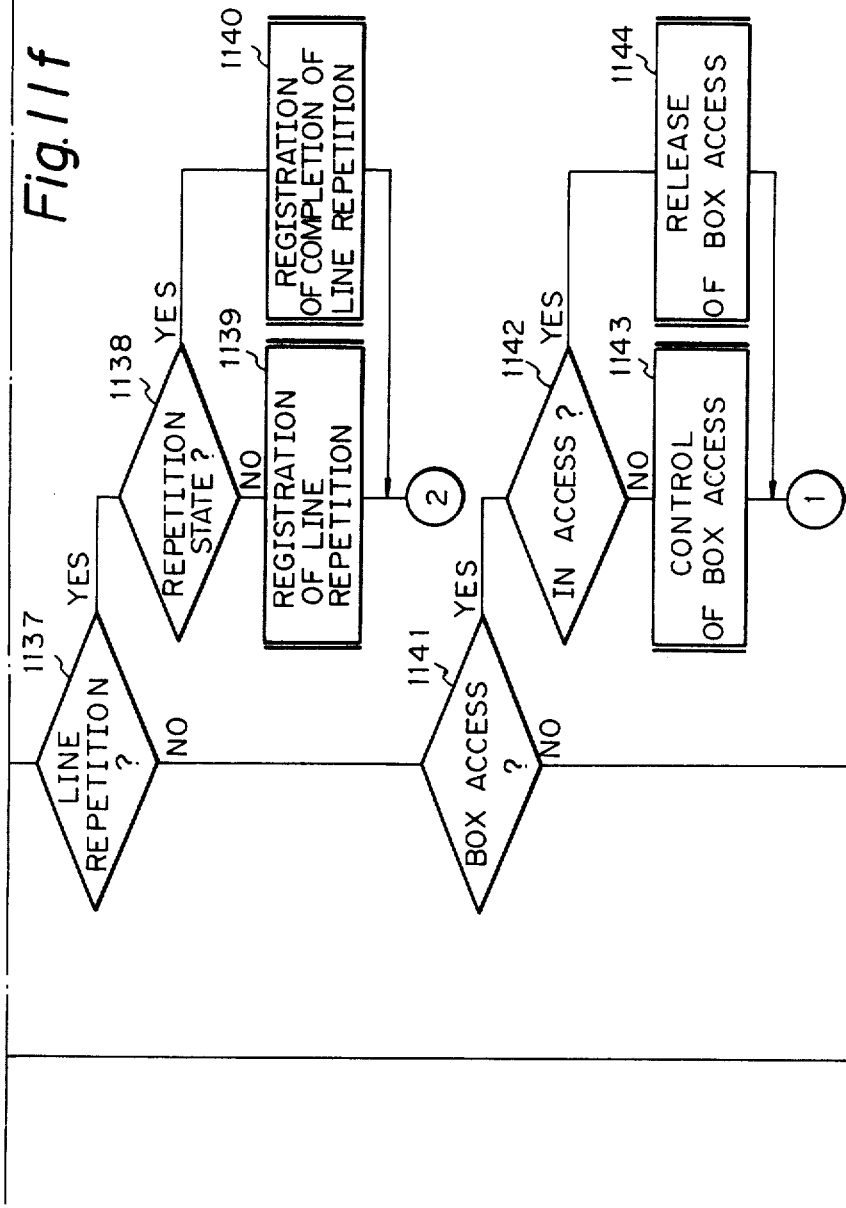

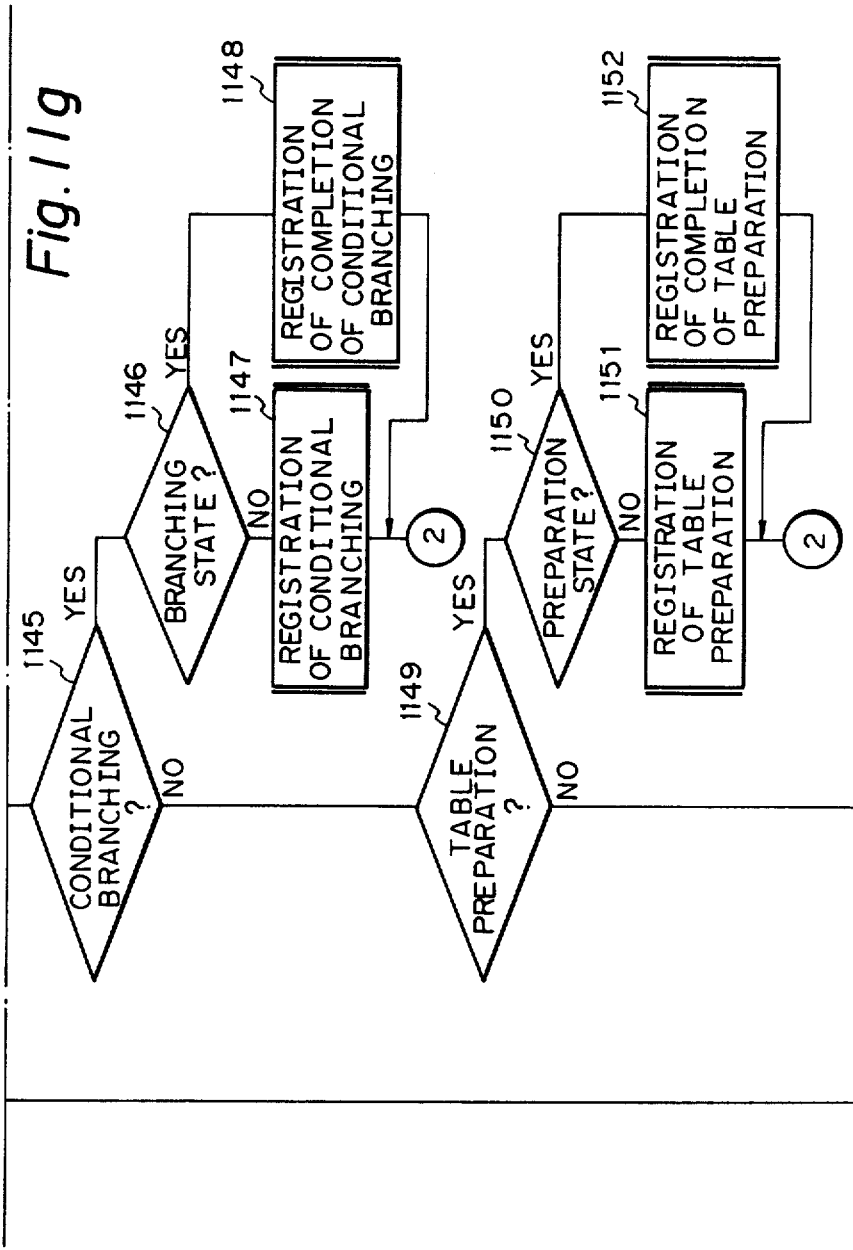

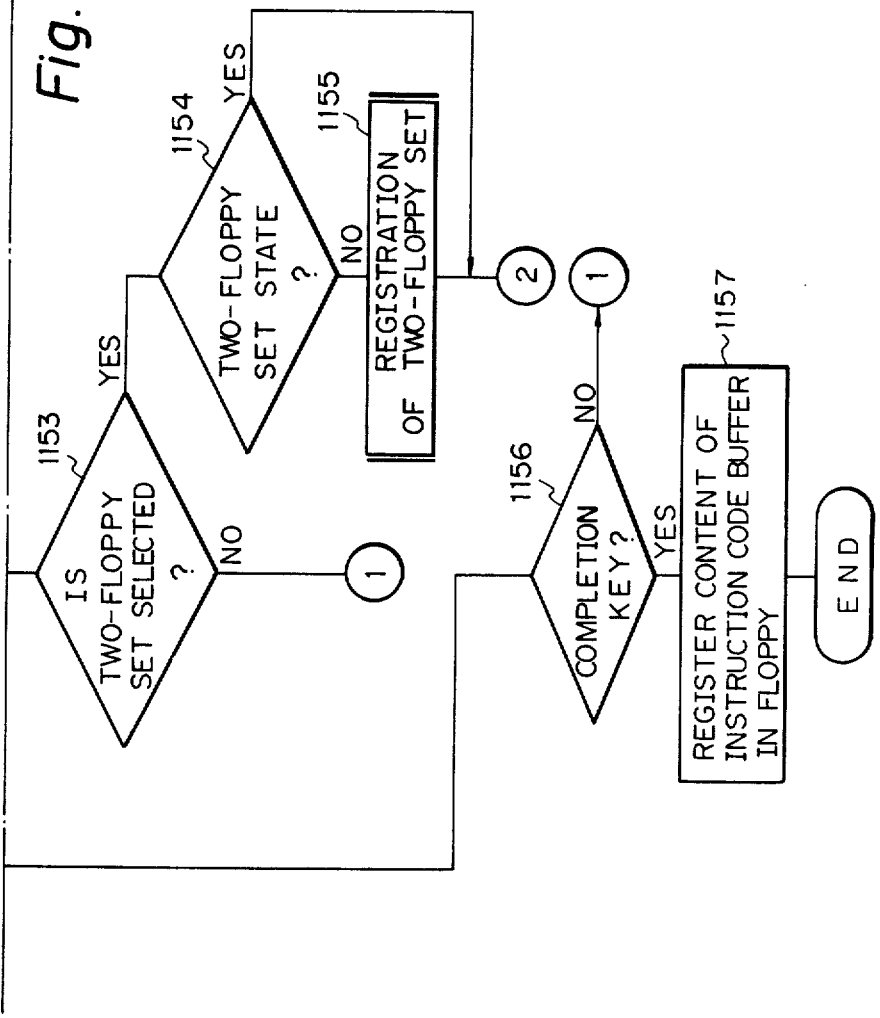

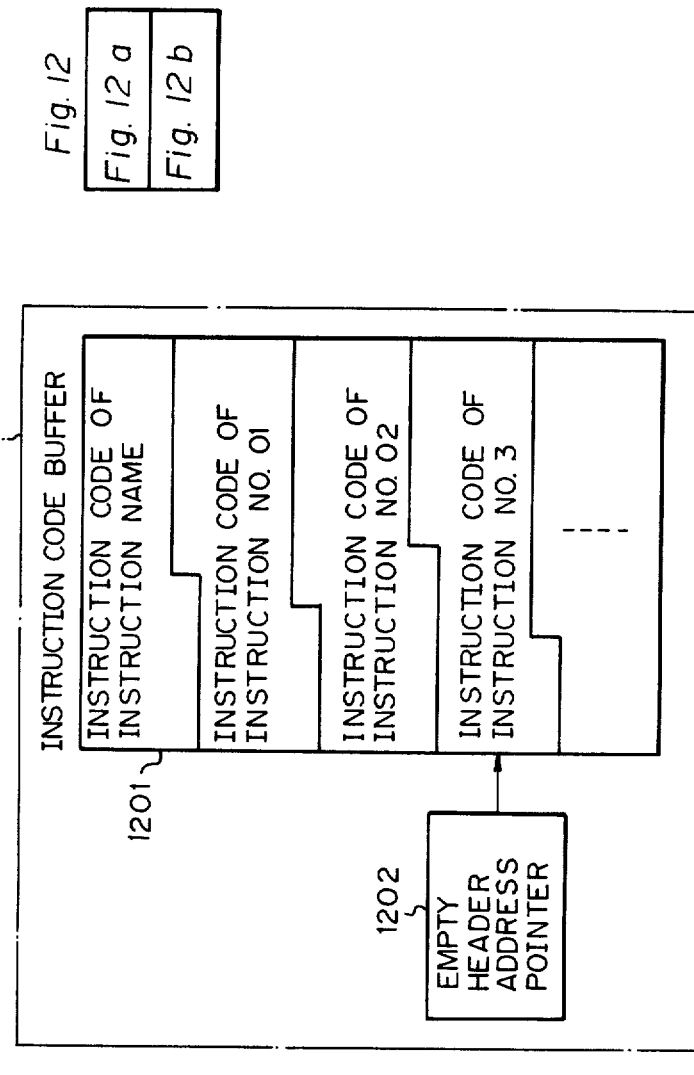

Fig. 13A CALCULATION

| ID | CODE LENGTH | FIELD NO. | BOX NO. | X | FIELD NO. | BOX NO. | = | --- |

Fig. 13B CARD RETRIEVAL

| ID | CODE LENGTH | 1st CONDITION | AND/OR | 2nd CONDITION | --- |

| RETRIEVAL FIELD NO. | BOX NO. | LEFT SIGN CODE | LEFT CONDITION | RIGHT SIGN CODE | RIGHT CONDITION |

Fig. 13C LINE RETRIEVAL

| ID | CODE LENGTH | FLAG DESIGNATING FULL PAGES OR PAGE UNDER PROCESSING | 1st CONDITION | AND/OR | 2nd CONDITION | AND/OR | --- |

| RETRIEVAL FIELD NO. | BOX NO. | LEFT SIGN CODE | LEFT CONDITION | RIGHT SIGN CODE | RIGHT CONDITION |

*Fig. 13D* CARD INQUIRY

| ID | MAIN BOX NO. | MAIN FIELD NO. | SUB BOX NO. | SUB FIELD NO. |
|---|---|---|---|---|

*Fig. 13E* CARD REPETITION

| ID | BOX NO. | START PAGE | END PAGE |
|---|---|---|---|

*Fig. 13F* LINE REPETITION

| ID | BOX NO. | START LINE NO. | END LINE NO. |
|---|---|---|---|

*Fig. 13G* CONDITION BRANCHING

| ID | CODE LENGTH | RETRIEVAL FIELD NO. | BOX NO | LEFT SIGN CODE | LEFT CONDITION | RIGHT SIGN CODE | RIGHT CONDITION |
|---|---|---|---|---|---|---|---|

*Fig. 13H* TABLE PREPARATION

| ID | CODE LENGTH | TABLE-SIDE BOX NO. | CARD-SIDE BOX NO. | =1 WITH GROUP =0 WITHOUT GROUP | GROUP FIELD NO. |
|---|---|---|---|---|---|

Fig. 15

FIELD NAME TABLE

| | |
|---|---|
| INDEPENDENT FIELDS | NAME OF FIELD 1 |
| | NAME OF FIELD 2 |
| | NAME OF FIELD 3 |
| | ⋮ |
| | NAME OF FIELD 10 |
| REPETITION FIELDS | NAME OF 1st REPETITION FIELD |
| | NAME OF 2nd REPETITION FIELD |
| | NAME OF 3rd REPETITION FIELD |
| | |
| | NAME OF 10th REPETITION FIELD |

Fig. 20(A)

| 1 | 2 | 3 | 4 | 5 |
|---|---|---|---|---|
| BOX ACCESS | CARD RETRIEVAL | LINE RETRIEVAL | CARD INQUIRY | FLOPPY REPLACEMENT |

Fig 20(B)

| 1 | 2 | 3 | 5 |
|---|---|---|---|
| BOX ACCESS | CARD RETRIEVAL | LINE RETRIEVAL | FLOPPY REPLACEMENT |

Fig. 21

| CURRENT STATE \ SELECTION | BOX ACCESS | CARD RETRIEVAL | LINE RETRIEVAL | CARD INQUIRY | FLOPPY REPLACEMENT | TABLE PREPARATION | CARD REPETITION | LINE REPETITION | CONDITIONAL BRANCHING | ... |
|---|---|---|---|---|---|---|---|---|---|---|
| NO-BOX ACCESS | ○ | ○ | ○ | × | ○ | × | ○ | ○ | ○ | |
| BOX ACCESS | × | ○ | ○ | ○ | ○ | ○ | ○ | ○ | ○ | |
| CARD RETRIEVAL | × | ◆ | ○ | ▽ | × | ▽ | ○ | ○ | ○ | |
| LINE RETRIEVAL | × | × | × | × | × | × | × | × | ○ | |
| CARD INQUIRY | × | × | × | × | × | × | ○ | ○ | ○ | |
| TABLE PREPARATION | × | × | × | × | × | × | × | × | ○ | |
| CARD REPETITION | × | ▽◆ | ▽◆ | ▽ | × | × | × | ○ | ○ | |
| LINE REPETITION | × | ◆ | ◆ | × | × | × | × | × | ○ | |
| CONDITIONAL BRANCHING | × | × | × | × | × | × | × | × | × | |

○: POSSIBLE ON BOTH BOXES
◇: POSSIBLE ON BOX ONLY UNDER PROCESSING
◆: POSSIBLE ON BOX NOT UNDER PROCESSING
×: IMPOSSIBLE
▽: POSSIBLE WITH CONTROL

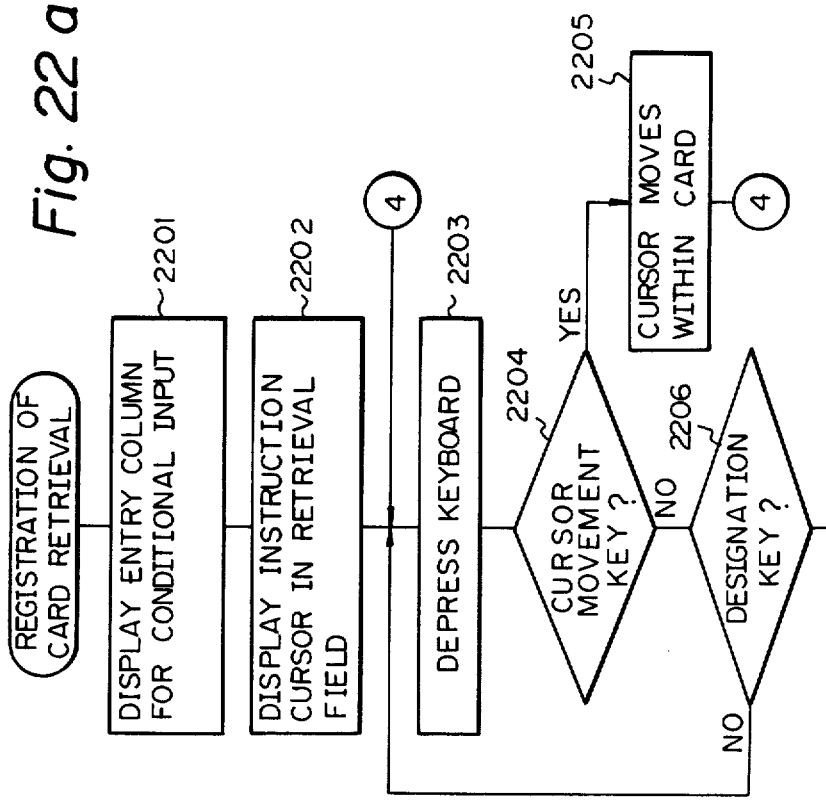

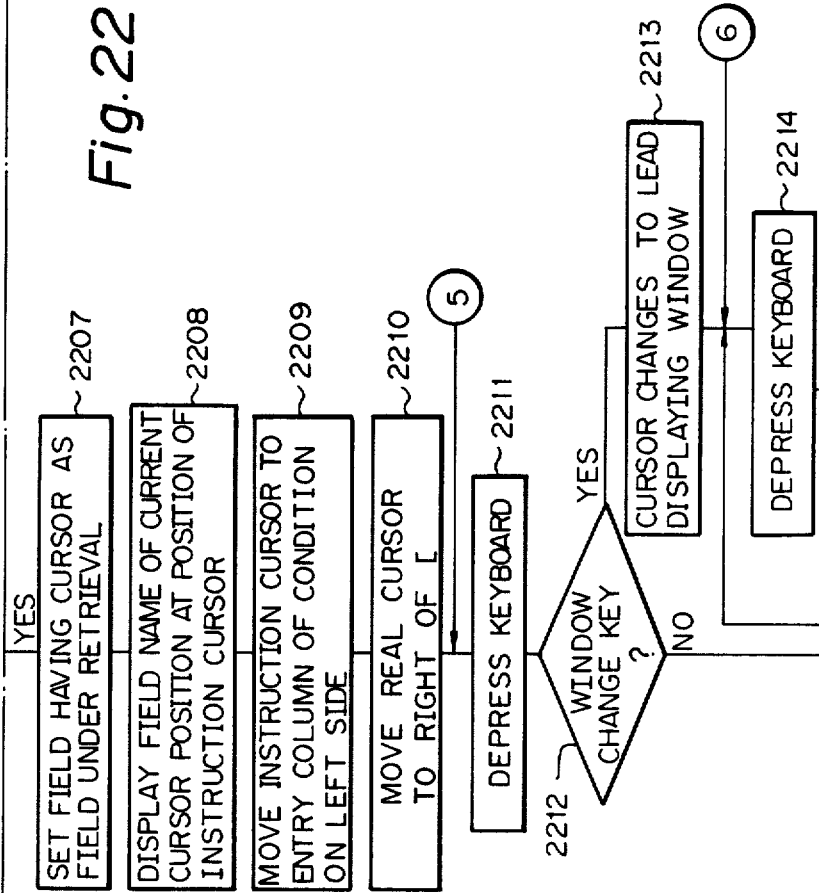

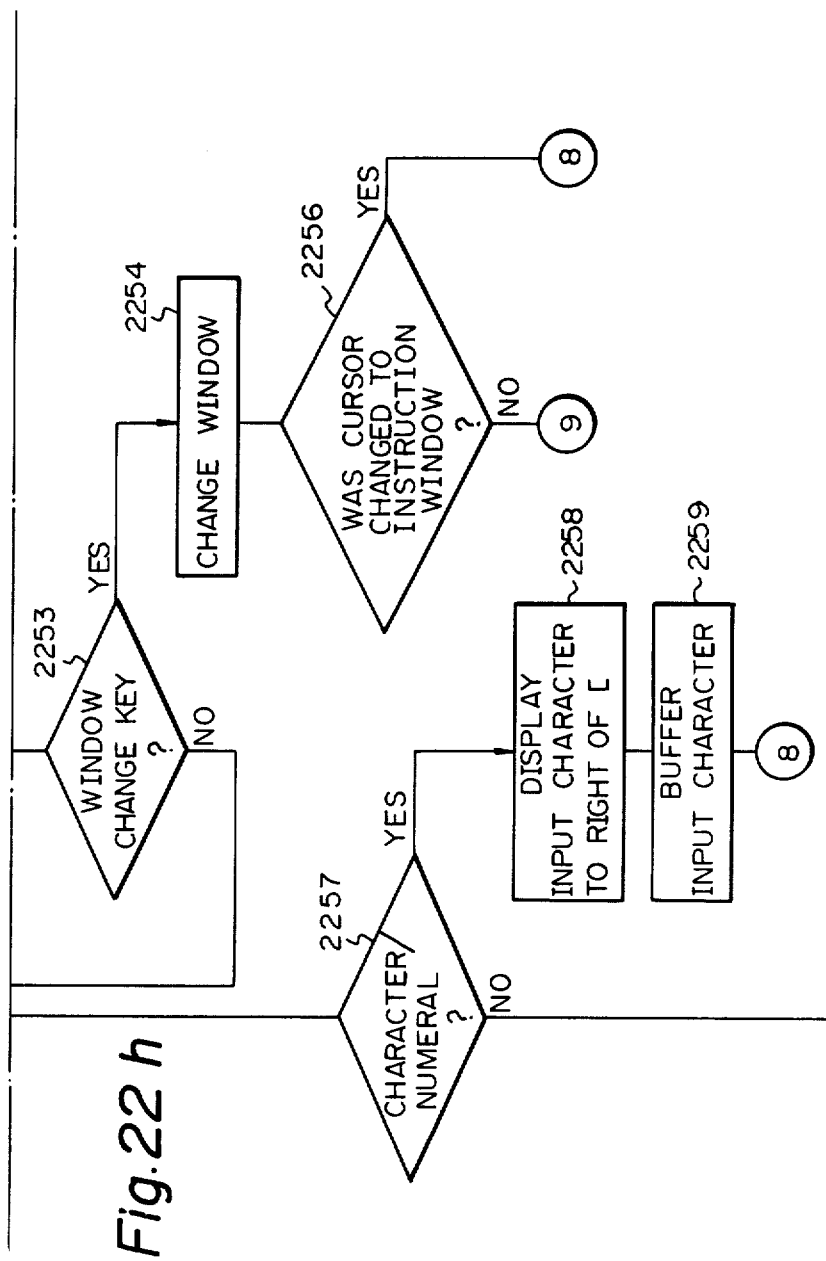

Fig. 23

```
CARD RETRIEVAL
     [              ] = ▶      [          ]
  AND[              ] =        [          ]
  AND[              ] =        [          ]
  AND[              ] =        [          ]
```

Fig. 25

```
─ ⑥ PERSONNEL CARD ──────────────────
              PERSONNEL CARD

| YR MO DY      | EMPLOYEE       |                    |
|               | NO.            |                    |
| NAME          |                | DATE OF            |
|               |                | BIRTH              |
| BELONG        |                | SEC.               |
| TO            |                | CODE               |
| ENTRY         |                                     |
| YR            |                                     |
| CAREER ·      |                                     |
                                                       ⎬ 41

─ ⑦ JOB CARD ────────────────────────
                 JOB CARD

| SEC. CODE  ★  | SEC NAME ★                         |
| DIV.          |                | EMPLOYEE           |
| DIRECTOR      |                | NO.              ■ |
| SEC.          |                | EMPLOYEE           |
| DIRECTOR      |                | NO.                |
| AFFAIRS       |                                     |
|               |                                     |
                                                       ⎬ 42

CARD INQUIRY      = ▶
                                                       ⎬ 43
```

Fig. 28

```
05  CONDITION [100,000] < ESTIMATE
06  ESTIMATE X 0.95 = ESTIMATE
07  COMPLETION OF CONDITION
```

| CUSTOMER TABLE | |
|---|---|
| NAME | ADDRESS |
| AIKO ELECTRIC(CO.) | TOSHIMA, TOKYO ..... |
| IKEGAMI INDUSTRY (CO.) | ICHIKAWA, CHIBA |
| . . . | |
| . . | |
| . . . | |

Fig. 31

⑧ CUSTOMER TABLE

CUSTOMER TABLE

| NAME | ADDRESS |
|------|---------|
| . . . . . . . . | . . . . . . . . . . . . . . . . . . . . . . . . . . . . |
| . . . . . . . . | . . . . . . . . . . . . . . . . . . . . . . . . . . . . |
| . . . . . . . . | . . . . . . . . . . . . . . . . . . . . . . . . . . . . |
| . . . . . . . . | . . . . . . . . . . . . . . . . . . . . . . . . . . . . |
| . . . . . . . . | . . . . . . . . . . . . . . . . . . . . . . . . . . . . |
| . . . . . . . . | . . . . . . . . . . . . . . . . . . . . . . . . . . . . |

41

⑨ CUSTOMER CARD

| CUSTOMER CARD | CUSTOMER NO. | . . . . . . |
|---|---|---|
| NAME | . . . . . . . . . . . . . . . . . . . . . . . . . . . . | |
| ADDRESS | . . . . . . . . . . . . . . . . . . . . . . . . . . . . | |
|  | . . . . . . . . . . . . . . . . . . . . . . . . . . . . | |
| AFFAIRS | . . . . . . . . . . . . . . . . . . . . . . . . . . . . | |
| REPRESENTATIVE | . . . . . . . . . . . . . . . . . . . . . . . . . . | |

42

```
01  TABLE PREPARATION
02  COPY ⑨ NAME = NAME 01
03  COPY ⑨ ADDRESS = ADDRESS 01
04  COMPLETION OF TABLE PREPARATION
```

43

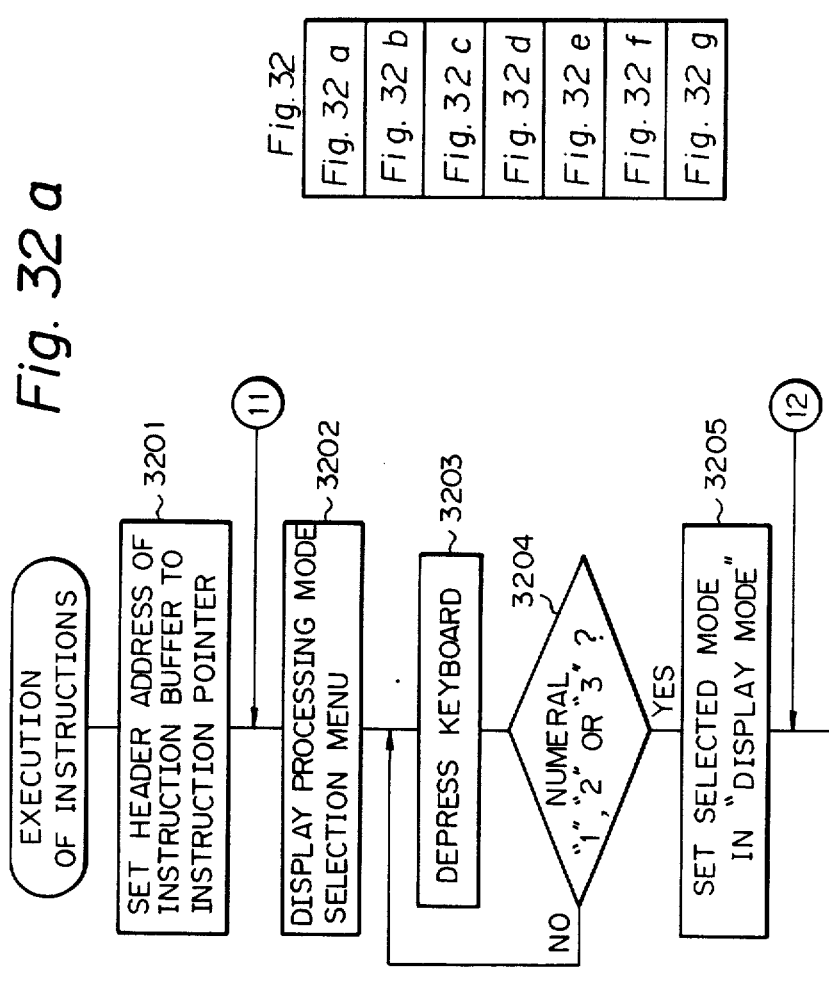

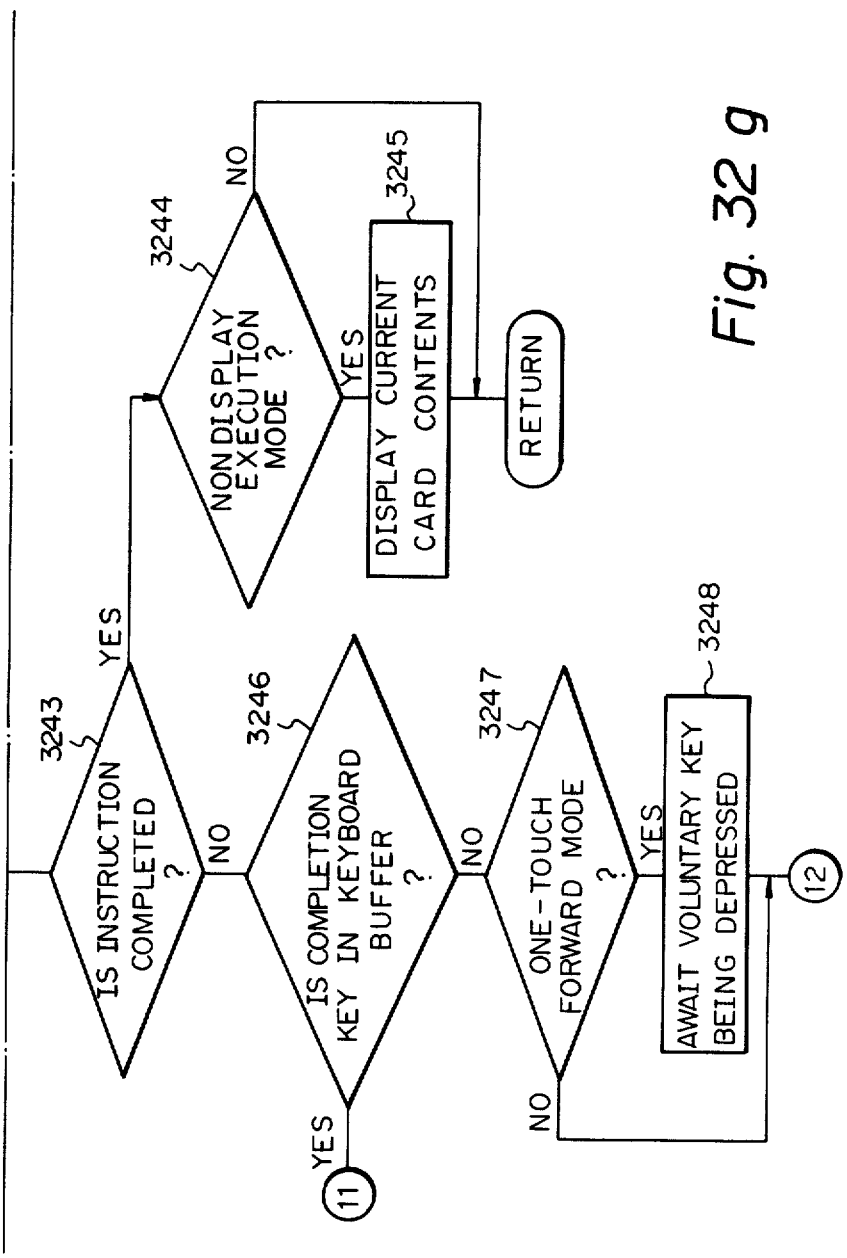

Fig. 33
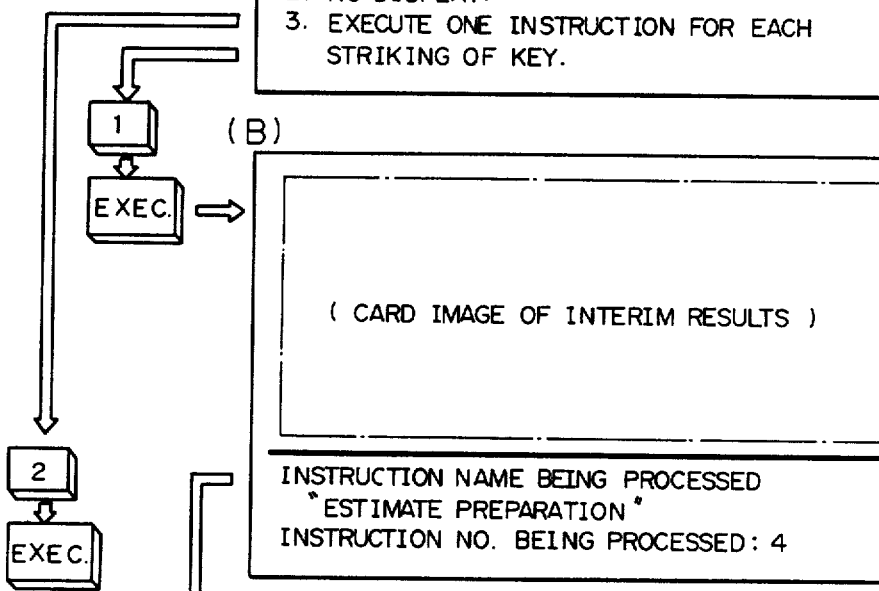
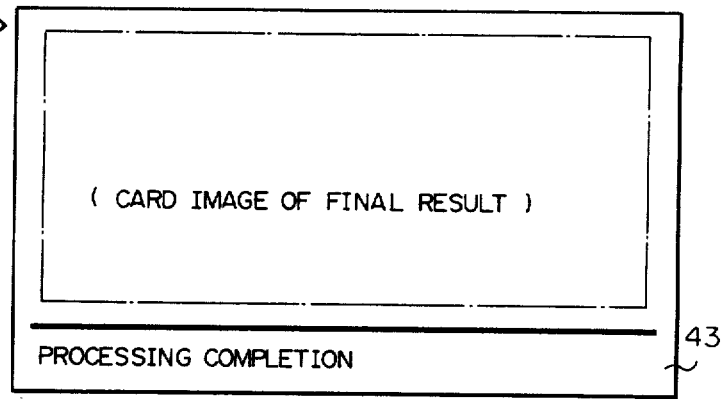

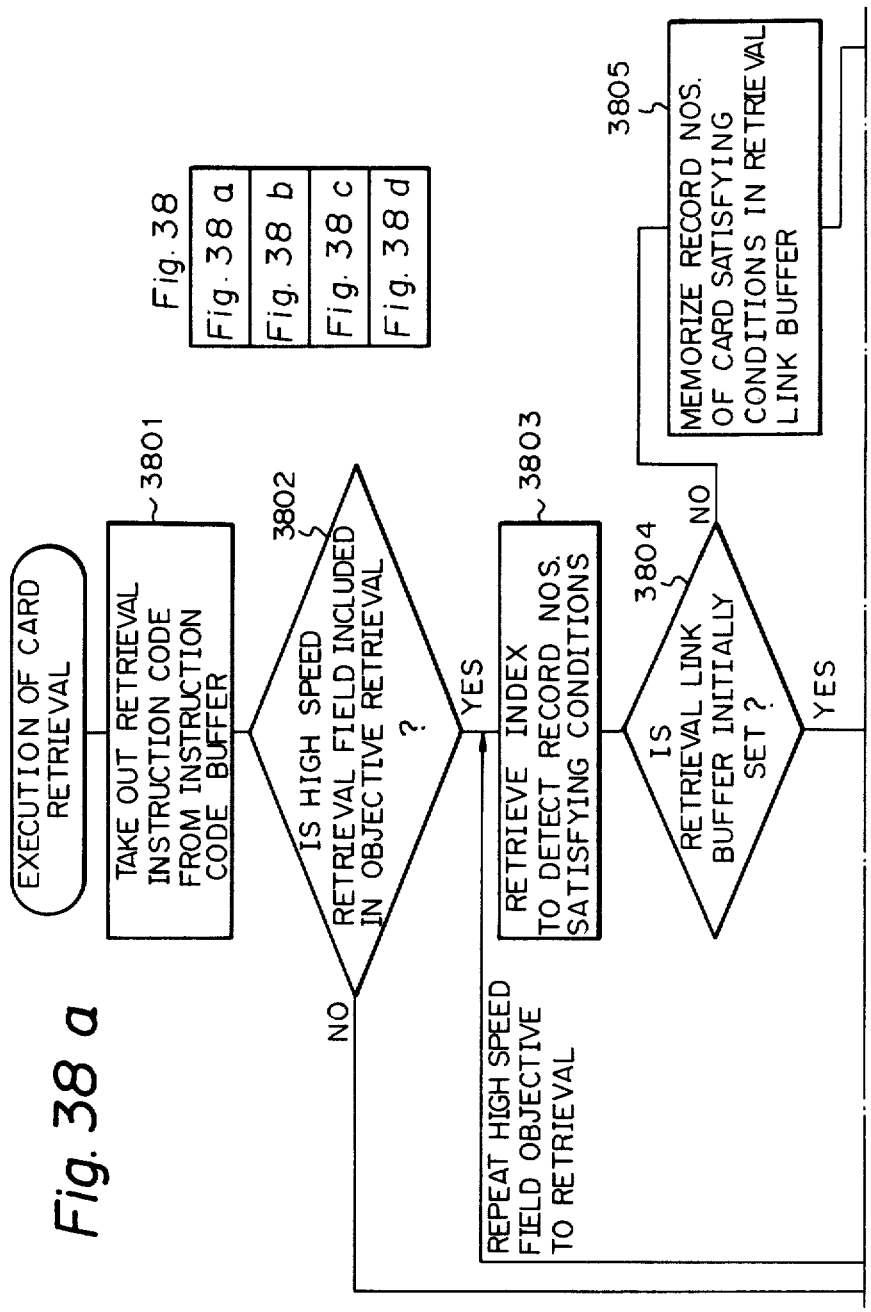

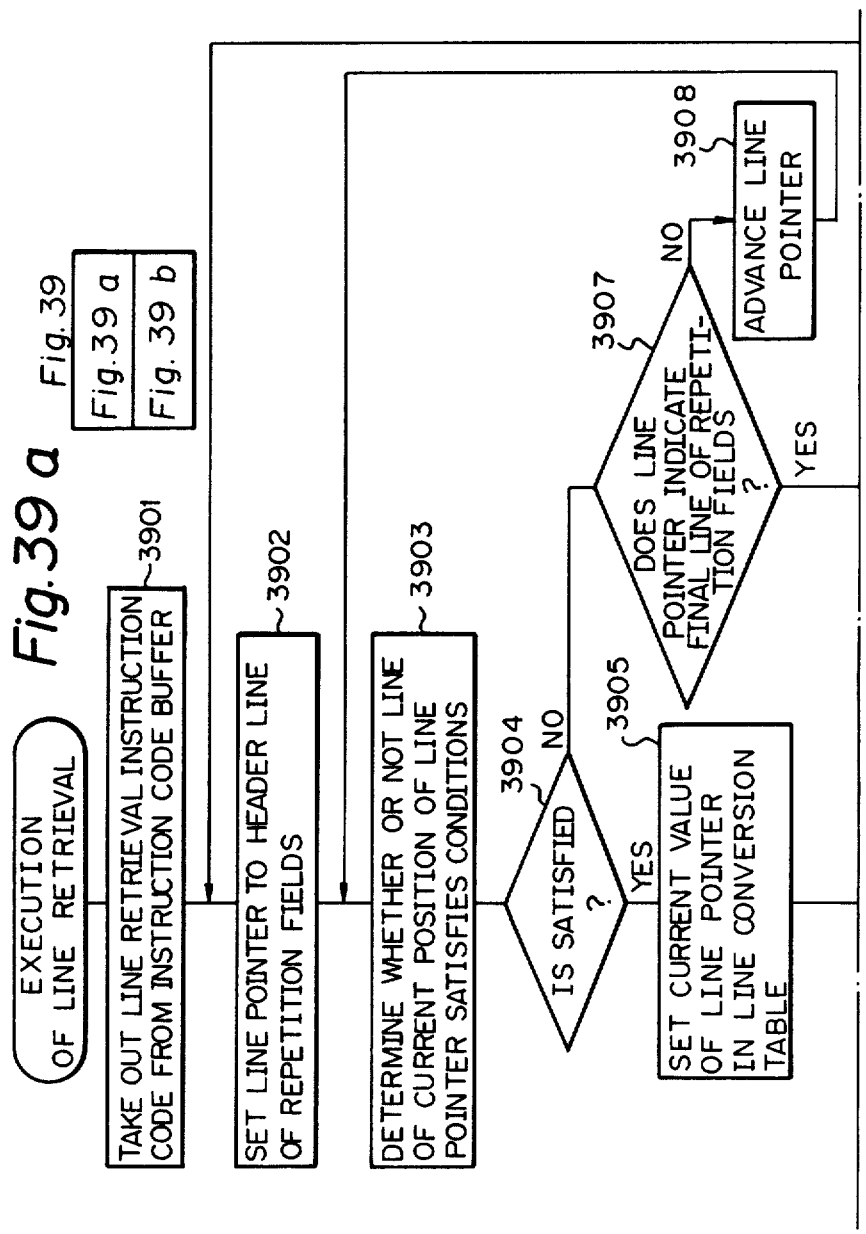

CARD IMAGE DATA PROCESSING SYSTEM

This is a continuation of co-pending application Ser. No. 619,553 filed as PCT JP83/00337 on Oct. 11, 1983, published as WO84/01640 on Apr. 26, 1984, now abandoned.

BACKGROUND OF THE INVENTION

The present invention relates to a card image data processing system, more particularly to a card image data processing system displaying card images incorporating the "box" or file concept on a display unit and performing calculation and other processing on the contents of the fields on said card images.

In usual office work, office workers store information in physical card systems. That is, they write the information onto index or similar cards and store the cards in filing boxes.

Recently, however, the development of word processing has made possible electronic card systems. In such systems, information is stored in a floppy disk or other memory media as an image of the original card, thereby making the above-mentioned physical file boxes unnecessary and enhancing office efficiency. In such a system, card images are displayed on a display unit and information is added thereon.

Card images or records are comprised of form data common for a plurality of card images, i.e., blank form data, and card data for each individual card image. A plurality of card images having a common set of form data is treated as a box or file similar to an index card box containing, for example, index cards of all purchasers of 8k RAMS. Therefore, the boxes stored in a floppy disk, etc. comprises as basic constitutional elements a single set of form data and a plurality of sets of card data.

In processing the above-mentioned card images, the practice is to designate specific contents of fields (items) on an individual card image and then perform the processing. Since there may be a large number of card images, however, it is desirable that the processing instructions not have to be given for each card image, but a series of processing instructions can be prepared beforehand and common processing can be successively executed for card images at a high speed.

SUMMARY OF THE INVENTION

An object of the present invention is to provide a card image data processing system able to successively execute common processing on card images at a high speed.

According to the present invention, card images, including form data, are displayed on a single window of a display unit. From the display the fields of the displayed card images are designated, and making thereby producing instructions for the card data; and the processing instructions are displayed in an instruction window of the display unit and registered in a instruction code buffer. Processing of the card data of the card images is executed based on the registered processing instructions.

BRIEF DESCRIPTION OF THE DRAWINGS

The present invention will be further understood from the following description, made in reference to the attached drawings.

FIG. 1 and FIG. 2 show examples of card images as in the present invention.

FIG. 4 shows an example of a display screen as in the present invention.

FIGS. 5A to 5I are views of a display screen showing an example of the registration and correction of calculation processing instructions as in the present invention.

FIG. 6 is a display screen showing one step of the registration of retrieval processing as in the present invention.

FIG. 7 is a view of a display screen showing one step of the entry of card repetition processing data and line repetition processing data as in the present invention.

FIG. 8 is a block circuit diagram of a card image data processing system as in the present invention.

FIGS. 13A to 13H are views showing the data format of an instruction code buffer 1201 of FIG. 12.

FIG. 15 shows an example of a field name table.

FIGS. 20A and B show a menu display explained at step 1902 of FIG. 19.

FIG. 21 shows a table of valid processing conditions used in step 1902 of FIG. 19.

FIG. 23 shows an example of a display screen used at step 2201 of FIG. 22.

FIG. 25 shows an example of a display screen used in step 2401 of FIG. 24.

FIG. 28 shows one example of a display screen used in registration step 1147 of conditional branching of FIG. 11.

FIG. 31 shows an example of a display screen used in the flowchart of FIG. 29.

FIG. 33, including (A)–(C), shows display screens for explaining steps 3202, 3103, and 3104 of FIG. 32.

DETAILED DESCRIPTION OF THE PREFERRED EMBODIMENT

In the present invention, cards having predetermined card formats are stored in a card image data processing system as card images. That is, a card image shows the information that would be present on an index card if a physical index card system is used for storage of information on, for example, various types of customers. Each card image is a record. For processing, the card images are shown on a display. Each card image consists of separately stored form data as shown in FIG. 1 and FIG. 2 and field contents (card data) corresponding to fields (items within the record), such as "CUSTOMER'S NAME", on the card image. The two sets of data are merged and shown on the display when needed. A displayed card or a related group of data or a single record image is treated as a single real card.

The form data comprises, for example, the heading "CUSTOMER CARD" and the field names "CUSTOMER NO.", "CUSTOMER'S NAME", "ADDRESS", "PHONE", "AGE", etc. in FIG. 1.

The fields on the card images may be character fields or numeric fields. In the form data are provided "... ... ..." corresponding to character fields and showing places for insertion of characters and "⊔⊔⊔ , ⊔⊔⊔" corresponding to numeric fields and showing places for insertion of numerals.

Figure 3:
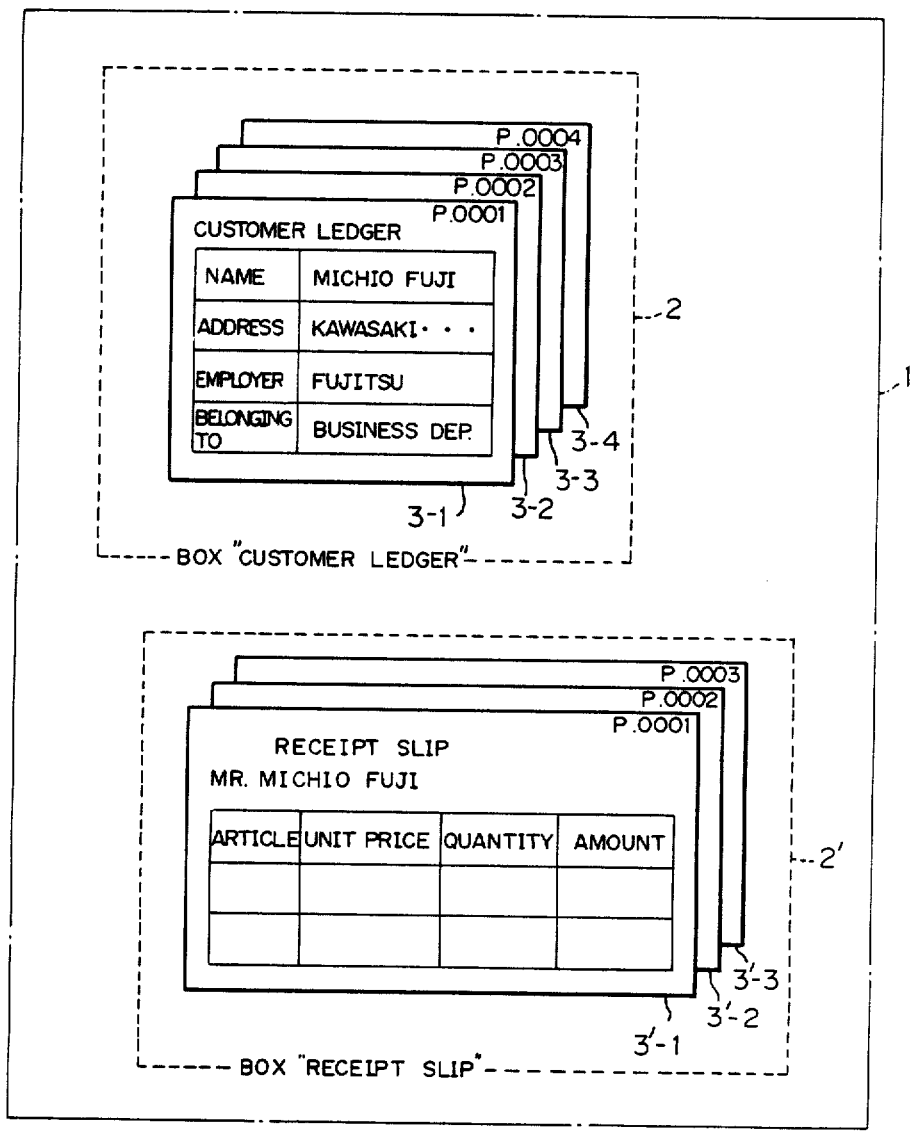
FIG. 3 shows examples of boxes as in the present invention.

Generally, there are a large number of card images having common form data as shown in FIG. 1 and FIG. 2. Therefore, these card images are assembled together for the use of a "box" concept. A box of images is similar to an index card box where electronic images are substituted for physical cards. A box is sometimes called a file. FIG. 3 shows an example of a box in the present invention. In FIG. 3, reference numeral 1 is a floppy disk; 2 and 2' boxes; and 3—1, 3—2, . . . , 3'—1, and 3'—2 card images. To process a group of card images as a single box, the following table (or memory unit) is provided.

(i) Box profile table ... ... Stores box number, box name, number of cards, etc.

(ii) Form data table ... ... Stores data corresponding to card form (blank card) as shown in FIG. 1, FIG. 2, and FIG. 3.

(iii) Field definition information table ... ... Stores field start coordinates, attributes, for example, with numeric fields, the presence or absence of commas, the places below the decimal point, etc.

(iv) Field name table ... ... Stores the names of the individual fields.

(v) Card data table ... ... Stores the card data written in the fields of the individual card images belonging to any one box with corresponding pages.

FIGS. 4 shows an example of a display screen in the present invention. On the screen of the display are shown a card image in a first window, a card image in a second window, and an input image for inputting processing instructions, etc. All or part of the card image for a Mr. "TARO FUJITSU", corresponding to page 7 in the box "BILL" is shown in the first window 41, while all or part of the card image for Mr. "TARO FUJITSU", corresponding to page 7 in the box "RECEIPT" is shown in the second window 42. This type of display is known as a split display. The instruction window showing the input image is then shown. This display indicates a transfer of the contents of the second line of the "CLAIMED PAYMENT" field on the card image in the second window to the "CLAIMED PAYMENT" field on the card image in the first window.

In the present invention, an operator can successively prepare and register or store contents such as in the input image. By depressing the execution key, actual processing can be executed at a high speed based on the contents registered as the processing instructions in a form corresponding to the input image.

FIGS. 5A to 5I show the registration (creation and storage) and correction of calculation processing instructions as in the present invention. More specifically, FIGS. 5A to 5E show the registration of a calculation equation, while FIGS. 5F to 5I show the correction of the same. Now, the "■" represents a real cursor or field designation cursor (also simply referred to as "cursor"), which can move in each window and within the instruction window 43, while "▶" represents an instruction cursor, which can move only within the instruction window 43.

In FIG. 5A, the instruction cursor is positioned at the first line of the instruction window 43. In FIG. 5B, the cursor is displayed in the window 42 by switching or moving the real cursor into an active window. Here, "active window" is a window in which the cursor is positioned and for whose fields processing is possible. Now, if the operator key "x" is depressed, both the name of the field in which the cursor is positioned, i.e., "QUANTITY", and the "x" are displayed in the instruction window 43, as shown in FIG. 5C, and the instruction cursor moves to a position directly thereafter. Here, "01" indicates the first line of a repetition gfield, such as shown in FIG. 2. Next, in FIG. 5D, the cursor advances to the next field. If the operator key "=" is depressed, "UNIT PRICE 01 =" is displayed on the window 43 of the input image, as shown in FIG. 5E.

Next, assume that "UNIT PRICE =" was erroneously input when depressing the "=" key. In such a case, to delete the same, first the window change key is depressed. As a result of this, as shown in FIG. 5F, the real cursor is superimposed over the instruction cursor and a double mark appears. FIG. 5G shows the state after the double mark is moved to the position desired to be deleted. FIG. 5 H shows the state after the deletion key is depressed twice while in the state of FIG. 5G. If the window change key is depressed after making this deletion, the real cursor and the instruction cursor are separated, as shown in FIG. 5I. The operator can therefore move the real cursor to any desired field and prepare processing instructions.

The real cursor is managed separately for the first window and the second window and shows the field on which processing is to be executed in individual card images. The instruction cursor indicates the input position in the input image.

Further, while an illustration is omitted, when desiring to process a card image shown in the first window, one can designate the same by the window change key so as to have the real cursor displayed on only the card image of the first window and the real cursor erased from the card image of the second window. Still further, the individual card images of the first window and second window can be independently scrolled. The individual sizes of the first window and the second window can also be increased or reduced as needed. At such a time, the size of the other frame can be reduced or increased accordingly.

FIG. 6 shows one step of the registration of retrieval processing or storage of a retrieval processing instruction. As a result of retrieval processing in accordance with processing instructions, a single card image is displayed. The illustrated retrieval designates retrieval of (i) "SETAGAYA WARD" addresses, (ii) the "FEMALE" sex, and (iii) "20 TO 30" age.

In addition to the above retrieval, etc., as explained later, sort processing, card inquiry processing, and the like are also possible.

FIG. 7 shows one step of or creation and storage of instruction for the registration of card repetition processing and line repetition processing as in the present invention. The same processing is executed on a plurality of fields on a plurality of cards. In this case, a command is given for the processing

QUANTITY × UNIT PRICE = AMOUNT to be performed for page 1 to page 30 of the card images from article 1 to article 10 to obtain the individual totals therefrom.

FIG. 8 is a block circuit diagram of a card image data processing system as in the present invention. In FIG. 8, reference numeral 81 is a microprocessor unit (MPU), 82 is a RAM for temporarily holding data, 83 is a read-only memory (ROM) for holding programs, constants, etc., 84 is a keyboard, 85 is a keyboard control circuit, 86 is a display unit (36 lines × 48 columns), 87 is a screen buffer housed in the display unit 86, 88 is a character generator, 89 is a display control unit, 90 is a floppy disk, 91 is a floppy disk control circuit, 92 is an address bus, 93 is a data bus, and 94 is a clock generating circuit for supplying a clock signal to the MPU 81, etc.

Figure 9:
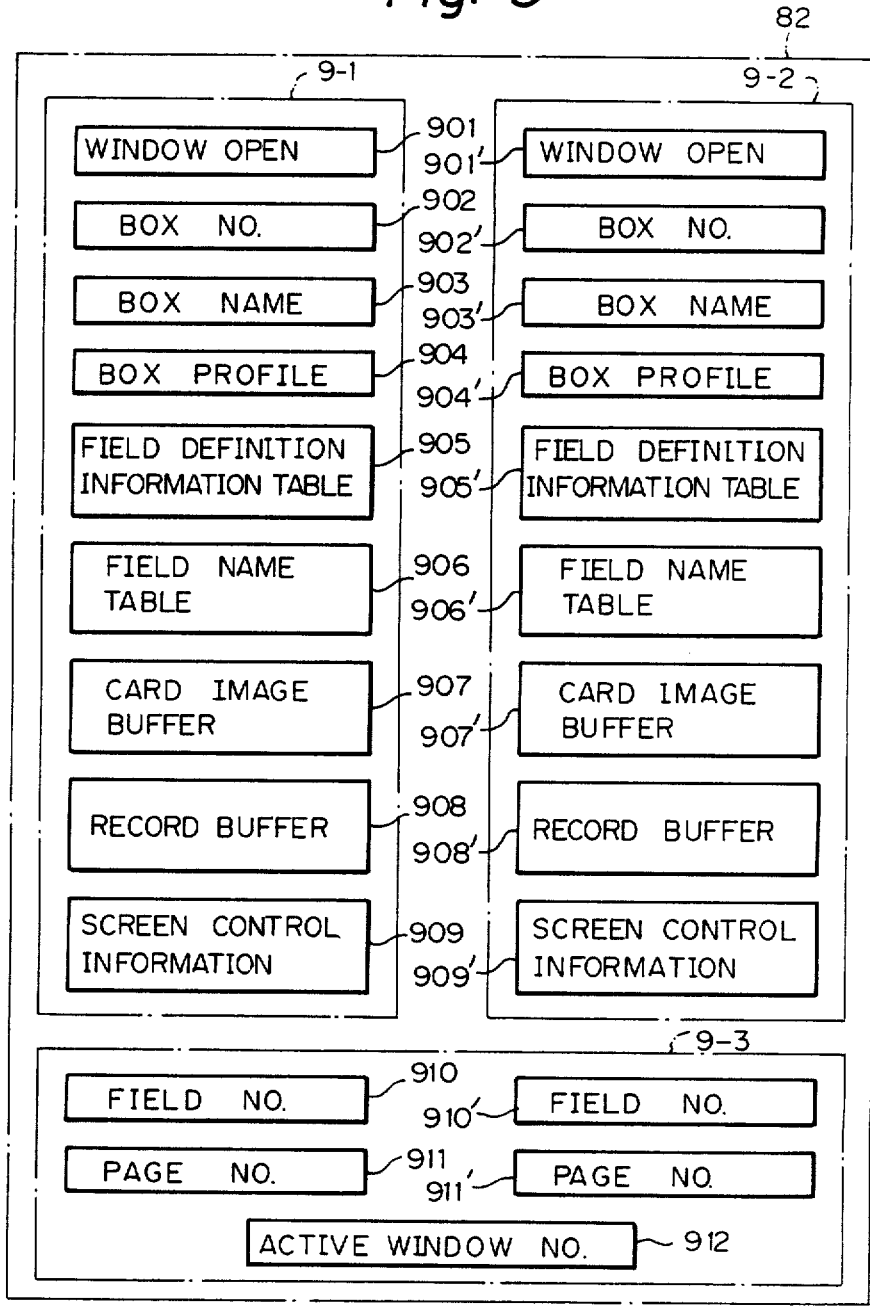
FIG. 9 is a block diagram showing a part of the content of the random access memory (RAM) of FIG. 8.

FIG. 9 is a detailed block circuit diagram of a part of gthe RAM 52 of FIG. 8. In FIG. 9, reference numeral 9—1 is an area for window no. 1, 9—2 is an area for window no. 2, and 9—3 is a cursor position information area. There can be more than three windows. The areas 9—1 and 9—2 have window open areas 901 (901'), box number areas 902 (902'), box name areas 903 (903'), box profile areas 904 (904'), field definition information table areas 905 (905'), field name tables 906 (906'), card image buffer areas 907 (907') holding card image data (60 lines × 96 columns), record buffer areas 608 (608'), and screen control information areas 909 showing the relationship between the contents of the screen buffer 90 and the contents of the card image buffer areas 906 (906'). The screen control information areas, more specifically, comprise areas storing the start line of the display window, the end line of the display window, the header Y-coordinate of the card image displayed on the screen, the leftmost X-coordinate of the card image displayed on the screen, and the real cursor position and are used for scroll control, etc.

When the contents of the area 9—1 or 9—2, which correspond to a box, are not needed, they can be transferred to the floppy disk 90. In their place, new data for other boxes can be loaded into the area 9—1 or 9—2 from the floppy disk 90. In other words, the boxes can be changed.

The cursor position information area 9—3 includes field number areas 910 and 910' for each window with the real cursor, page number areas 911 and 911' for each window with the real cursor, and a window number area 912 with the real cursor. Here, the window designated by the window number area 912 has the cursor displayed therein and is processed. Such a window is called an active window.

Window change control is the processing that accomplishes switching between the windows, for example, windows 41, 42, and 43 of FIG. 4 while within the card images displayed on the display unit 86, for which processing is to be performed at the present time. A window change is effected by setting the window number in the window number area 912 in the cursor position information area 9—3 by the window change key so as to generate a box selection interruption.

Page designation control performs processing by designation of a page using a page change key. As shown in FIG. 4, the display unit 86 has shown thereon a card image of one box in the first window 41 with the form data and card data merged and a card image of another box in the second window 42 similarly merged. If a new page is designated in this state, a page number is loaded for each window into the page number area 911 or 911' of the cursor position information area 9—3. As a result, a page selection interruption starts, and the content of the designated page on the box, which page is to be displayed in the said window, is extracted and is displayed on the display unit 86. Through this, the card image displayed in the window is changed, thereby changing the page in the same box.

Cursor movement control detects the new position of the cursor when the cursor (real cursor) is moved by a cursor movement key and loads the position in the cursor position information holding unit 31 in the field number area 910 or 910' for each field. As a result, the cursor is displayed, and the field definition information is searched based on the field number. As a result of this search, the field definition information and the field name of the corresponding field are extracted and used for the processing. If the said field is in a position not displayed on the display screen, vertical scrolling processing or horizontal scrolling processing is performed to display the same on the display screen.

Figure 10:
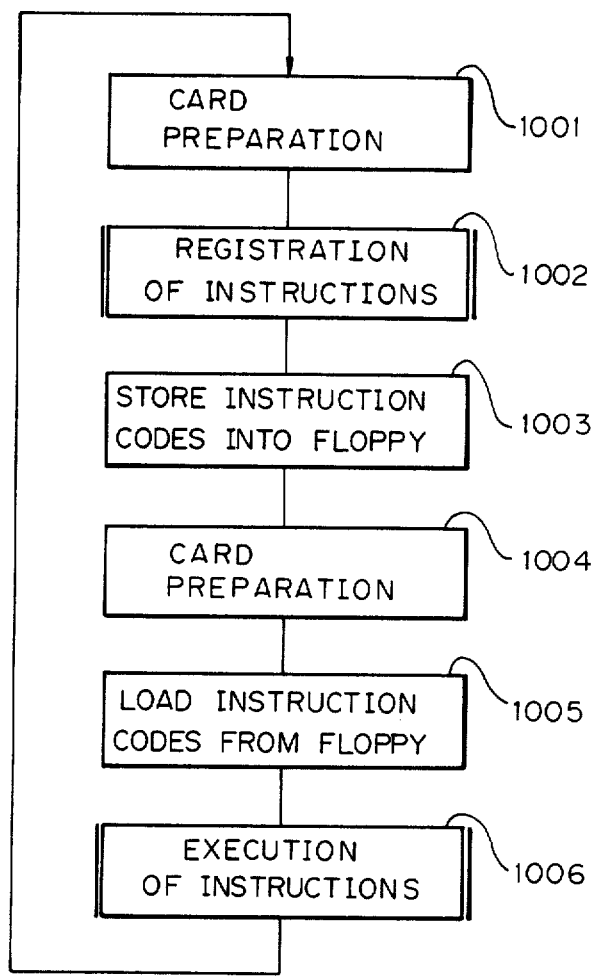
FIG. 10 is a schematic flowchart showing operational instructions of the system of FIG. 8.
Figure 12B:
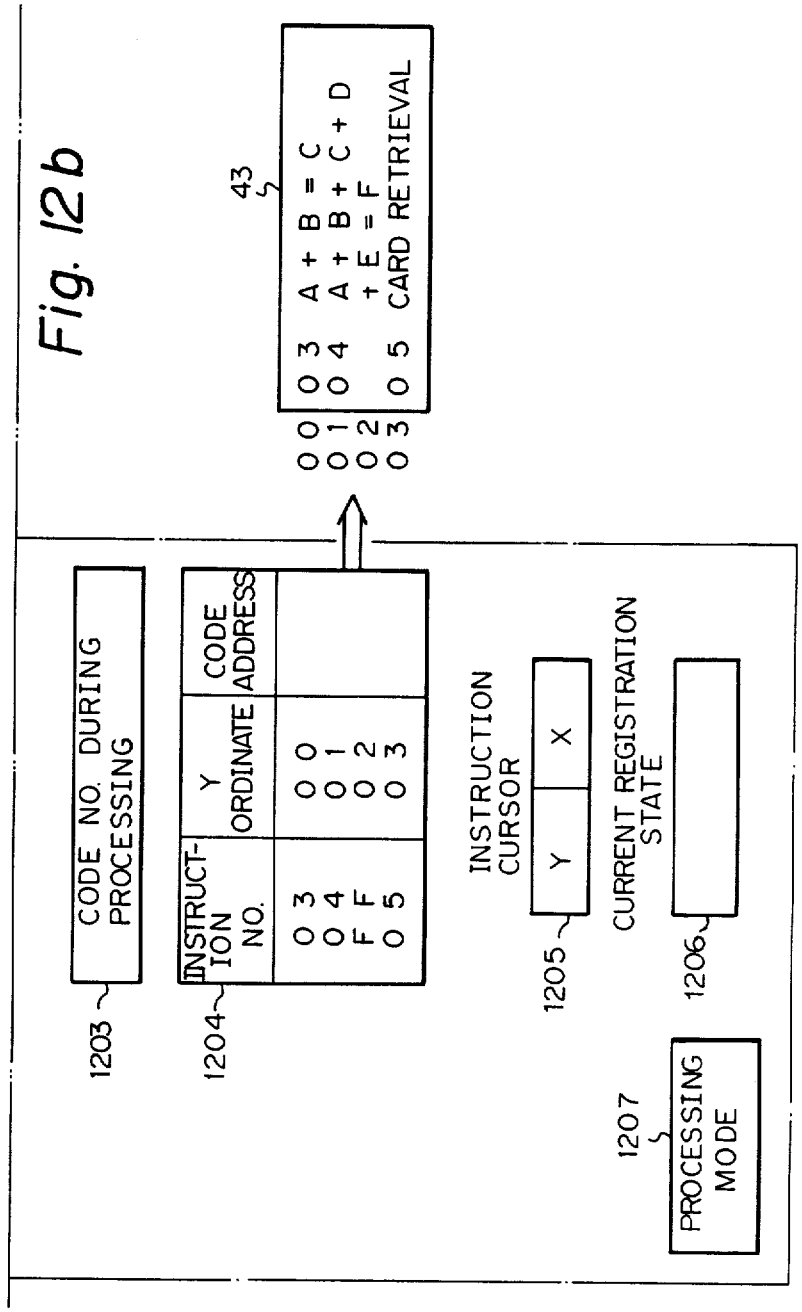
FIG. 12, including 12a and 12b, is a detailed flowchart of step 1108 of FIG. 11.

FIG. 10 is a schematic flowchart of the operational instructions of the system of FIG. 8. At step 1001, blank form data is displayed on the display unit 86 and, simultaneously, card data is filled or entered into the fields for the preparation of cards (card images). The created card images are then stored in the floppy disk 90 in box units, as described above. Card images prepared in this way are, at step 1002, displayed on the display unit 86. Based on the displayed contents, calculation processing and other processing instructions are prepared and registered or stored for the input image on the display unit 86. In this case, display of the actual card data is, however, not necessary. At step 1003, the processing instruction codes are stored in the floppy disk 90. Next, at step 1004, card images in another box can be prepared. Step 1004 can be without adverse affect if desired to improve efficiency. In this case, at step 1005, the registered processing instruction is loaded from the floppy disk 90 into the instruction code buffer 1201 (FIG. 12). At step 1006, the processing instruction is executed and, at the same time, the card data for the fields of the card images resulting from instruction processing is prepared. Registration of processing instructions, execution of processing instructions, and preparation of card images are performed in this way.

Figure 11B:
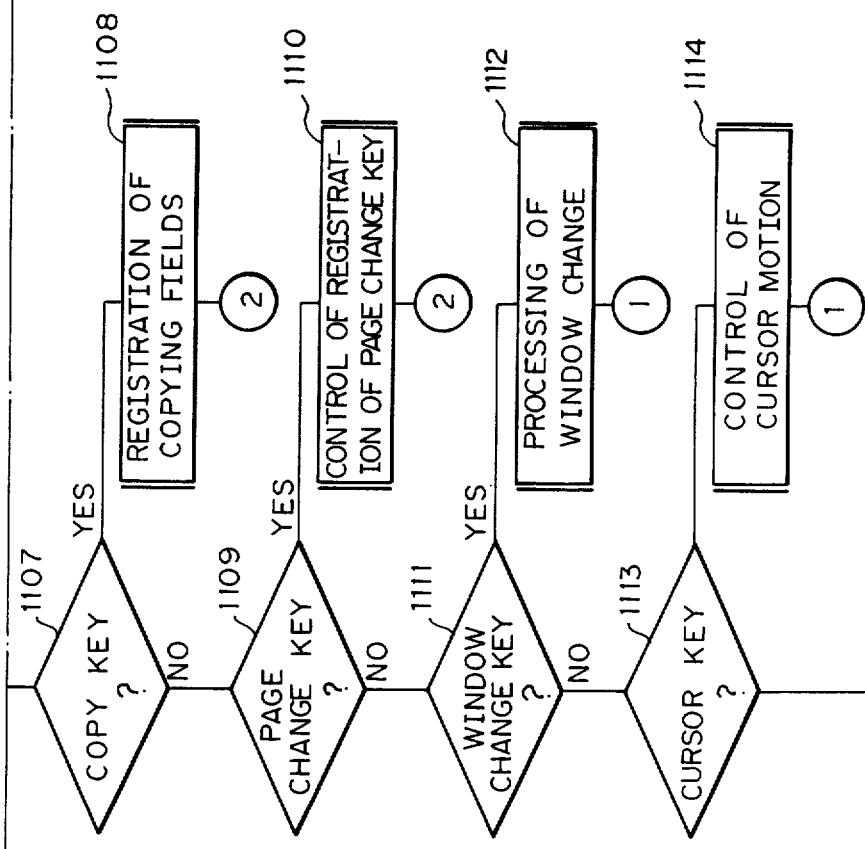
FIG. 11, including 11a–11h, is a detailed flowchart of processing instruction registration or creation and storage step 1002 of FIG. 10.
Figure 11C:
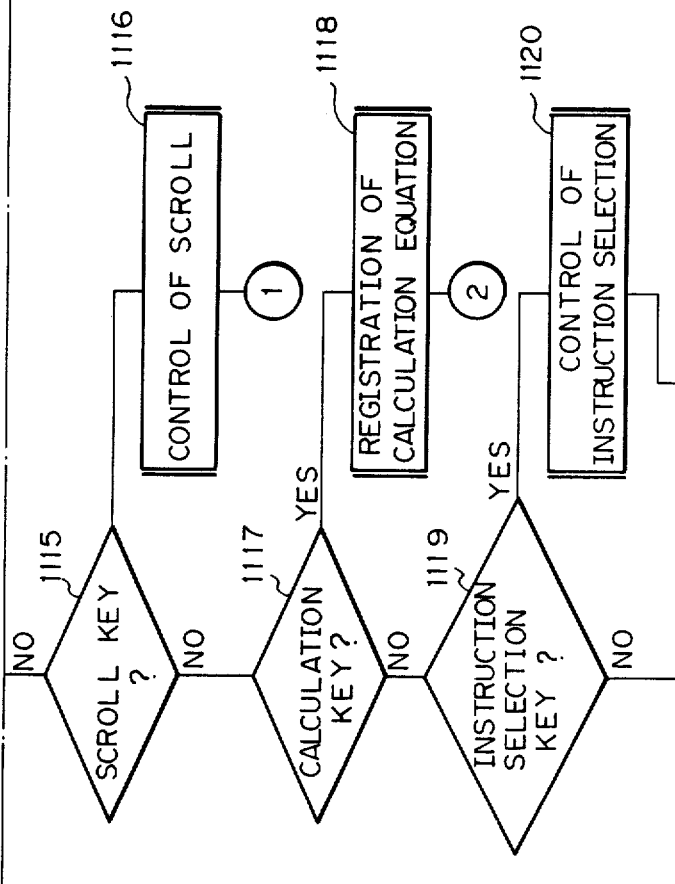
Figure 11D:
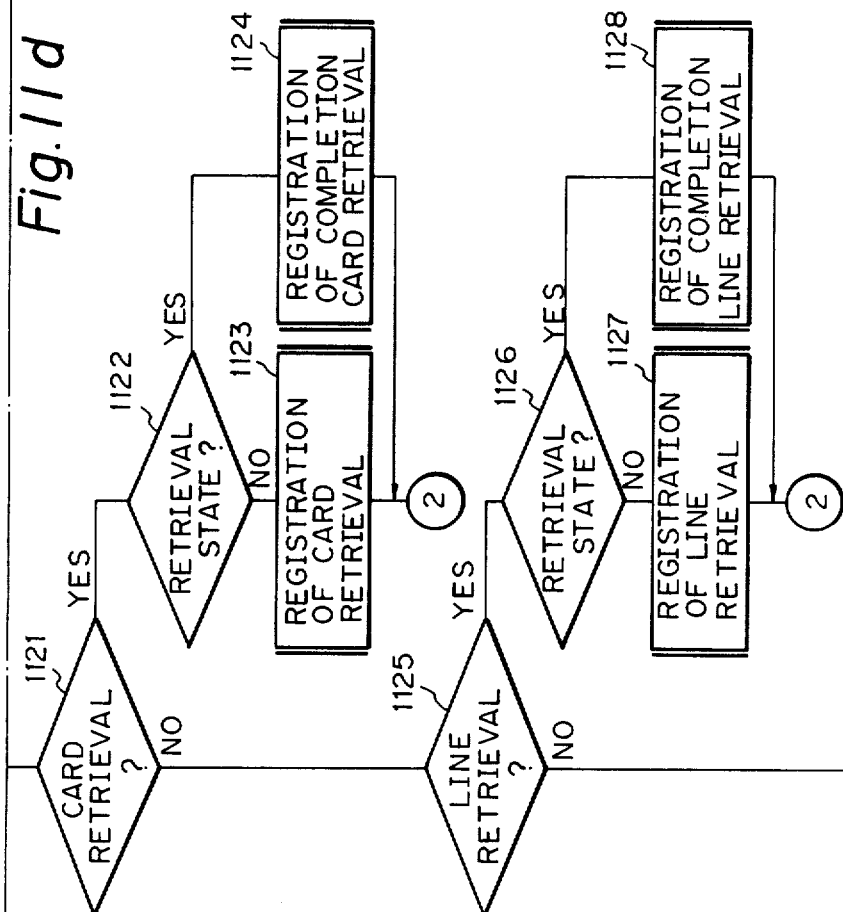

FIG. 11 is a detailed flowchart of registration step 1002 or creation and storage of the processing instruction of FIG. 10. If an operation selection key is depressed to select an instruction registration operation, the instruction window 43 is opened at step 1101. At step 1102, a card image is displayed on the window, but, in this case, a blank card without card data, i.e., a blank card with the field marks "... ... ..." or "⊔⊔⊔⊔⊔⊔" filled in the fields, is displayed. At step 1103, the instruction registration name is written into the instruction number "00" position in the instruction window and the execution key is depressed. At step 1104, the instruction number "01" is displayed and, to its left, the instruction cursor is displayed. At step 1105, the position of the instruction cursor is stored. At step 1106, a key on the keyboard 84 is depressed and its key read. The subsequent operation depends on the key depressed.

If the copy key is depressed, control advances from step 1107 to step 1108 and field copy is registered. Specifically, field copying is performed between character fields or between numeric fields. As to the method of copying, the real cursor is moved to the first position of the character field or the numeric field to be copied, the copy key is depressed, the real cursor is moved to the field where the copying is to occur, and the execution key is depressed. After entry, control advances to step 1601 of FIG. 16.

If a page change key is depressed, control advances from step 1109 to step 1110 and page change is registered. The page change keys include a prior page, succeeding page, page designation, end page, and other card image change keys. For example, when registering a page designation, if the page designation key and a numeric key "4" are depressed and then the execution key is depressed, registration is effected designating the card image P.0004 of page 4. After completion of registration, control advances to step 1601 of FIG. 16.

If the window change key is depressed, control advances from step 1111 to step 1112 and window change processing is executed. In this case, there is no instruction code and registration is not performed. Window change processing changes the active window number (area 912 in FIG. 9) so as to increase the window number. For example, in the case of FIG. 4, window (No. 1) 41 is changed to window (No. 2) 42, or window 42 to window 43 (No. 3). Window No. 3, which has the largest number, is changed to window no. 1, which has the smallest number. When the active window is changed in this way, control returns to step 1106.

If a cursor key is depressed, control advances from step 1113 to step 1114 and cursor movement control is performed. If a scroll key is depressed, control advances from step 1115 to step 1116 and scroll control is performed. In both of these cases, there is also no instruction code and registration is not performed. After processing, control returns to step 1106.

If a calculation key is depressed, control advances from step 1117 to step 1118 and a calculation equation is registered. After the registration is completed, control advances to step 1601 of FIG. 16.

If an instruction selection key is depressed, control advances from step 1119 to step 1120 and instruction selection control is performed. In other words, a menu is displayed and selection made. If, as a result, card retrieval is selected, control advances from step 1121 through step 1122 to step 1123 and card retrieval is registered. When currently in the card retrieval state, control is switched from step 1122 to step 1123 and card retrieval completion is registered. Control from step 1123 and 1124 advances to step 1601 of FIG. 16.

If line retrieval is selected, control advances from step 1125 through step 1126 to step 1127 or 1128 and line retrieval is registered. When currently in the card inquiry state due to a positive amount in 1129, control changes from step 1130 to step 1132 and card inquiry completion is entered. Control from step 1131 and 1132 advances to step 1601 of FIG. 16.

If card repetition is selected, control advances from step 1133 through step 1134 to step 1135 and card repetition is registered. When currently in the card repetition state, control changes from step 1134 to step 1136 and card repetition completion is registered. Control from step 1135 and 1136 advances to step 1601 of FIG. 16.

If line repetition is selected, control advances from step 1137 through step 1138 to step 1139 and line repetition is performed. When currently in the line repetition state, control changes from step 1138 to step 1140 and line repetition completion is registered. Control from step 1139 and 1140 advances to step 1601 of FIG. 16.

If box access is selected, control advances from step 1141 through step 1142 to step 1143 and box access control is performed. In box access, there is no instruction code and registration is not performed.

When currently in box access, control changes from step 1142 to step 1144 and box access is released. Control from step 1143 and 1144 advances to step 1106 of FIG. 11.

When conditional branching is selected, control advances from step 1145 through step 1146 to step 1147 and conditional branching is registered. When currently in the conditional branching state, control changes from step 1146 to step 1148 and conditional branching completion is registered. Control from step 1147 and 1148 advances to step 1601 of FIG. 16.

If table preparation is selected, control advances from step 1149 through step 1150 to step 1151 and table preparation is registered. When currently in the table preparation state, control changes from step 1150 to step 1152 and table preparation completion is registered. Control from step 1151 and 1152 advances to step 1601 of FIG. 16.

When no instruction selection key is depressed at step 1119 or when, none of the above are selected as a result of instruction selection control of step 1120, control advances to step 1153 and MPU 81 determines whether or not a two-floppy disk set is selected. If this result is that it is selected, control advances to step 1154 and the MPU 81 determines whether or not the state is a two-floppy disk set state. If not a two-floppy disk set state, control advances to step 1155, a two-floppy disk set is registered, and control advances to step 1101 of FIG. 11. On the other hand, if the result of determination at step 1153 is negative, control advances to step 1156 and it is determined whether or not the completion key has been depressed. If the completion key has not been depressed, control returns to step 1106.

FIG. 12 is a data table used in the registration routine of FIG. 11. The table is, for example, housed in the RAM 82 of FIG. 8. Reference numeral 1201 is an instruction code buffer which houses the instruction code of the instruction name, the instruction code of the instruction number "01", ... ... in that order. In other words, the instructions registered during the instruction registration are successively housed or stored in the area designated by the empty header address pointer 1202. If the completion key is depressed, the contents of the instruction code buffer 1201 are transferred to the instruction file of the floppy disk 90. Reference numeral 1203 is an instruction number area under or of the current processing, in which the instruction cursor is currently located and which prepares the instruction and houses the instruction number during renewal. Reference numeral 1204 is an instruction display control information table which, for example, shows the case of instruction window 43 displayed in the right of the figure. Here, a display of "FF" in the instruction number indicates that the preceding instruction is continuing. For example, the instruction of instruction number "04" continues from line (Y coordinate) 01 to 02. The code address of the table 1204 is the address of instruction code buffer 1201. If the instruction window 43 is scrolled, the contents of the table 1204 change. Reference numeral 1205 houses the coordinates of the instruction cursor (not shown) in the instruction window 43. Reference numeral 1206 houses the flag of the current registration state, for example, the flag of the card retrieval state. Reference numeral 1207 is a processing mode area used when executing the registered processing instruction.

FIGS. 13A to H are data formats of the instruction code buffer 1201 of FIG. 12, which formats are explained by the subsequently mentioned routine.

Figure 14:
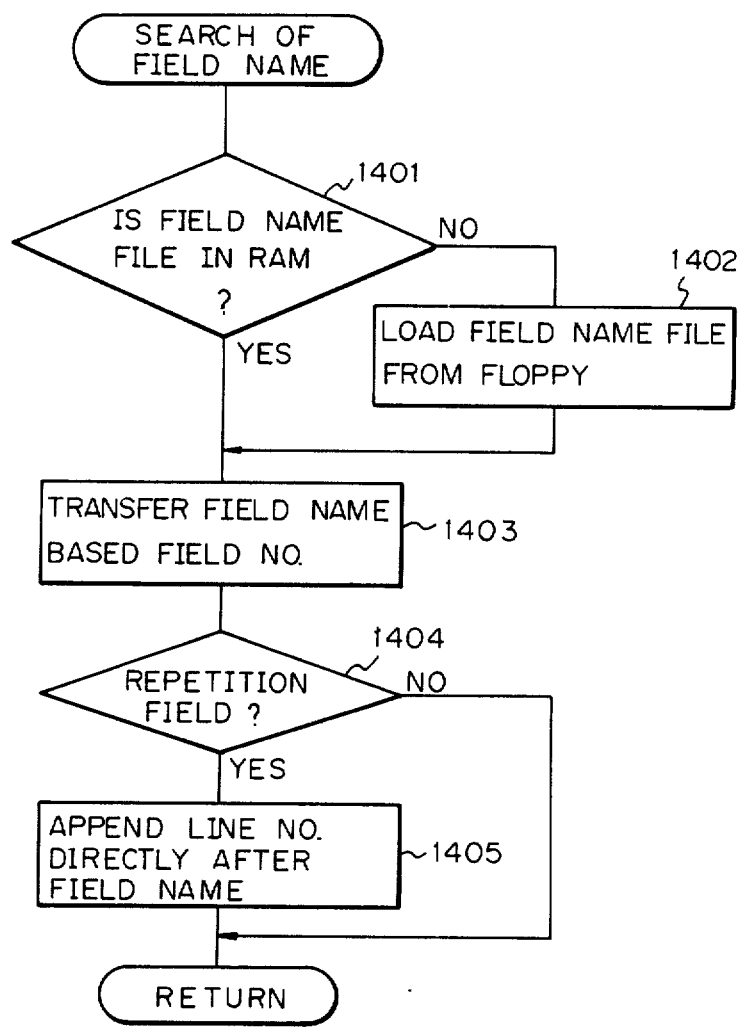
FIG. 14 is a flowchart for displaying field names as in the present invention.

FIG. 14 is a routine for displaying a field name in, for example, the instruction window, when designating a field by the real cursor. In step 1401, it is determined whether or not a field name table is in the RAM 82. When the result is that it is not in the RAM 82, the field name table is loaded from the floppy disk 90 to the RAM 82 (see FIG. 9). The field name table is comprised as shown in FIG. 15. That is, for independent fields, definition is carried out for each field, and for repetition fields, a line number is appended to each header field name. At step 1403, a field name is taken out from the loaded field name table based on the input field number and is transferred to the area corresponding to the screen buffer 87. Further, at step 1404, it is determined whether the field is a repetition field. When a repetition field is designated, at step 1405, a line number is appended or positioned directly after the field name. For example, as shown in FIG. 7, "article 10" means the 10th line of the repetition field article.

Figure 16:
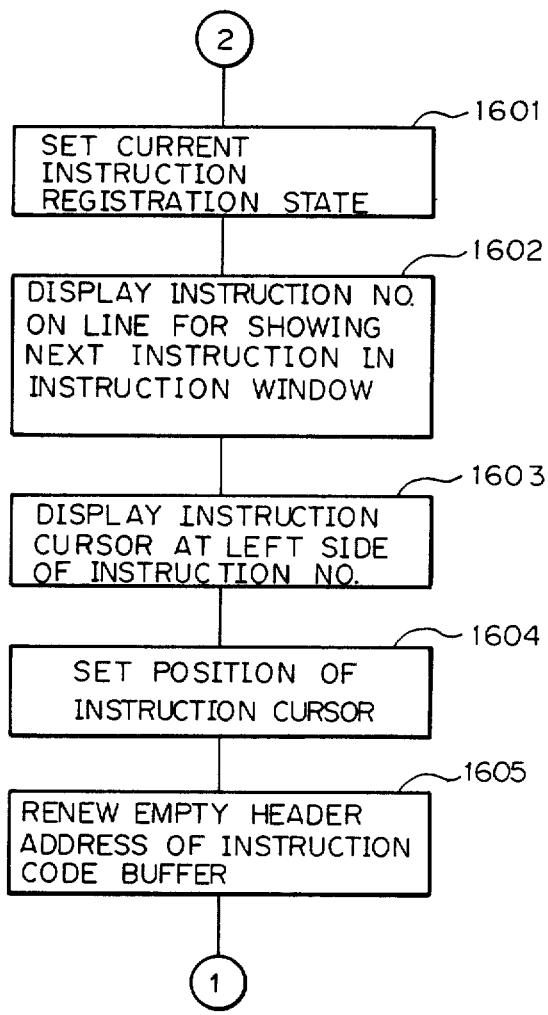
FIG. 16 is a flowchart of the flow following the registration completion of the registration of FIG. 11.

FIG. 16 is a flowchart of the flow following the registration and the completion of the registration of FIG. 11. At step 1601, the current instruction entry state shown in 1206 of FIG. 12, for example, the current card retrieval state flag, is set. At step 1602, an instruction number is displayed on the line for showing a next instruction to be entered in the instruction window. For example, after the registration of "CARD REPETITION COMPLETION" of instruction number "06" in the instruction window of FIG. 7, the next instruction number "07" is displayed. Next, at step 1603, the instruction cursor is displayed to the left of the instruction number "07" and, at step 1604, the position of the instruction cursor is set or stored. At step 1605, the empty header address pointer 1202 of the instruction code buffer is renewed or updated to the next address and the control returns to step 1106 of FIG. 11.

Figure 17:
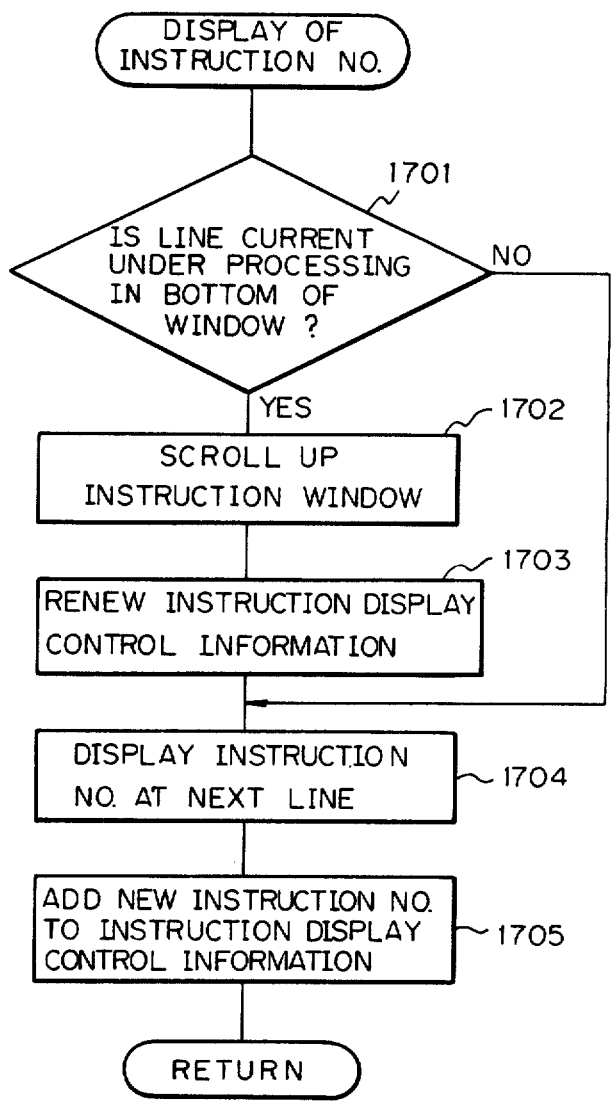
FIG. 17 is a detailed flowchart of step 1602 of FIG. 16.

FIG. 17 is a detailed flowchart of step 1602 of FIG. 16. Specifically, at step 1701, it is determined whether or not the line current under processing is at the bottom of the instruction window 43. If at the bottom, at step 1702, the instruction window 43 is scrolled and, at step 1703, the instruction display control information table 1204 (FIG. 12b) is renewed or updated to reflect the new coordinates of the instructions. At step 1704, the instruction number is displayed on the next line. At step 1705, the newly displayed instruction number is added to the instruction display control information table 1204 (FIG. 12b), and the routine of FIG. 17 is completed.

Next, a detailed explanation will be given of the main steps of FIG. 11.

Figure 18A:
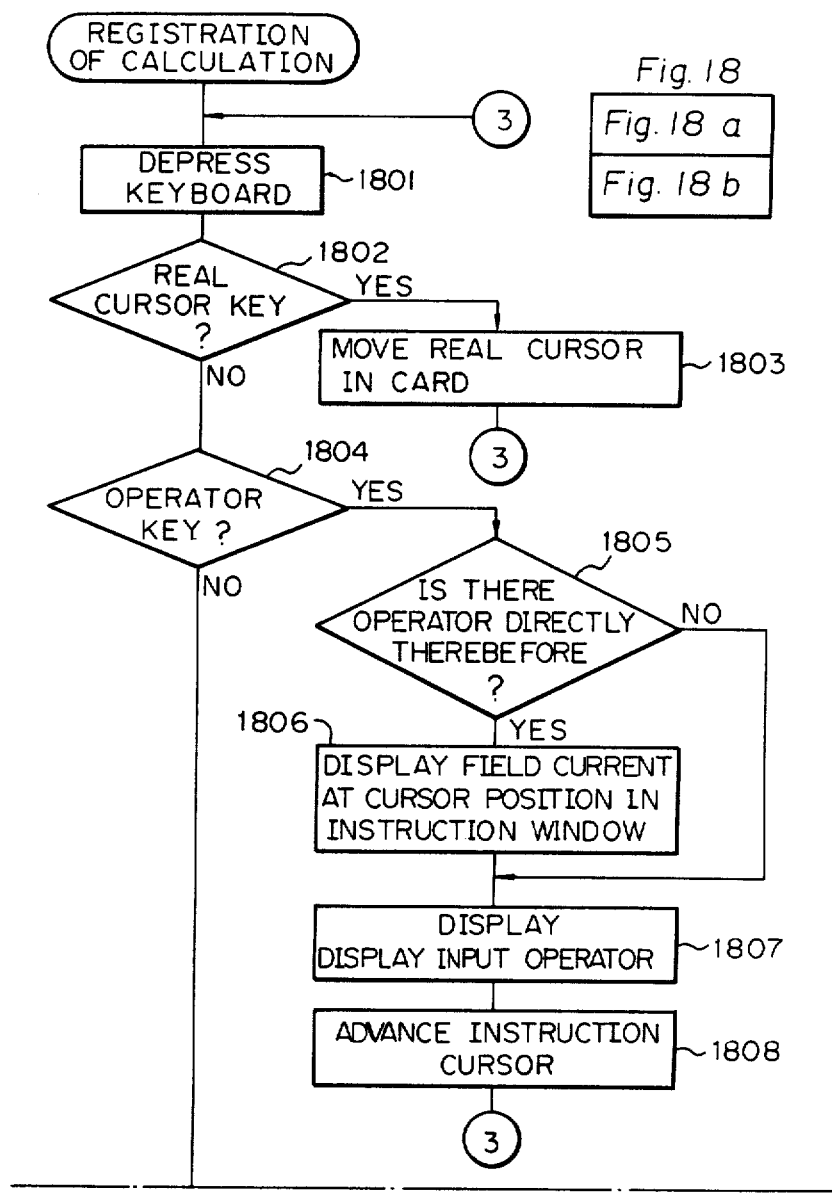
FIG. 18, including 18(A) and 18(B), is a detailed flowchart of step 1118 of FIG. 11.
Figure 18B:
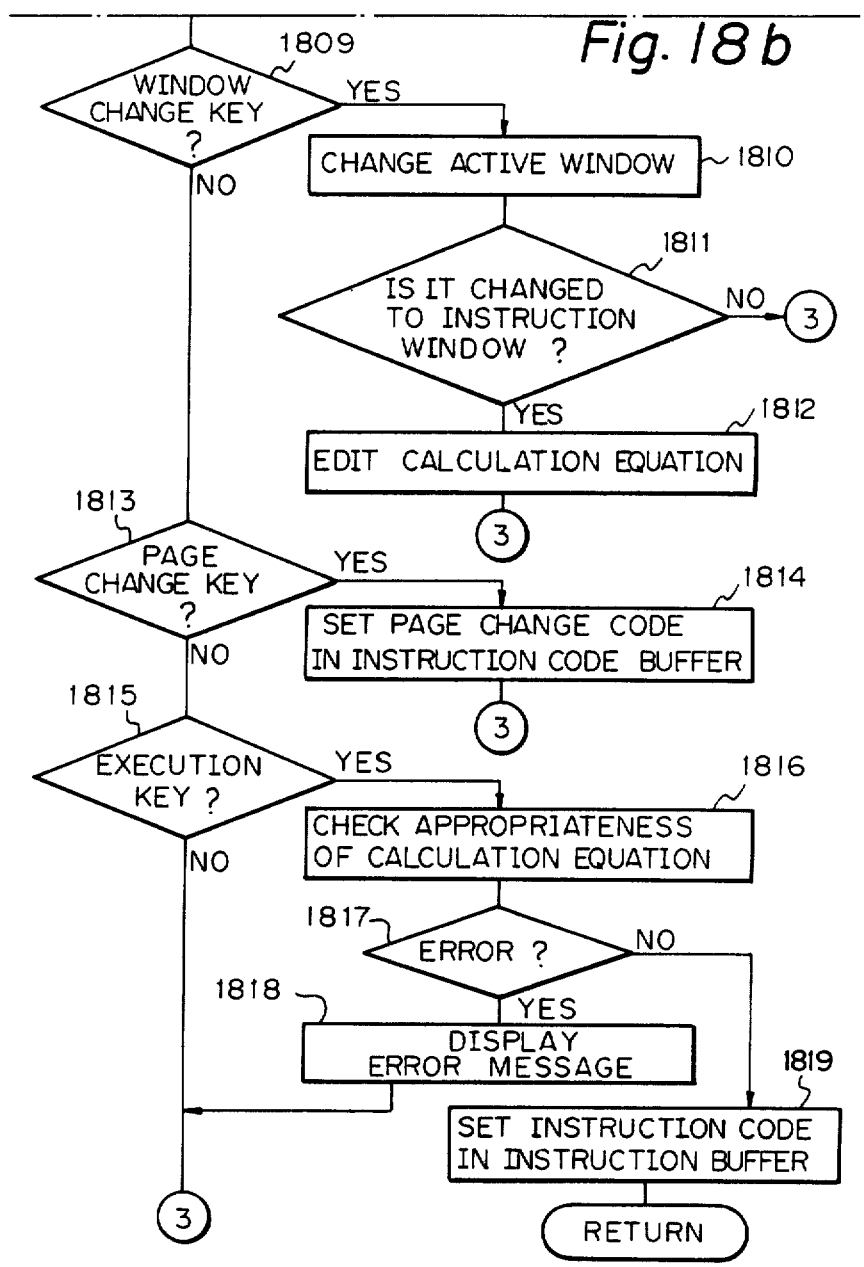

FIG. 18 is a detailed flowchart of step 1118 of the registration of the calculation equation of FIG. 11. First, at step 1801, if the keyboard 84 is depressed, the following operation is performed.

If a cursor key is depressed, control advances from step 1802 to step 1803 and the real cursor is moved in the card image, then control returns to step 1801.

If an operator key, for example, the "×", "÷", "+", "−", or "=" key, is depressed, control advances from step 1804 to step 1805 and determination is made as to whether or not there is an operator directly therebefore, that is, existing at that cursor location. When the result of the determination is that there is an operator at the cursor location, at step 1806, the field of the current real cursor position is displayed on the instruction window as a calculation field that is, a field upon which a calculation is performed and then, at step 1807, the input operator is displayed. If there is no operator directly therebefore at step 1805, control advances directly to step 1807, where the operator is displayed. At step 1806, the field number is also stored as the instruction code in the instruction code buffer (FIG. 12). At step 1807, the operator code is also stored as the instruction code in the instruction code buffer (FIG. 12). At step 1808, the instruction cursor is advanced to the next position and control returns to step 1801.

If the window change key is depressed, control advances from step 1809 to step 1810 and the active window is changed. In other words, the contents of the active window number area 912 of FIG. 9 are renewed. As a result, at step 1811, it is determined whether or not the instruction window 43 is changed to the active window. When the instruction window is the active window, at step 1812, a calculation equation is edited and control returns to step 1801. When the instruction window is not the active window, control directly returns to step 1801.

If a page change key is depressed, control advances from step 1813 to step 1814, the page change code is stored as the instruction code in the instruction buffer (FIG. 12), and control returns to step 1801.

If the execution key is depressed, control advances from step 1815 to step 1816 and the appropriateness of the calculation equation is checked. At step 1817, it is determined whether or not there is an error in the calculation equation. For example, an error of A xx B, etc. is detected. When there is an error, at step 1818, an error message is displayed in the message area of the display unit 86 and control returns to step 1801 for correction, etc. If there is no error at step 1817, control advances to step 1819, the instruction code is set in the instruction code buffer 1201, and the routine is completed. The format of the instruction code used in this routine is as in FIG. 13A.

Figure 19:
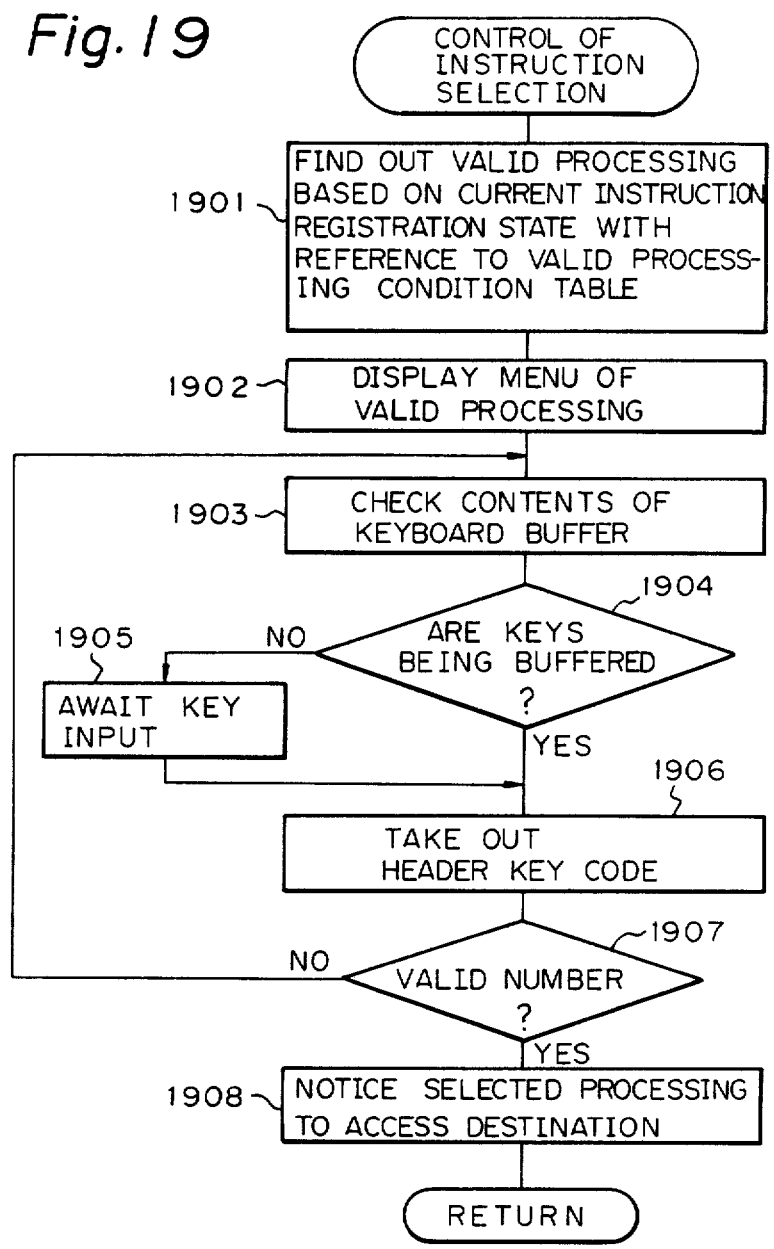
FIG. 19 is a detailed flowchart of step 1120 of FIG. 19.

FIG. 19 is a detailed flowchart of step 1120 of FIG. 11. At step 1901, based on the current instruction registration conditions and by referencing the table of valid processing conditions of FIG. 21, the valid processing for the current state is determined; that is, only certain types of processing are valid in each state and a determination whether the current instruction can be processed must be made. At step 1902, the menu of just the valid processing possible at the current condition is displayed and the selection of processing functions are thereby simplified. For example, when currently displaying the state "NO BOX ACCESS", such processing as "BOX ACCESS", "CARD RETRIEVAL", "LINE RETRIEVAL", "FLOPPY REPLACEMENT", "CARD REPETITION", "LINE REPETITION", "CONDITIONAL BRANCHING", and other processing are valid, while selection of "CARD INQUIRY", "TABLE PREPARATION", and other processing are invalid. Further, in the case where "card retrieval" is selected when in the "card retrieval" state, the indication "OTHER THAN DESIGNATION BOX POSSIBLE" means that, when the card images of a plurality of boxes are split-displayed, "card retrieval" of boxes other than the box where the real cursor is positioned is possible, but "card retrieval" of the box in which the real cursor is positioned is invalid. Therefore, when not in box access, the menu as shown in FIG. 20 (B) is displayed. FIG. 20 (A) shows the case where such valid processing conditions were not set. Next, at step 1903, the contents of the keyboard buffer are checked. At step 1904, it is determined whether or not a key is being buffered. If the result is that the key is not being buffered, at step 1905, interruption is awaited until there is a key input. If buffering is not being performed, control directly advances to step 1906. In other words, when being buffered, key depression results in an interruption which stores the depressed key code in the keyboard buffer; therefore, even if a key is depressed during menu display processing, the key code is not lost. This accordingly enables quick selection of processing instructions and is advantageous to skilled operators. Of course, beginners can check the display and then make the key input so as to ensure reliable selection operation (corresponding to step 1905). Next, at step 1906, the header key code of the keyboard buffer is taken out and, at step 1907, it is determined whether or not it is a valid selection number, that is, the number is compared to the valid selections found in the table (see FIG. 21). If the determination at step 1907 is negative, control returns to step 1903. if positive, at step 1908, the selected processing is notified to the access destination and the routine of FIG. 19 is completed. In this way, when registering various common processing instructions for many card images, for example, when selecting and executing one processing instruction out of numerous processing functions, such as retrieval processing designating the contents of fields on various card images for a retrieval, calculation processing for numerical calculation between fields, and table preparation processing, use is made of the table of valid processing conditions for menu display and, in accordance with need, the key input is buffered. Therefore, it is possible to quickly and reliably select from many processing functions. Skilled operators can therefore make the same input as in conventional function key operation with, for example, two touches, while nonskilled operators can make the input making use of the advantages of a usual menu display processing method.

Figure 22:
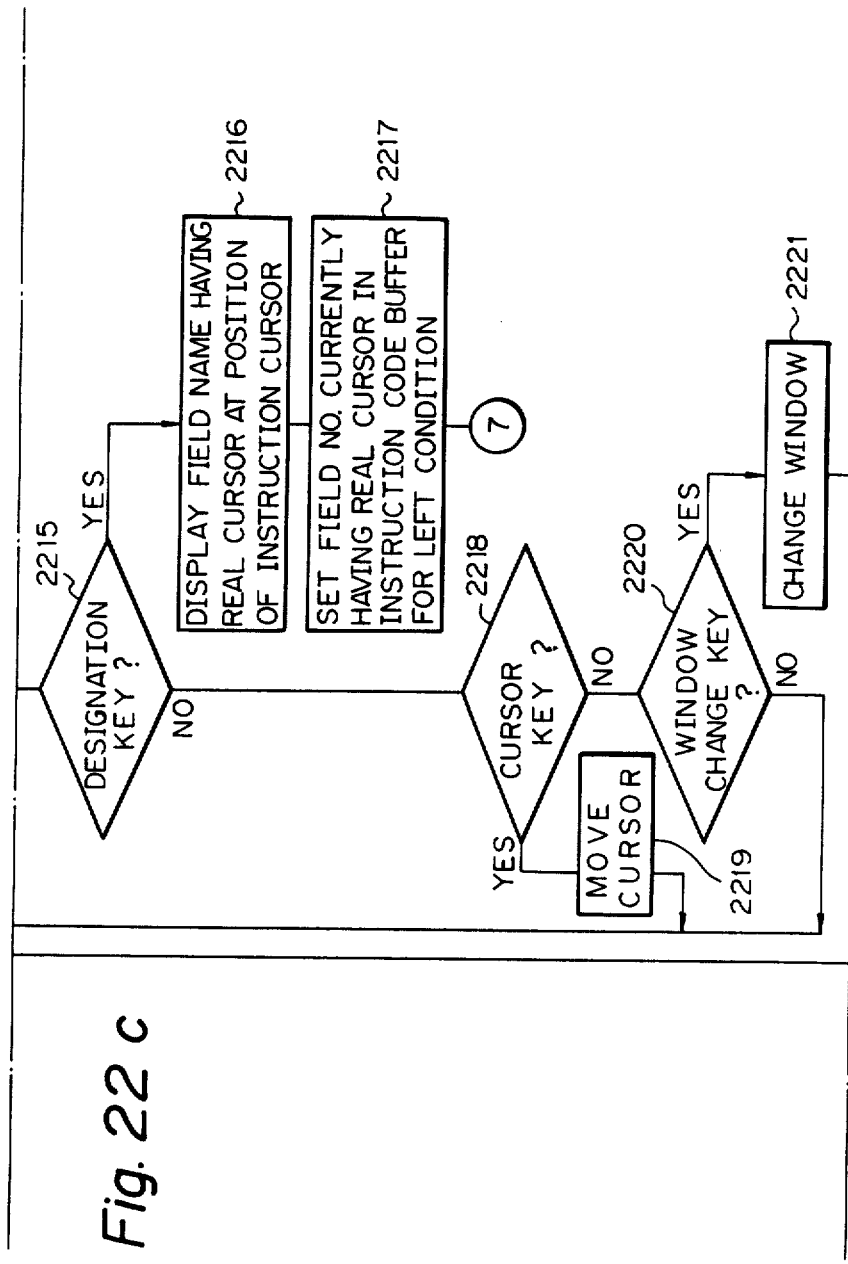
FIG. 22 including 22a–22i, is a detailed flowchart of registration step 1123 of the card retrieval processing of FIG. 11.
Figure 22D:
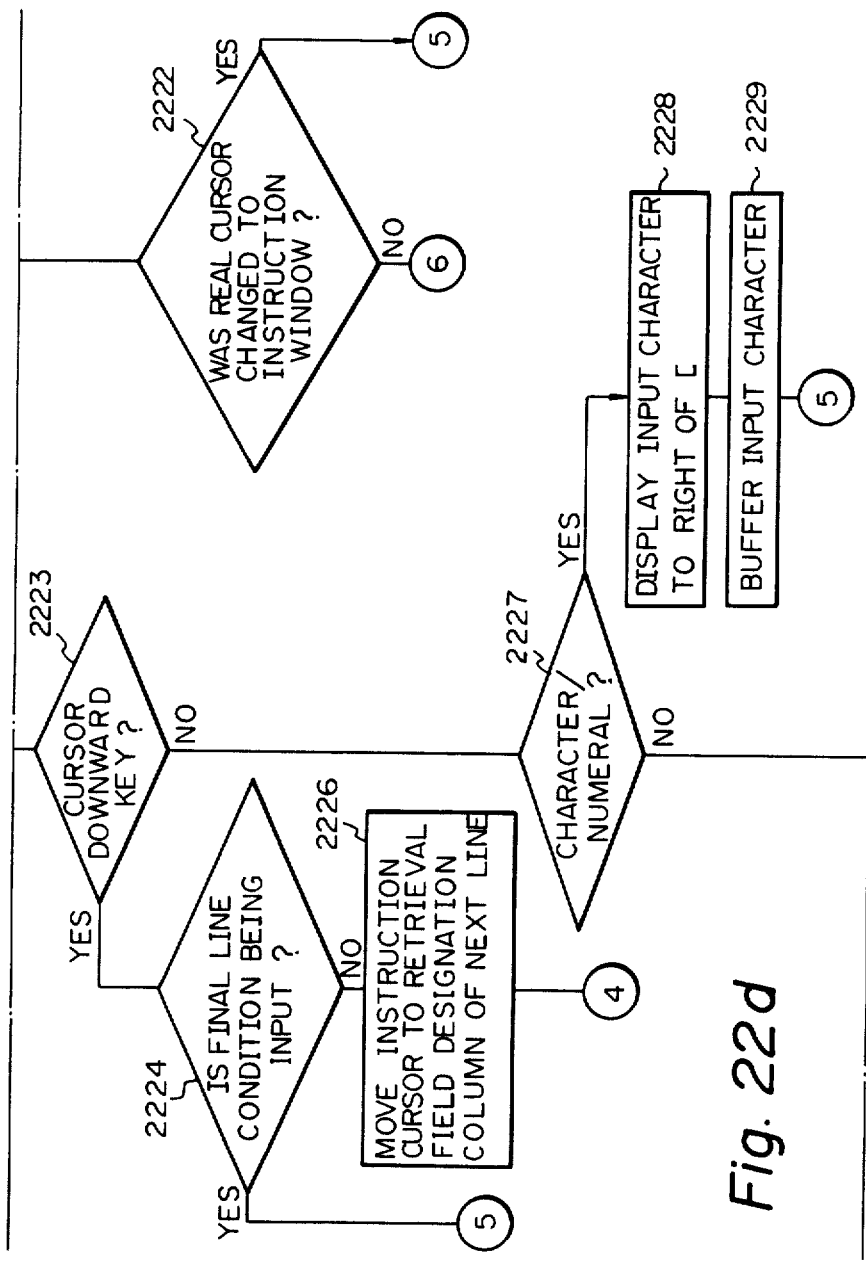
Figure 22:
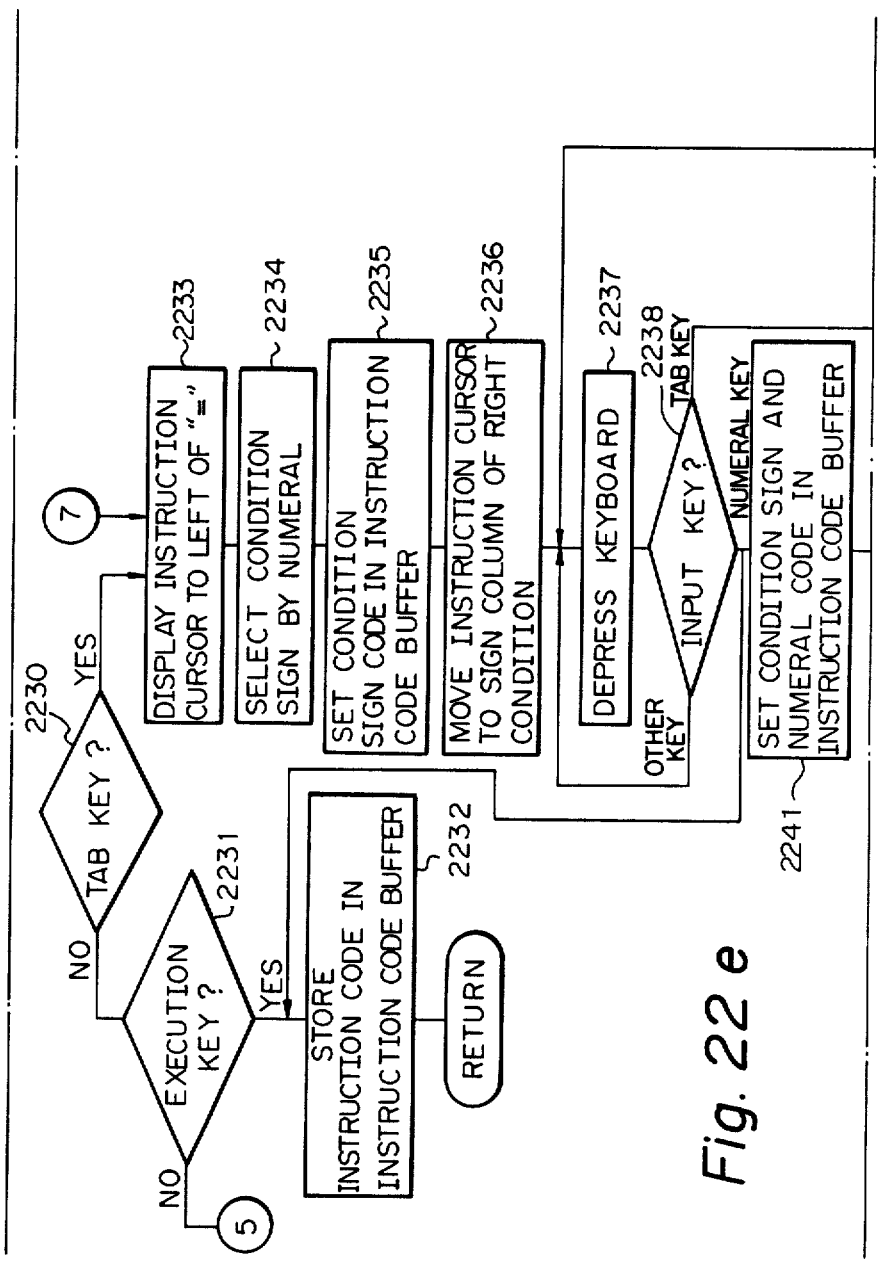
Figure 22:
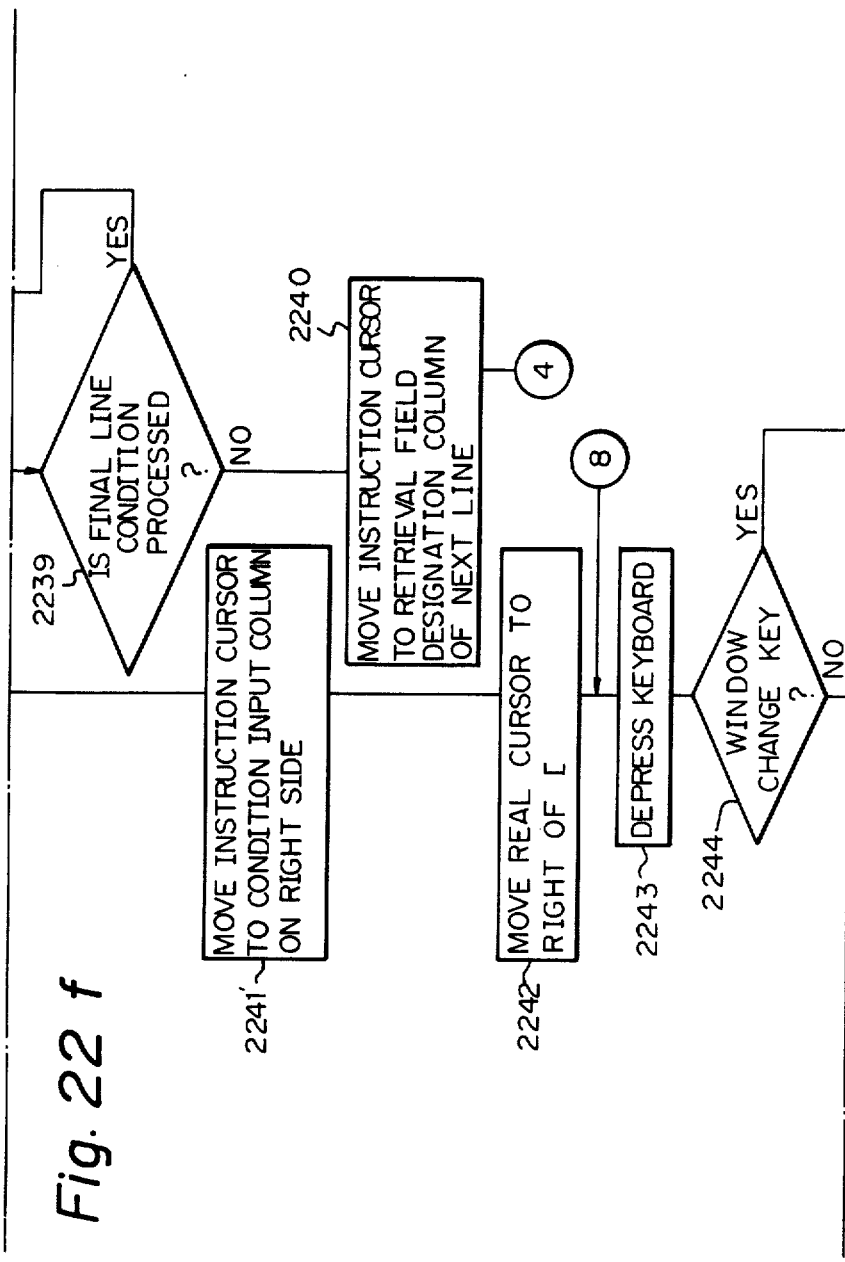
Figure 22:
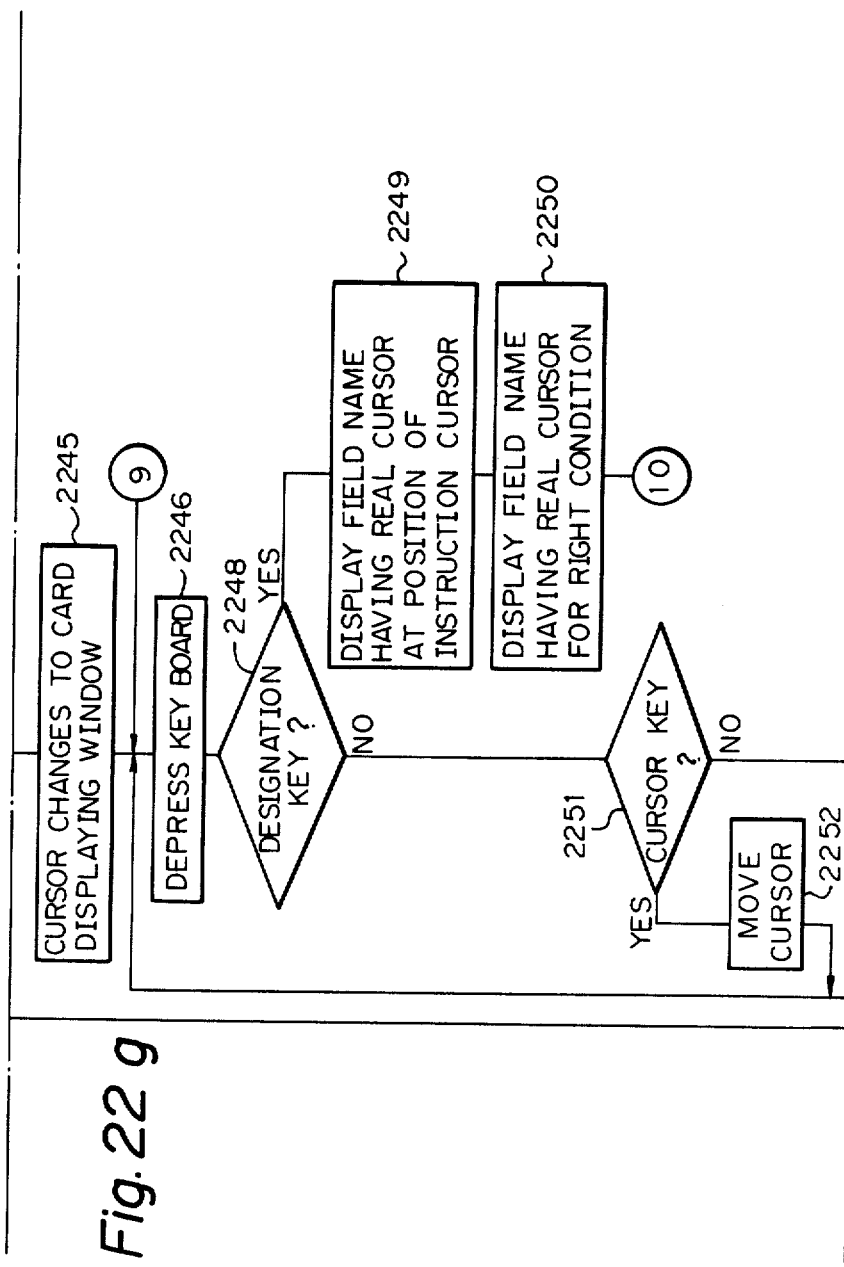
Figure 22:
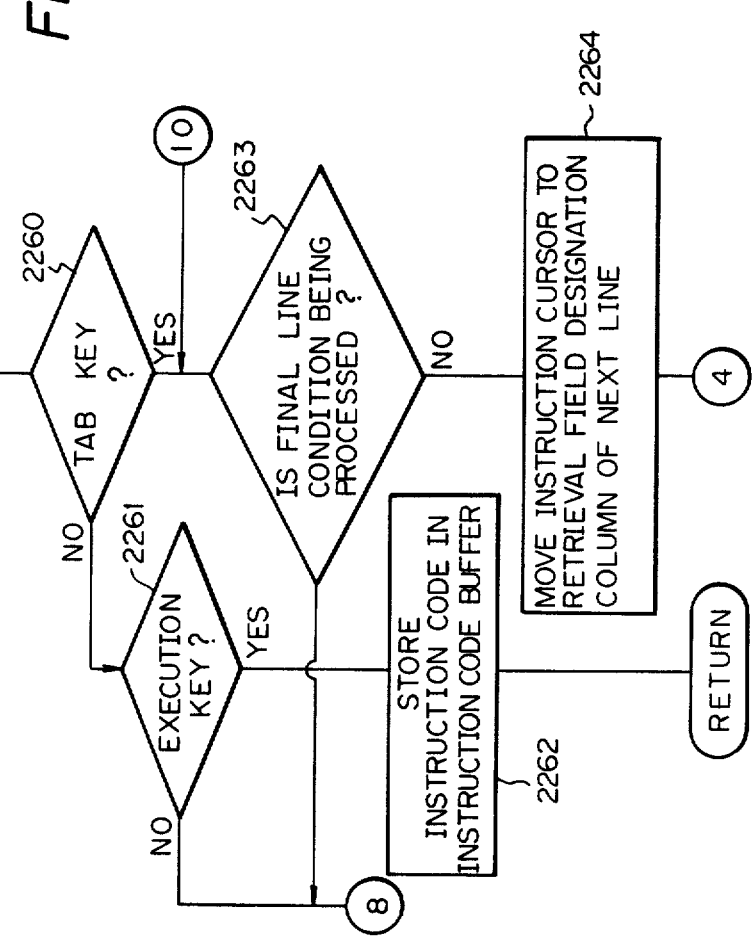
Figure 23:
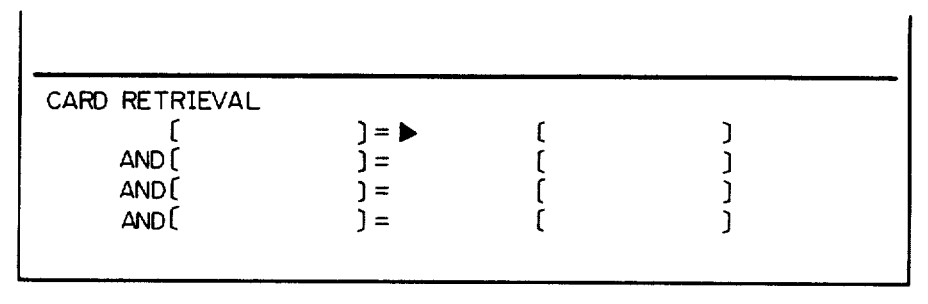

FIG. 22 is a detailed flowchart of registration step 1123 or storage and creation of instructions for the card retrieval processing of FIG. 11. At step 2201, the entry column for conditional input, that is, the condition used to retrieve a card, is displayed in the instruction window, as shown in FIG. 23. At step 2202, the instruction cursor is displayed on the field under retrieval. At step 2203, if a key of the keyboard is depressed, the following operation is performed corresponding to the key input.

If a cursor movement key is depressed, control advances from step 2204 to step 2205, the cursor moves within the card, and control returns to step 2203.

If the designation key is depressed, control advances from step 2206 to step 2207 and the field number and box number where the cursor is currently located are stored as the instruction code for the field for retrieval in the instruction buffer. Then, at step 2208, the field name of the current real cursor position is displayed at the position of the instruction cursor. This step is executed by the routine of FIG. 14. At step 2209 the real cursor is moved to the right of [. Next, at step 2211, if a key of the keyboard is depressed, the following operation is effected depending on the key input.

If the window change key is depressed, control advances from step 2212 to step 2213 and the real cursor is changed from the instruction window to a card displaying window. Then, a key of the keyboard is again depressed at step 2214. If, as a result, the designation key is depressed, at step 2216, the field name having the real cursor is displayed at the position of the instruction cursor. At step 2217, the field number currently having the real cursor is set as the instruction code for the condition on the left side, and control advances to step 2233.

If a cursor movement key is depressed, control advances from step 2218 to step 2219, the cursor moves in the card, and control returns to step 2214.

If the window change key is depressed, control advances from step 2220 to step 2221, the window is changed, and, if changed to the instruction window, control returns from step 2222 to step 2211. If changed to another card displaying window, control returns from step 2222 to step 2214.

Further, if the key input at step 2211 is the cursor downward movement key, control advances from step 2223 to step 2224 and it is determined whether or not the final line input condition is processed. If the final line input condition is indicated, control returns to step 2211. On the other hand, if not the final line input condition, the instruction cursor is moved to the retrieval field designation column of the next line at step 2226 and control returns to step 2203.

Further, if the key input at step 2211 is a character or numeral, control advances from step 2227 to step 2228, the input character is displayed to the right of the [, the character input at step 2229 is buffered, and control returns to step 2211.

Still further, if the key input at step 2211 is a tab key, control advances from step 2230 to step 2233, the instruction cursor is displayed to the left of =, and, at step 2234, the condition sign is selected by a numeral. For example, if a menu such as 1:=2:≠3:<4:>5:≦6:≧ is displayed and the numeral 4 selected, the "=" to the right of the instruction cursor changes to ">". Next, at step 2235, the condition sign code is stored as the instruction code. In this way, of the data formats shown in FIG. 13B, the retrieval field number, box number, left sign code, left condition (direct input data or field number) of the first condition are registered. The right sign code and right condition are registered in the same way in the steps after step 2242. Two or more such retrieval conditions can be registered using AND logic or OR logic.

Registration step 1124 for the completion of the card retrieval processing of FIG. 11 displays "CARD RETRIEVAL COMPLETION" and uses this as the instruction code. This instruction code, however, is only an identification symbol (ID).

Registration step 1127 for line retrieval processing of FIG. 11 is roughly the same as for the registration of the card retrieval processing. However, designation of full page retrieval or designation of the page currently under processing is performed, and the range of cursor movement is limited to the headers of the fields. This line retrieval processing can be executed at a high speed in a case where a unit price is given as the result of a line retrieval, such as when investigating and processing a unit price in accordance with a quantity. At the beginning of registration of line retrieval processing, the real cursor is displayed on the initial repetition field.

Registration step 1128 for the completion of the line retrieval processing of FIG. 11, like step 1124, displays "LINE RETRIEVAL COMPLETION" and uses this as the instruction code. The instruction code, however, is only an identification symbol (ID). Then, the limitation on cursor movement is removed.

Figure 24:
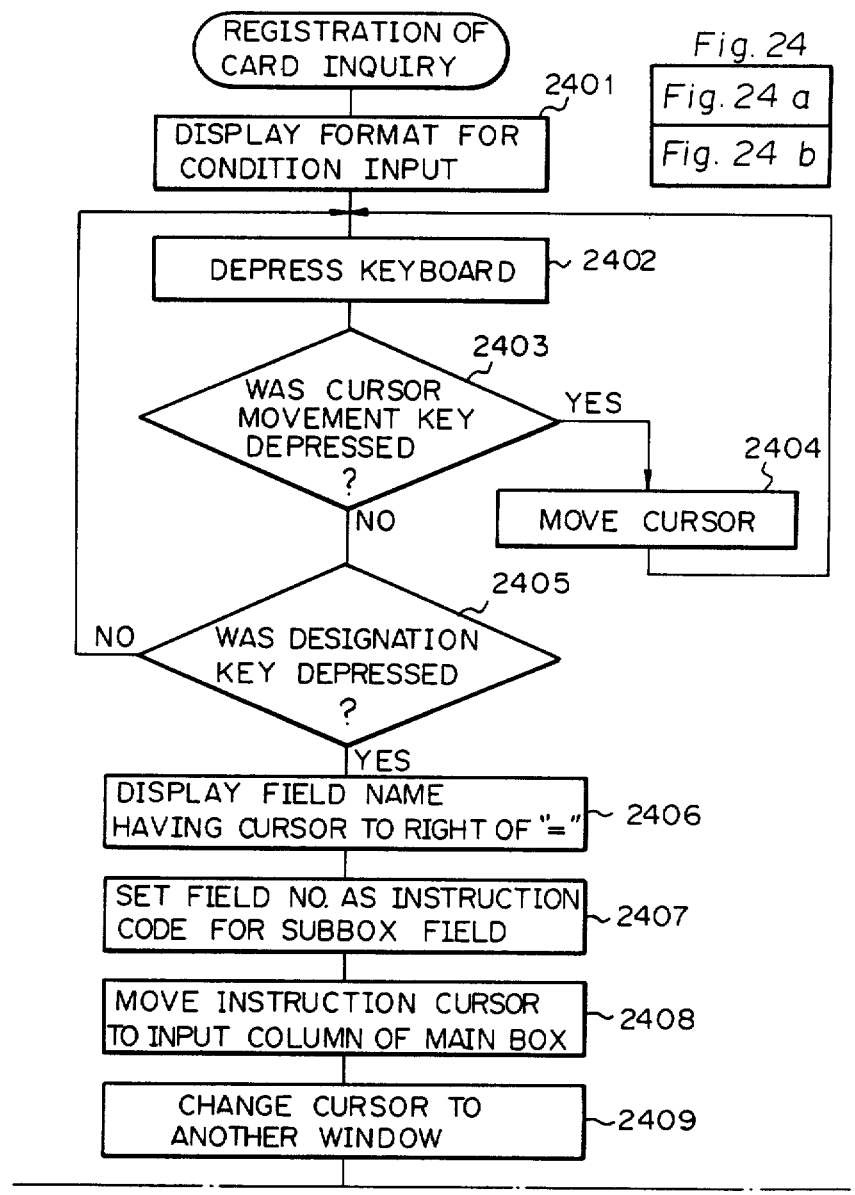
FIG. 24 including 24a and 24b, is a detailed flowchart of step 1131 of the card inquiry processing of FIG. 11.
Figure 24:
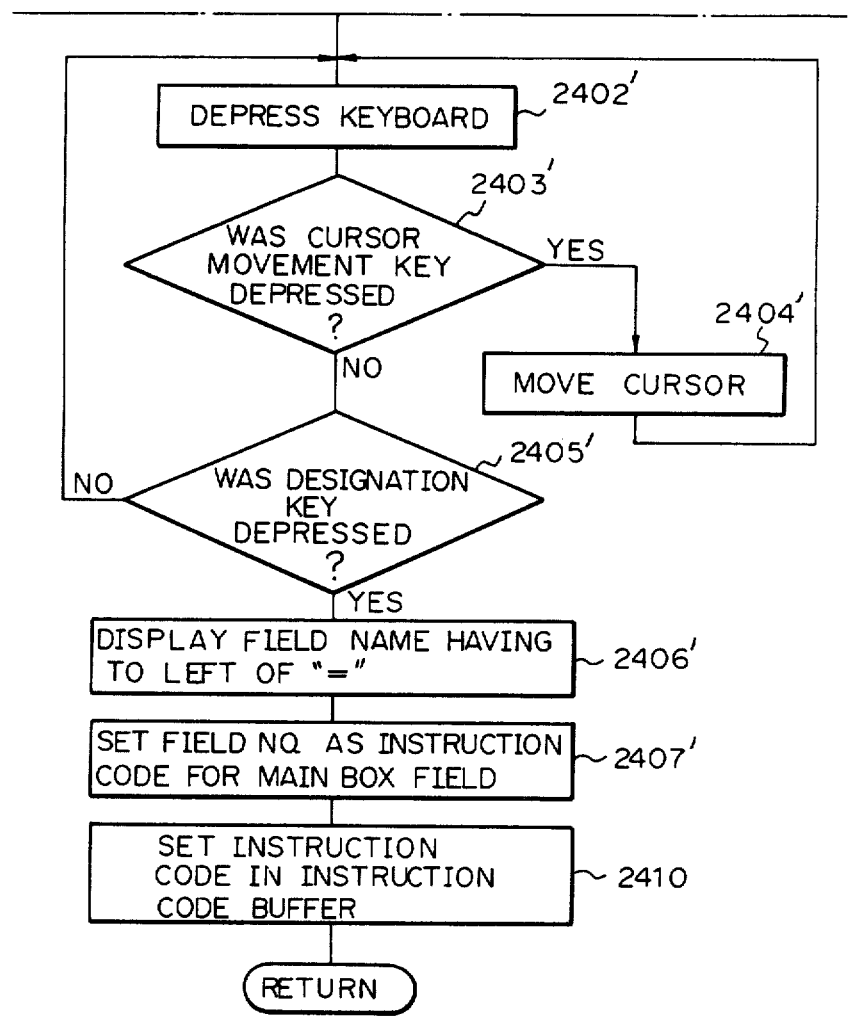

FIG. 24 is a detailed flowchart of registration step 1131 of the card inquiry processing of FIG. 11. Card inquiry processing enables continued retrieval and extraction of other card images having fields with contents the same as the field content designated on any one card image. At step 2401, the format for condition input is displayed as shown in FIG. 25. In this case, two boxes, i.e., the card image of a main box, for example, a personnel card, and the card image of a subbox, for example, a job card, are displayed. At step 2402, if a key of the keyboard 84 is depressed, different movement results in accordance with the key input, i.e., the input of a cursor movement key or designation key.

If a cursor movement key is depressed, control advances from step 2403 to step 2404, the cursor moves in the card image, and control returns to step 2402.

If the designation key is depressed, control advances from step 2405 to step 2406 and the name of the field where the real cursor resides is displayed to the right of "=", for example, "⑦ EMPLOYEE NUMBER". Also, at step 2407, the field number is set as the instruction code for the field of the subbox. Next, at step 2408, the instruction cursor is moved to left of the "=", i.e, the main box input column. At step 2409, the active window is changed to the window on the main box side. Then, as at steps 2402 to 2407, at steps 2402' to 2407', an instruction code is set for the field the main box side, for example, the field of ⑥ EMPLOYEE NUMBER. At step 2410, the instruction code with the data format as shown in FIG. 13D is stored in the instruction code buffer 1201 and the routine is completed.

Registration step 1132 of completion of the card inquiry processing of FIG. 11 also, as with step 1124, displays "CARD INQUIRY COMPLETION" and uses this as the instruction code. The instruction code, however, is only an identification symbol (ID).

Figure 26:
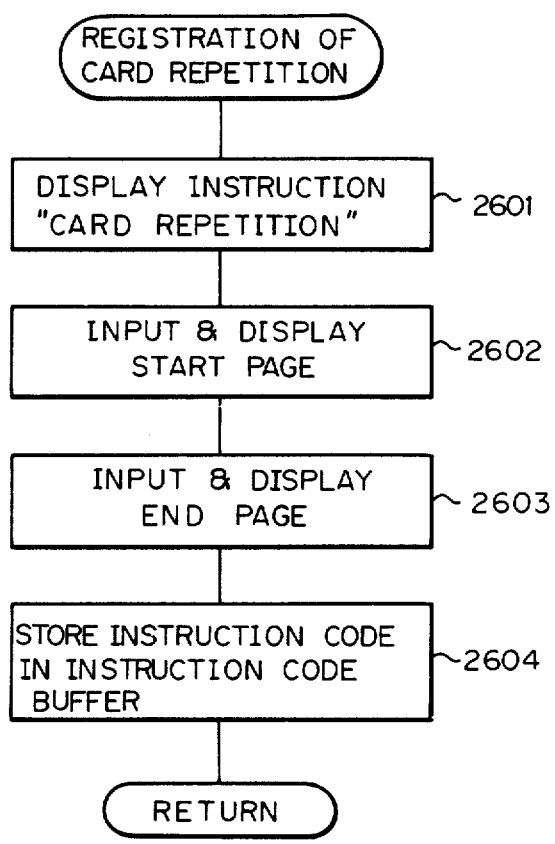
FIG. 26 is a detailed flowchart of registration step 1135 of the card repetition processing of FIG. 11.

FIG. 26 is a detailed flowchart of registration step 1135 of the card repetition of FIG. 11. Card repetition processing enables successive execution at a high speed of common processing over a plurality of card images by preparing a series of processing instructions in advance, rather than giving individual processing instructions, since the number of card images may be large. An example of such a display is given in lines 01 to 06 in the instruction window of FIG. 7. At step 2601, "CARD REPETITION" is displayed and the box of the active window is taken as the object of the repetition. Next, at step 2602, the start page is input and displayed. At step 2603, an end page is input and displayed. At step 2604, the instruction code of the data format shown in FIG. 13E is stored in the instruction code buffer 1201. By this, the routine of FIG. 26 is completed. For example, when the page designation is P.0001 to P.0000, P.0000 means the last page.

Registration step 1132 of the completion of the card repetition processing of FIG. 11, like step 1124, means "CARD REPETITION COMPLETION" and uses this as the instruction code. The instruction code, however, is only an identification symbol (ID). ·

Figure 27:
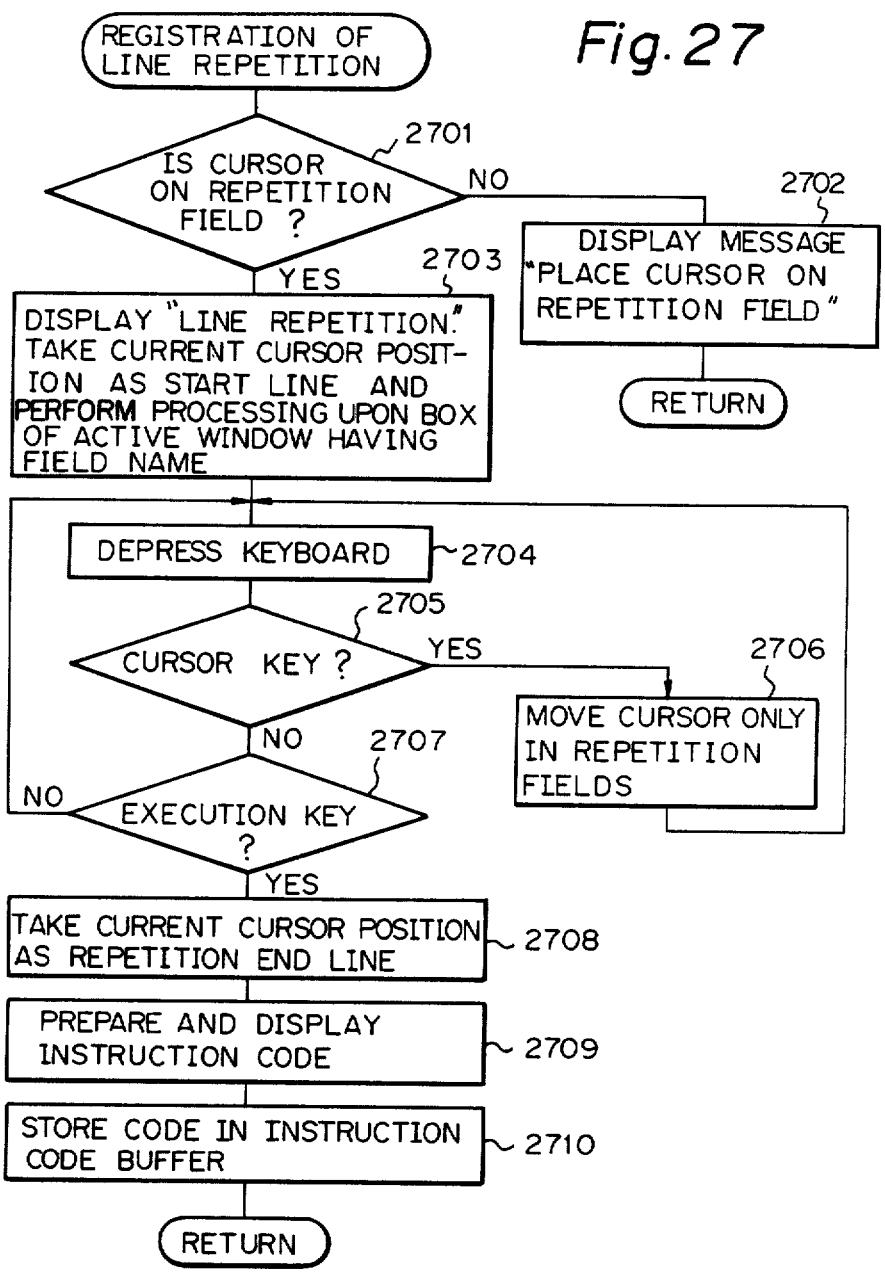
FIG. 27 is a detailed flowchart of registration step 1139 of the line repetition processing of FIG. 11.

FIG. 27 is a detailed flowchart of registration step 1139 of the line repetition processing of FIG. 11. Line repetition processing is for repetition fields and enables repetition of common processing for each line without having to give processing instructions for each line. An example of this display is shown in lines 02, 03, and 04 of the instruction window of FIG. 7. First, at step 2701, it is determined whether or not the cursor is on a repetition field. When not on the repetition field, at step 2702, the message "PLACE CURSOR ON REPETITION FIELD" is displayed and the routine is completed. In other words, in this case, the line repetition processing registration instruction is ignored. When the result of determination at step 2701 is positive, at step 2703, the instruction "LINE REPETITION" is displayed. In this case, the current cursor position is taken as the start line, and repetition processing will be performed upon the box of the active window displaying the field name. Extraction of the field name is accomplished by the routine of FIG. 14.

Next, at step 2704, if a key of the keyboard is depressed, different movement results depending on the key input, i.e., the input of a cursor movement key or the execution key. If a cursor movement key is depressed, control advances from step 2705 to step 2706 and the cursor moves only on the repetition fields. In other words, in this case, the range of movement of the cursor is limited to the repetition fields. Further, if the execution key is depressed, control advances from step 2707 to step 2708 and the current cursor position is used as the line of repetition completion. At step 2709, the instruction code is prepared and displayed. At step 2710, the instruction code of the data format shown in FIG. 13E is stored in the instruction code buffer 1201. After step 2710, the mode setting which limits the above range of movement of the cursor to within the repetition fields is released and mode is set to limit the range of movement of the cursor to the independent fields and the header lines of the repetition fields.

Registration step 1140 of the completion of the line repetition processing of FIG. 11 also, like step 1124, displays "LINE REPETITION COMPLETION" and uses this as the instruction code. The instruction code, however, is only an identification symbol (ID). Further, the limitation on cursor movement is released.

Registration step 1147 of the conditional branching of FIG. 11 executes the instruction only when the set condition is satisfied, there being a single conditional branching condition. Registration of this condition is performed by the same method as a single condition of the card retrieval conditions. The format of the instruction code for conditional branching is shown in FIG. 13G. An example of the display of entry of conditional branching is shown in FIG. 28. In this example, the next processing "ESTIMATE×0.95=ESTIMATE" is executed only when estimate>100,000 yen.

Registration step 1148 of the completion of conditional branching of FIG. 11, like step 1124, displays "CONDITIONAL BRANCHING COMPLETION" and uses this as the instruction code. The instruction code, however, is only an identification symbol (ID).

Figure 29:
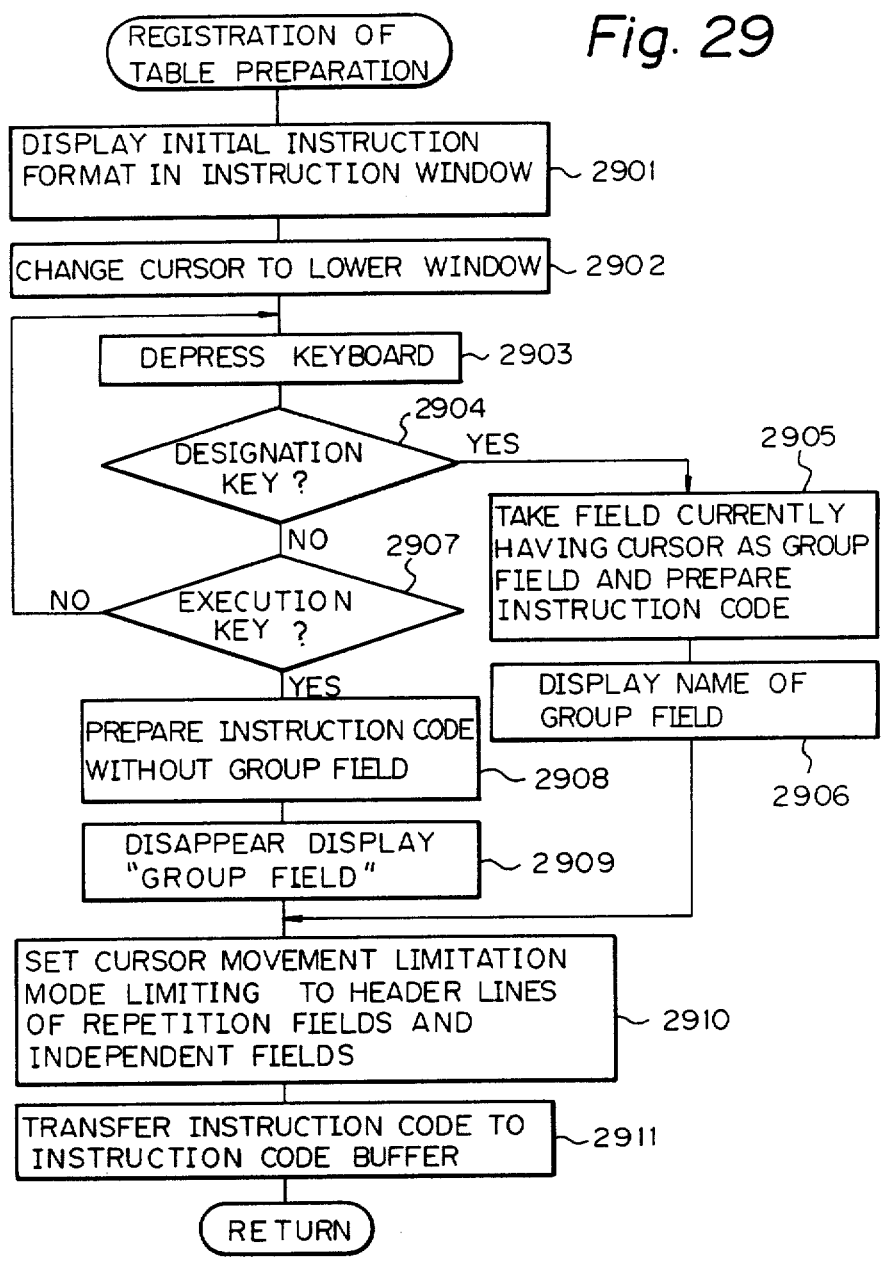
FIG. 29 is a detailed flowchart of registration step 1151 of the table preparation processing of FIG. 11.
Figures 30A, 30B:
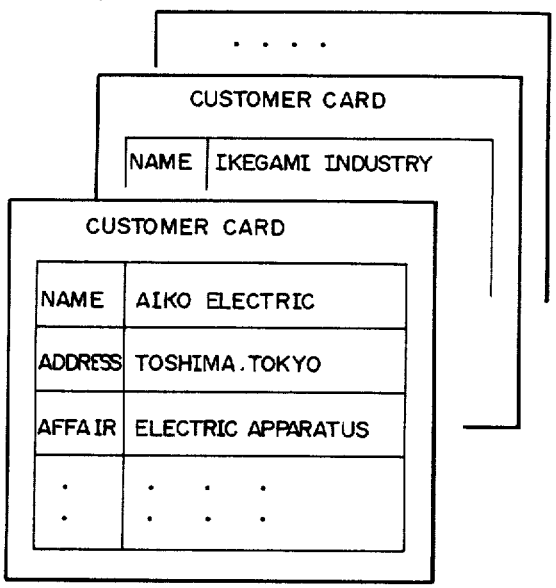
FIG. 30 is a view explaining the principle of the table preparation.

FIG. 29 is a detailed flowchart of registration step 1151 of the table preparation processing of FIG. 11. Table preparation processing is for preparing a table as shown in FIG. 30(B) while displaying the plurality of card images as shown in FIG. 30(A) and executing the processing instructions. At step 2901, the initial format of the instruction is displayed in the instruction window. In this case, as shown in FIG. 31, the table card image is displayed in the first window 41 and the card image of the box being processed is displayed in the second window 42. Further, the real cursor is first displayed in the first window 41. At step 2902, the active window is changed to the window 42. At step 2903, a key of the keyboard is depressed. As a result, operation starts from a key input, i.e., a key input of the designation key or execution key. If the designation key is depressed, control advances from step 2904 to step 2905, the field where the cursor is currently located is designated as a group field, and the instruction code is prepared. At step 2906, the name of the group field is displayed. Here, by designating a group field, it is, for example, possible to retrieve card images belonging to a customer card box in accordance with a line of business, such as electronic equipment, to assembly them in a group, and thus prepare a table with the grouped card images separated by business lines.

If the execution is depressed at step 2903, control advances from step 2907 to step 2908 and the instruction code is prepared without the group field. At step 2909, the display "GROUP FIELD" displayed as the initial format disappears. At step 2910, the cursor movement limitation mode limiting the range of cursor movement to the header lines of the repetition fields and to independent fields is set. At step 2911, the instruction code shown in FIG. 13H is stored in the instruction code buffer 1201 and the routine of FIG. 29 is completed.

Registration step 1152 of the completion of the table preparation of FIG. 11 displays "TABLE PREPARATION COMPLETION" and prepares the instruction code of only the identification symbol (ID). Then, at step 2910, the set limitation mode is released.

Figure 32:
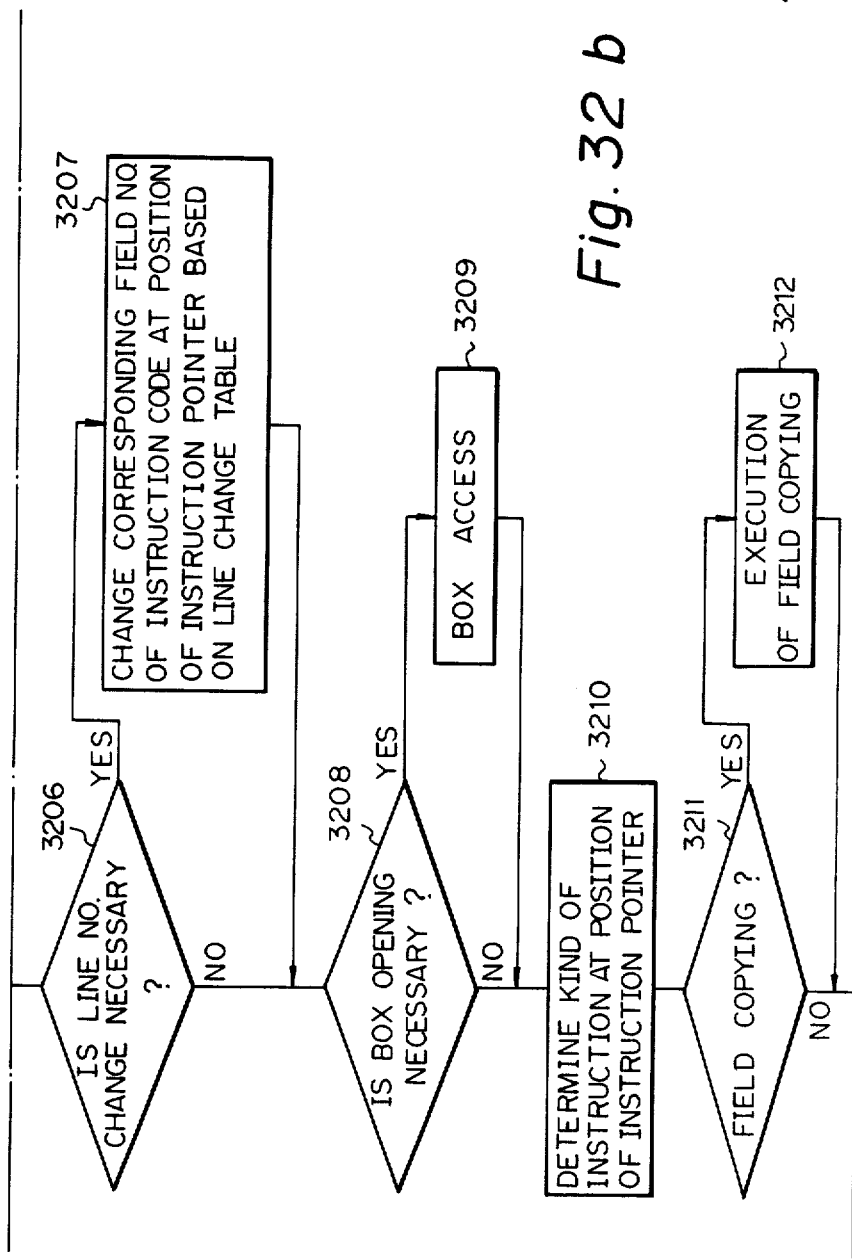
FIG. 32, including 32a–32g, is a detailed flowchart of step 1106 of instruction execution of FIG. 10.
Figure 32:
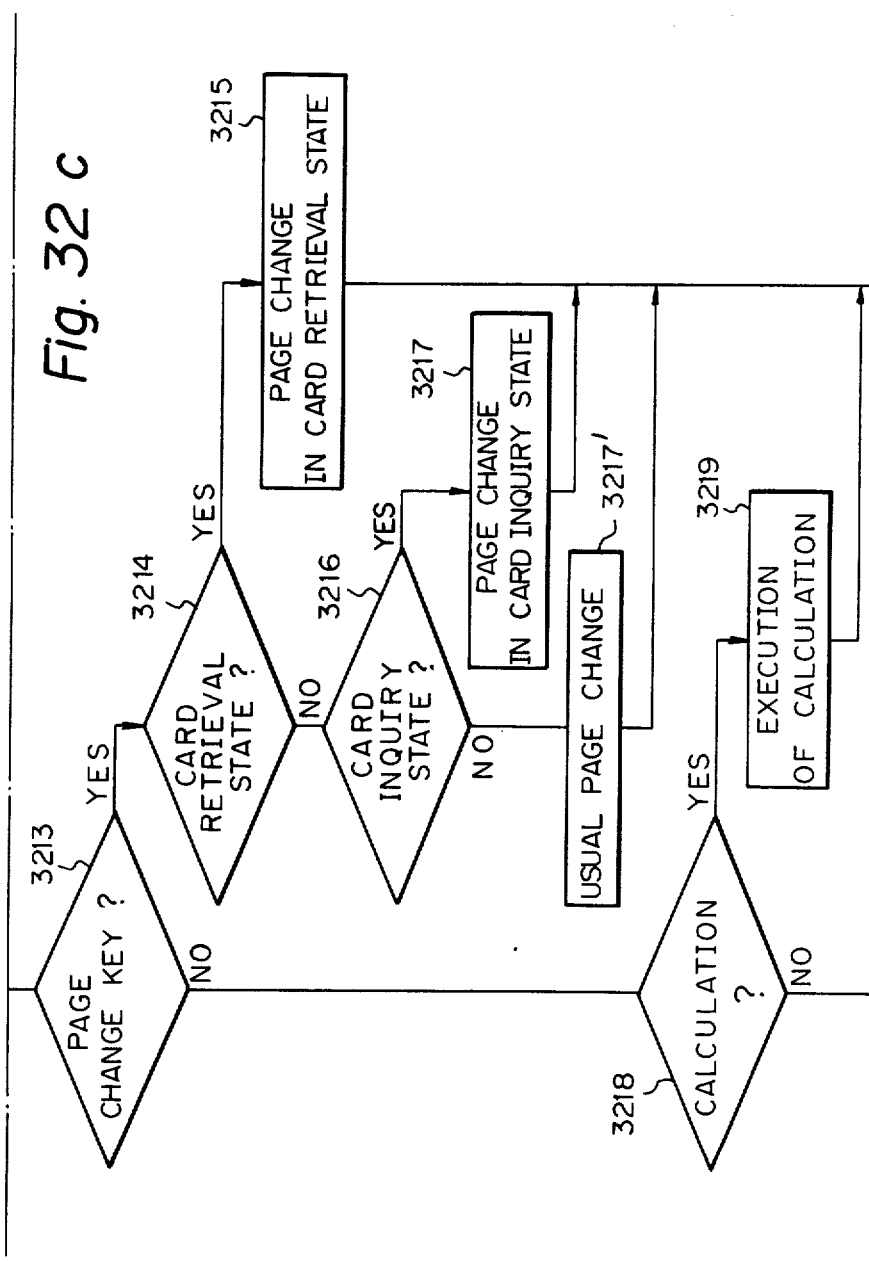
Figure 32:
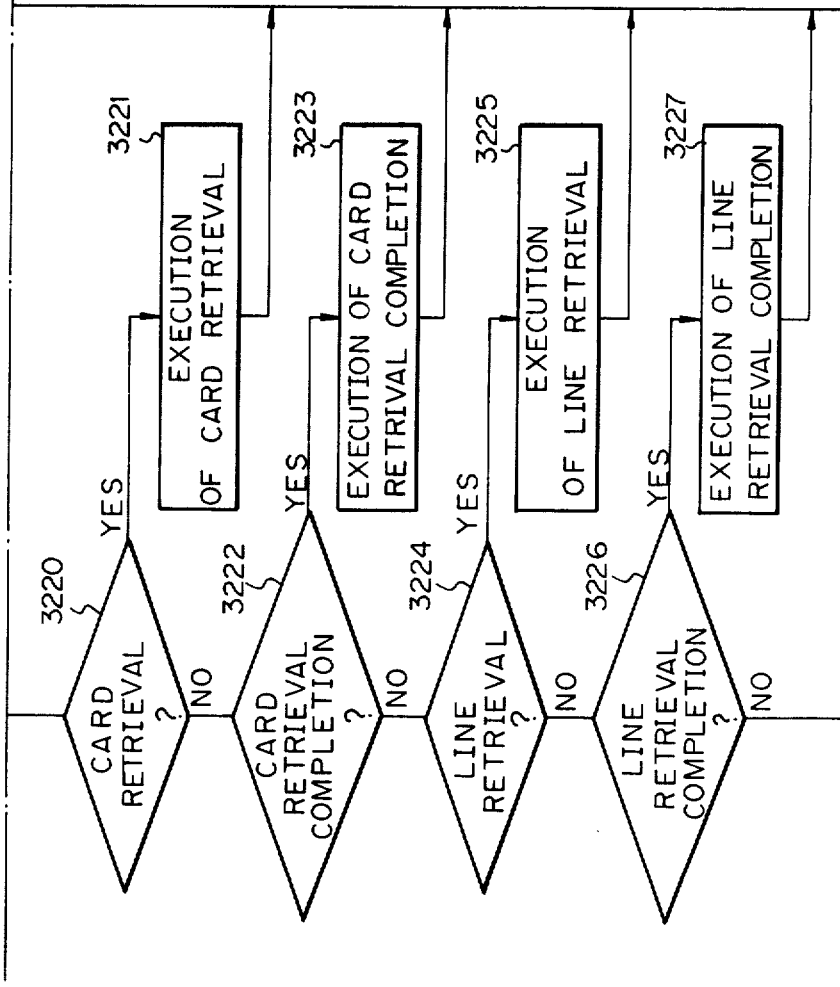
Figure 32:
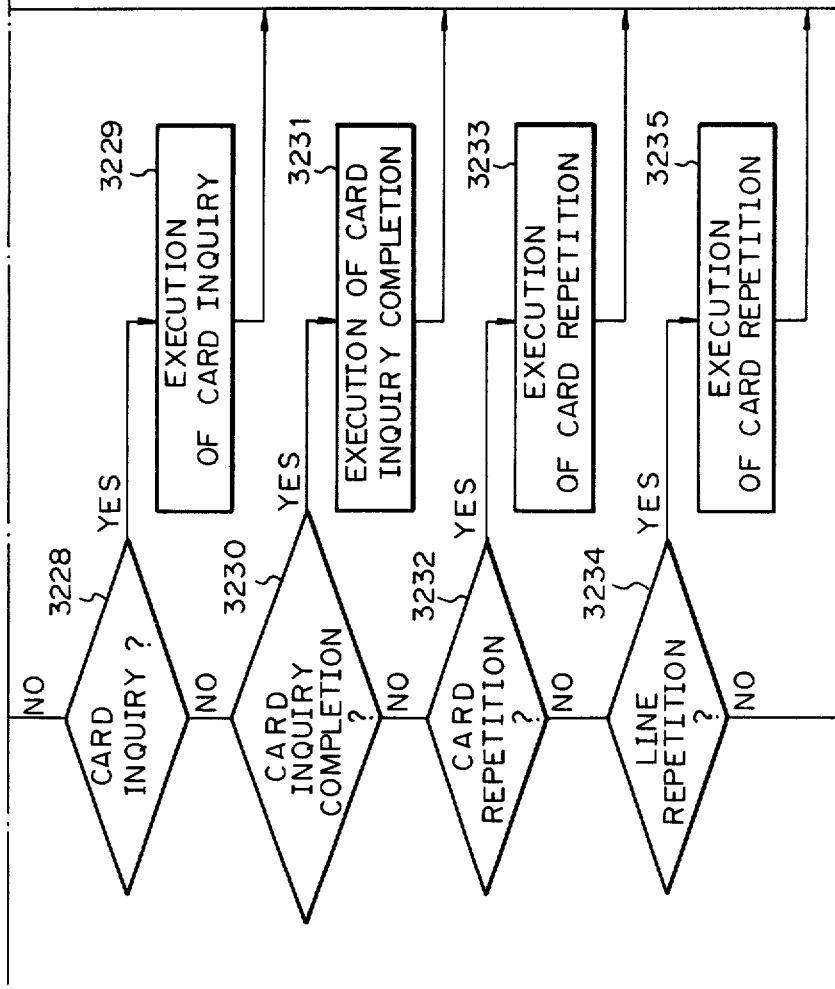
Figure 32:
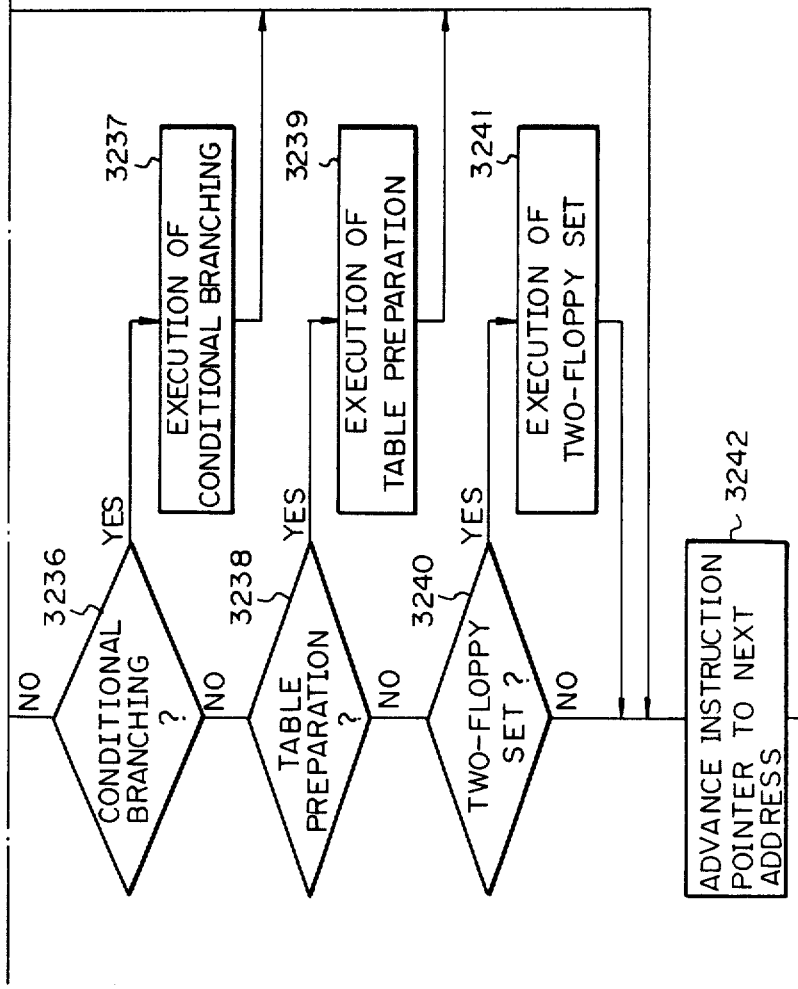

FIG. 32 is a detailed flowchart of instruction execution step 1006 of FIG. 10. First, the instruction code of the processing instruction to be executed is loaded into the instruction code buffer 1201 from the floppy disk 90. At step 3201, the header address of the instruction code buffer 1201 is loaded into empty header address pointer 1207. Next, the processing mode selection menu is displayed on the instruction window as shown in FIG. 33 (A). In this case, there are three available processing modes:

1. Display of interim results
2. No display
3. Execution of a one instruction for each striking of key.

Next, at step 3203, if a key of the keyboard is depressed, it is confirmed at step 3204 whether the number defined for the above processing mode is 1, 2, or 3. Specifically, if the numeric key "1", "2", or "3" is depressed at step 3205, the selected mode is set in the display mode area 1207 (see FIG. 12).

At step 3205, if the "1" mode is selected, the execution mode becomes the continuous execution display mode. If the execution key is continuously depressed, the interim results are continuously and successively displayed and the processing instructions are continuously executed. Therefore, it is possible to check the execution of the instructions on the display screen. FIG. 33(B) shows the display screen at this time. As a card image of interim results, the card image under processing at this time is merged and displayed with the data of the processing results. When all the processing of the processing instructions is completed, the final results are displayed as shown in FIG. 33(C).

Further, at step 3205, if the "2" mode is selected, the execution mode becomes the normal mode and interim results are not displayed. Only the final results as shown in FIG. 33(C) are displayed.

If the "3" mode is selected at step 3205, the execution mode becomes the processing unit execution display mode. Then, if the execution key is depressed, one instruction of the entry processing instruction is executed, the result is displayed, and then the processing is stopped. Next, when advancing by one next instruction after another, each time a key other than the completion key, for example, is input, execution, display, and stop are repeated. Therefore, this mode is extremely convenient for checking the registered instruction.

Returning to FIG. 32, at step 3206, it is determined whether or not a line number change is necessary. A line number change is necessary only when in a line retrieval state. Therefore, the state is determined by the line retrieval state flag of the current registration state area 1206 (FIG. 12). At step 3206, if the result of determination is positive, at step 3207, the corresponding field number in the instruction code of the position of the empty header address pointer 1202 is changed based on the line change table.

At step 3208, it is determined whether or not box opening is necessary. For example, opening of a box ② is necessary when processing a calculation equation ①A+ ②B= ①C. In this case, at step 3209, box access is performed. In other words, the box profile information, form data, field definition information, field name, and card data for the box ② is loaded from the floppy disk 90 to the areas of the RAM 82.

At step 3210, the type of instruction is determined by the contents of the area of the instruction code buffer 1201 designated by the pointer 1207 (in this case, the area of the header address), i.e., the identification symbol ID shown in FIGS. 13A to 13H.

At step 3211, it is determined whether or not the instruction is for field copying. If the result of determination is positive, field copying is executed at step 3212.

If a page change key is depressed, control advances from step 3213 to step 3214. As a result, if in the card retrieval state, control advances from step 3214 to step 3215 and a page change at the card retrieval state is performed. If in the card inquiry state, control advances from step 3214 through step 3216 to step 3217, where a page change at the card inquiry state is performed. In other cases, a normal page change is performed at step 3217'. Steps 3215 and 3217' are explained later in more detail.

If a page change key is not depressed at step 3213, a different operation is performed depending on the result of determination of step 3210.

When the result of determination at step 3210 is for calculation processing, control advances from step 3218 to step 3219 and calculation processing is executed.

When the result of determination at step 3210 is for card retrieval processing, control advances from step 3220 to step 3221 and card retrieval processing is executed.

When the result of determination at step 3210 is for card retrieval completion processing, control advances from step 3222 to step 3223 and card retrieval completion processing is executed.

When the result of determination at step 3210 is for line retrieval processing, control advances from step 3224 to step 3225 and line retrieval processing is executed.

When the result of determination at step 3210 is for line retrieval completion processing, control advances from step 3226 to step 3227 and line retrieval completion processing is executed.

When the result of determination of 3210 is for card inquiry processing, control advances from step 3228 to step 3229 and card inquiry processing is executed.

When the result of determination at step 3210 is for card inquiry completion processing, control advances from step 3230 to step 3231 and card inquiry completion processing is executed.

When the result of determination at step 3210 is for card repetition processing, control advances from step 3232 to step 3233 and card repetition processing is executed. Card repetition completion is processed at step 3233.

When the result of determination at step 3210 is for line repetition processing, control advances from step 3234 to step 3235 and line repetition processing is executed. Line repetition completion is processed at step 3235.

When the result of determination at step 3210 is for conditional branching processing, control advances from step 3236 to step 3237 and conditional branching processing is executed. Conditional branching completion is processed at step 3237.

When the result of determination at step 3210 is for table preparation processing, control advances from step 3238 to step 3239 and table preparation processing is executed. Table preparation completion is processed at step 3239.

When the result of determination at step 3210 is for two-floppy set, control advances from step 3240 to step 3241 and two-floppy set is executed.

At step 3242, the address pointer 1202 is advanced to the next address.

At step 3243, it is determined whether or not the instruction is completed. If the instruction is completed, at step 3244, it is determined whether or not the mode is the nondisplay execution mode, i.e., whether or not the processing mode is "1". If the processing mode is "1" or "3", the current card contents are displayed at step 3245. In other cases, the routine is completed.

Further, when it is determined at step 3243 that the instruction is not completed, it is determined at step 3246 whether or not there is a completion key in the keyboard buffer. If there is a completion key, control returns to step 3202 and the processing mode is reset. If there is no completion key, it is determined at step 3247 whether or not the mode is the one-touch forward mode, i.e., whether or not the processing mode is "3". If the processing mode is "3", at step 3248, the next key input is awaited and control returns to step 3206.

Figure 34:
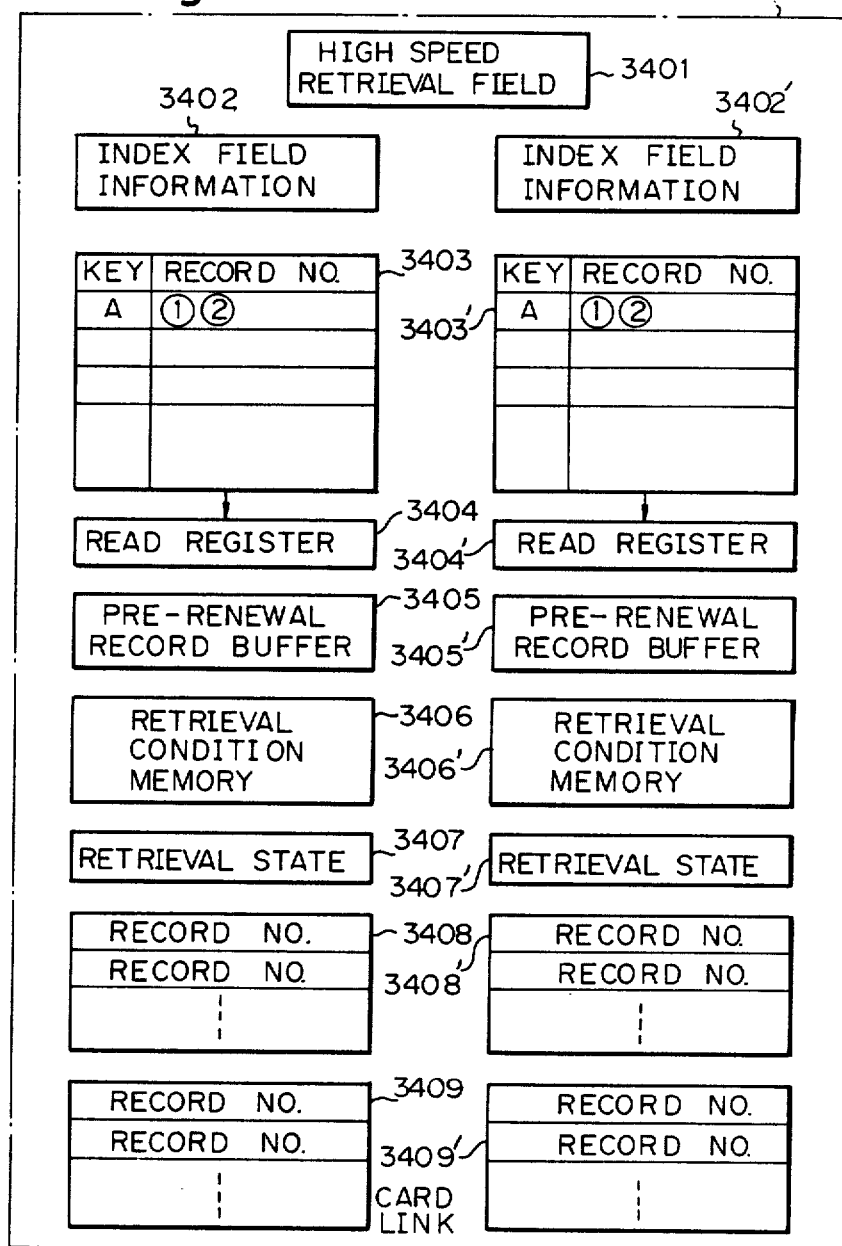
FIG. 34 is a block diagram showing part of the contents of the RAM of FIG. 8.

Next, an explanation will be made of the important steps in the flow of FIG. 32. Before that, however, an explanation will be made of the data table used in the execution routine of FIG. 32 with reference to FIG. 34. Incidentally, the blocks of FIG. 34 are housed in, for example, the RAM 82 of FIG. 8. Reference numeral 3401 is a high speed retrieval field area which, in retrieval processing, sets the retrieval field in cases where the contents of the later-mentioned index buffer 3403 or 3403' can be utilized for retrievals. Retrieval processing is performed based on the corresponding field.

Elements 3402 to 3409 and 3402' to 3409' are provided for each box loaded in the RAM 82. In other words, they are provided for each opened box. Here, it is assumed the maximum number of opened boxes is two, but there of course may be three or more.

For holding the index, an index field information area 3402 (3402'), an index buffer 3403 (3403'), a read register 3404 (3404'), and a pre-renewal record buffer 3405 (3405') are provided. The index corresponds to a index table for the individual fields or their contents on the card images. A record number (corresponding to page number) of a card image having a read key for the individual fields or their contents (in the figure, "A") is held on the index buffer 3403 (3403') in the form of a combination with said read key. The index field information area 3402 (3402') may be thought of as management information for the index buffer 3403 (3403').

The contents of the index buffer are renewed in accordance with index save control, index load control, index renewal (update), etc. For example, in pre-renewal record buffer copy processing, when the contents of the record buffer 908 (908') of FIG. 9 are renewed, the prior contents of the the record buffer are copied and are housed in the pre-renewal record buffer 3405 (3405'). In index renewal (update), the difference between the contents of the renewed record buffer 908 (908') and the contents of the pre-renewal record buffer 3405 (3405') is extracted and the contents of the index buffer 3403 (3403') are renewed.

Further, for holding the retrieval link, a retrieval condition memory area 3406 (3406'), a retrieval state flag 3407 (3407'), and a retrieval link buffer 3408 (3408') are provided. In other words, a designated retrieval condition is set in the retrieval condition memory area 3406 (3406'), then the corresponding retrieval state flag 3407 (3407') is set and the retrieval control is activated. As a result, the retrieval condition is fetched from the retrieval condition memory area 3406 (3406'). In the retrieval, when it is possible to use the contents of the above-mentioned index buffer 3403 (3403'), a fetch operation is conducted to use the contents of the index buffer 3403 (3403') through the high speed field area 3401. On the other hand, when it is not possible to use the contents of the index buffer, the retrieval is successively performed using the contents of the record buffer 908 (908') shown in FIG. 9. Then, if a card image exists meeting one retrieval condition, the record number of the card image is successively loaded in the retrieval link buffer 3408 (3408'). The record numbers in the retrieval link buffer are used as the population for selecting the image meeting the next retrieval condition. The record numbers of the card image also meeting the second retrieval conditoin using an AND logic are left in the retrieval link buffer. The finally remaining record numbers are output as the retrieval results. Conversely, if the OR logic is used for the second retrieval condition, the record numbers of the card image meeting the second retrieval condition are added in the retrieval link area.

When performing retrieval processing, only those card images which meet the retrieval conditions are extracted from the card images of the given population. For this reason, each card image is expressed by page number, and record numbers are appended for processing for the card images extracted for each condition so as to facilitate the above-mentioned retrieval processing. For this reason, it is necessary that proper correspondence be maintained between the record number and the page number in the case of performing retrieval processing. Page number-record number conversion processing is therefore provided. In nonretrieval processing type sort processing, etc., the page number itself may be thought of as the record number.

New record numbers are appended to those images satisfying the first retrieval condition based on card data being supplied from the floppy disk 90. The record numbers are stacked in the retrieval link buffer 3408 (3408'). Then, if an AND logic condition, the check as to whether or not the second retrieval condition is satisfied is limited to just those images having record numbers stacked in the retrieval link buffer 3408 (3408'). In other words, the record numbers stacked on the retrieval link buffer 3408 (3408') are read out. Then, page number-record number conversion processing is performed and, then, only the desired card data is supplied to the record buffer 908 (908'). The final retrieval is given in the form of record numbers on any one of the retrieval link buffers 3408 (3408'). The display of the desired card image from the record number is left to the direction of the operator.

Sort processing is effected on the card data from the floppy disk 90. Sort processing is, for example, processing to rearrange in an ascending or descending order and has been in general use in the conventional art. The results are loaded in the card link buffer 3409 (3409') as record numbers in the case of the present invention. They may be thought of as being set for each display window. In sort processing as well, since the sort conditions are often given in stages, the record numbers loaded in the card link buffer 3409 (3409') are read out and used for the sort of the next condition. However, in this case, the page numbers and the record numbers may be thought of as being in a 1-to-1 correspondence.

Retrieval processing can also be effected using results further sorted by sort processing. In such a case, the retrieval results include the above sort results.

Figure 35:
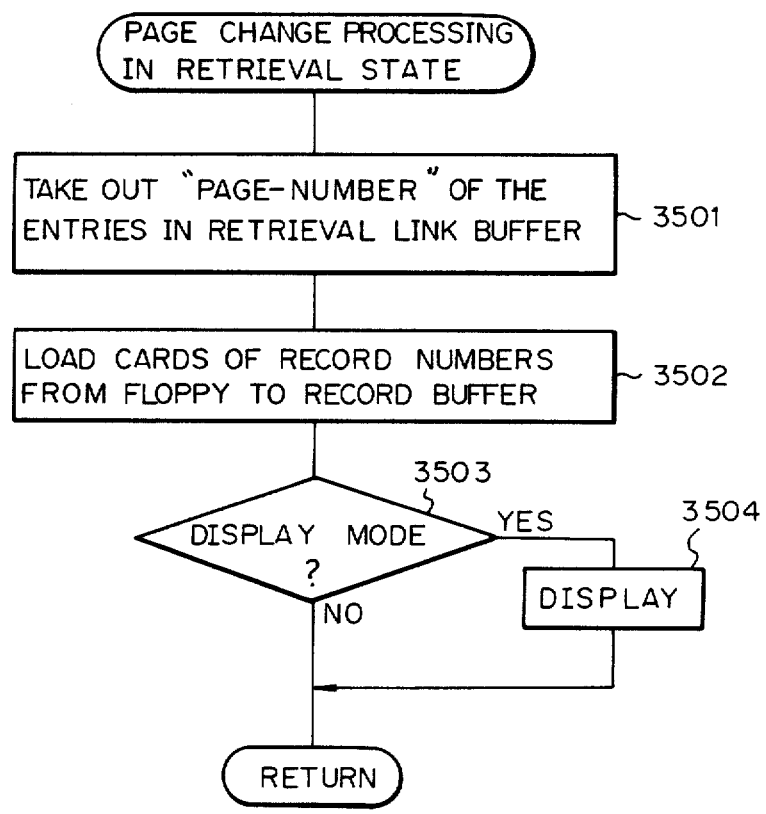
FIG. 35 is a detailed flowchart of step 3215 of FIG. 32.

FIG. 35 is a detailed flowchart of step 3215 of FIG. 32. This routine, if in the card retrieval state, selects only the card images satisfying the retrieval conditions. First, at step 3501, the "PAGE NUMBER" of the entries in the retrieval link buffer 3408 (3408') are taken out. In other words, as mentioned above, this is because only the record numbers satisfying the retrieval conditions are housed in the retrieval link buffer. At step 3502, the card images of the record numbers taken out at step 3501 are loaded from the floppy disk 90 to the record buffer 908 (908'). At step 3503, it is determined whether or not the display mode is the above-mentioned "1" or "3" mode. If the "1" or "3" mode, the loaded card images are successively displayed at step 3504. By this, the routine of FIG. 35 is completed.

Figure 36:
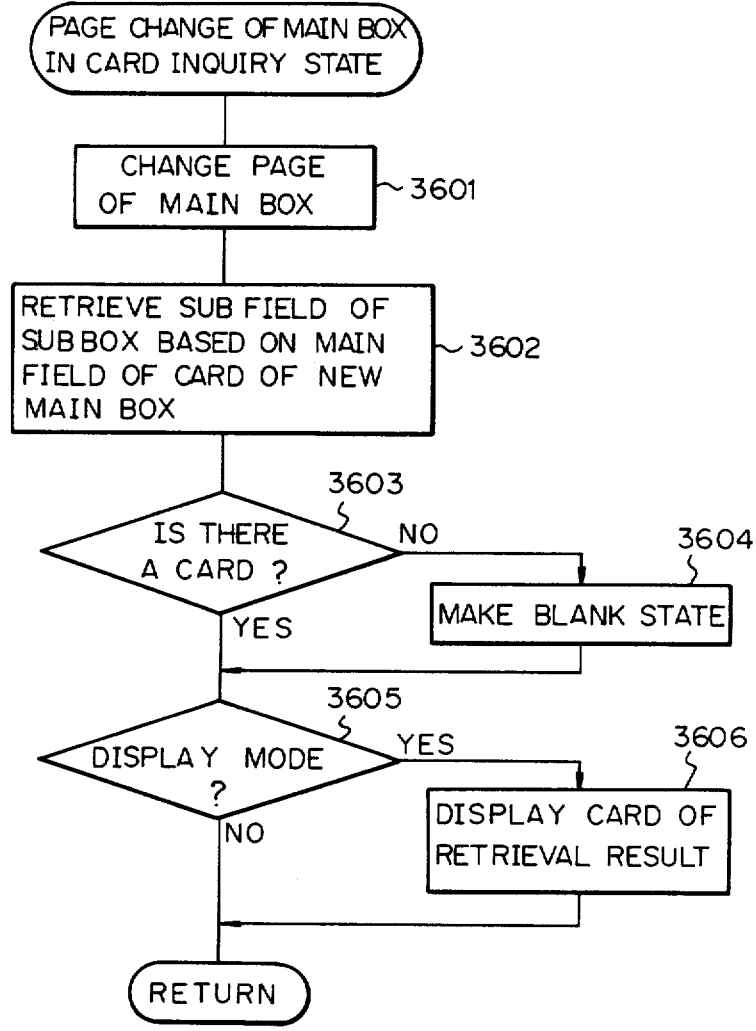
FIG. 36 is a detailed flowchart of step 3217 of FIG. 32.

FIG. 36 is a detailed flowchart of step 3217 of FIG. 32. In the card inquiry state, two windows, i.e., the window of the main box and the window of the subbox, are open. Based on this, the subbox card image is retrieved based on the card image of the main box. In other words, the subbox is taken as the object of the retrieval. Therefore, if the card image of the main box is changed at step 3601, the card image of the subbox is retrieved based on the field value placed in the new card image of the new main box at step 3602. At step 3603, it is determined whether or not the result of the retrieval at step 3602 is that there is a card image of the subbox. If there is a card image, it is determined at step 3605 whether or not the display mode is the abovementioned "1" or "3" mode. If the "1" or "3" mode, the card image of the retrieval result is displayed at step 3606. At this point, the routine of FIG. 36 is completed.

Figure 37:
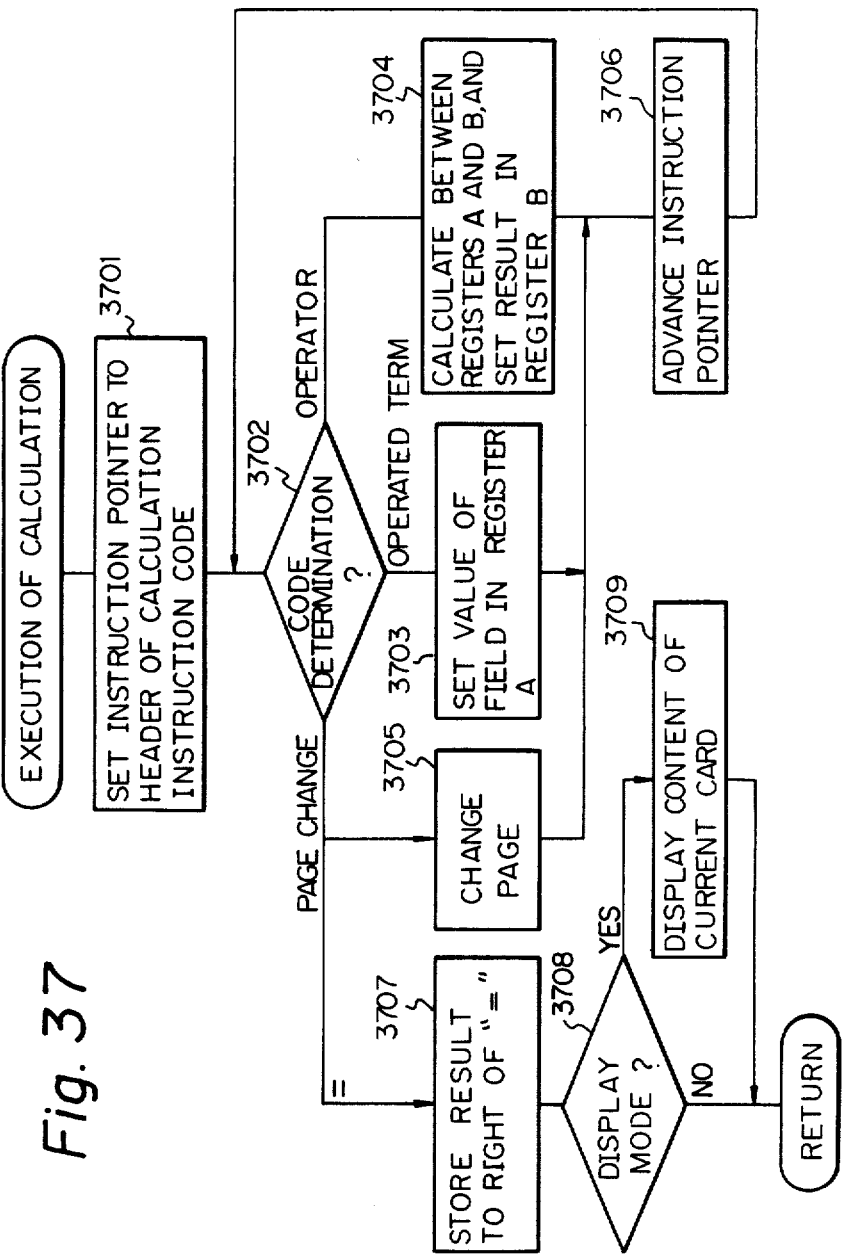
FIG. 37 is a detailed flowchart of step 3219 of FIG. 32.

FIG. 37 is a detailed flowchart of step 3219 of FIG. 32. At step 3701, the pointer 1202 is set to the header of the calculation instruction code. At step 3702, the code determination is effected. If the code is an operand defined by the field number and box number, the field value is loaded at step 3703 in to a register A (not shown) which acts as an accumulator. When the code is an operator such as ×, ÷, +, or −, a calculation is effected based on said operator between a result register B (not shown) and the register A. The results of the calculation are stored in the register B. When the code is for page change, the control of steps 3703, 3704 and 3705 advances to step 3706 and the pointer 1202 is advanced to the next address. If the code is "=" at step 3702, control advances to step 3707 and the results of the calculation are housed or stored in the field defined at the right of "=". Next, at step 3708, it is determined whether or not the display mode is the "1" or "3" mode. If the "1" or "3" mode, the card image of the retrieval results is displayed at step 3079. By this, the routine of FIG. 37 is completed.

Figure 38:
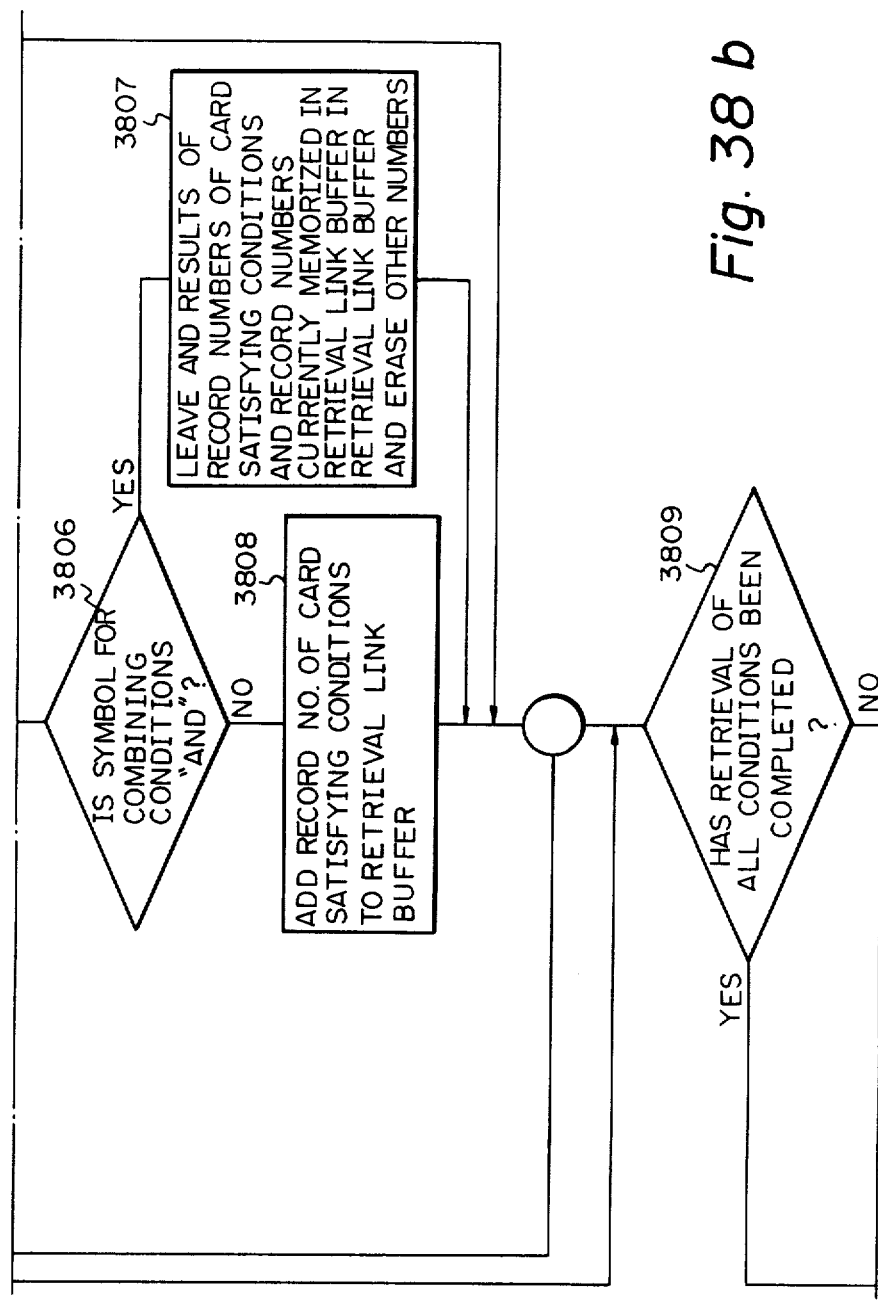
FIG. 38, including 38a–38d, is a detailed flowchart of step 3221 of FIG. 32.
Figure 38C:
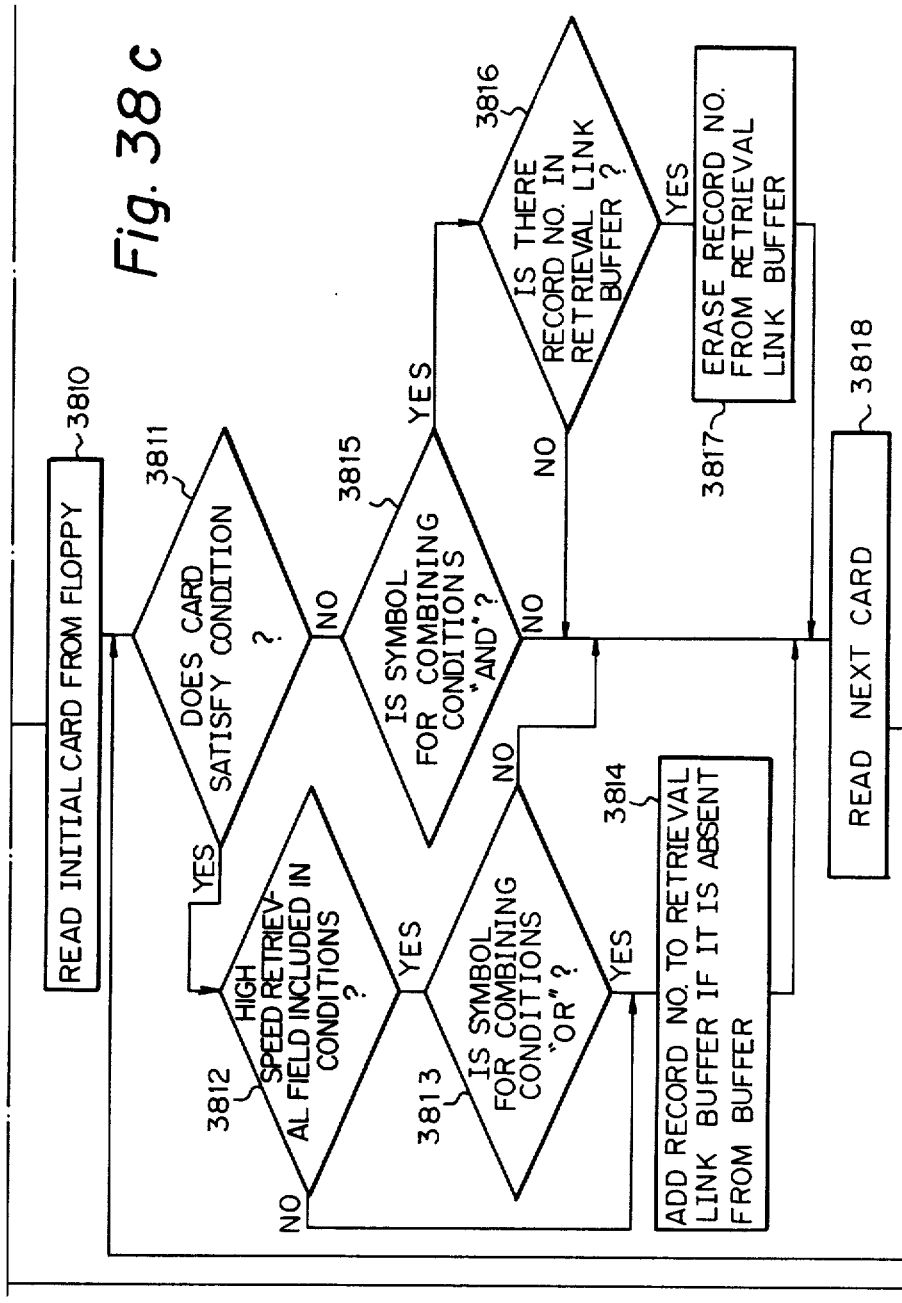
Figure 38:
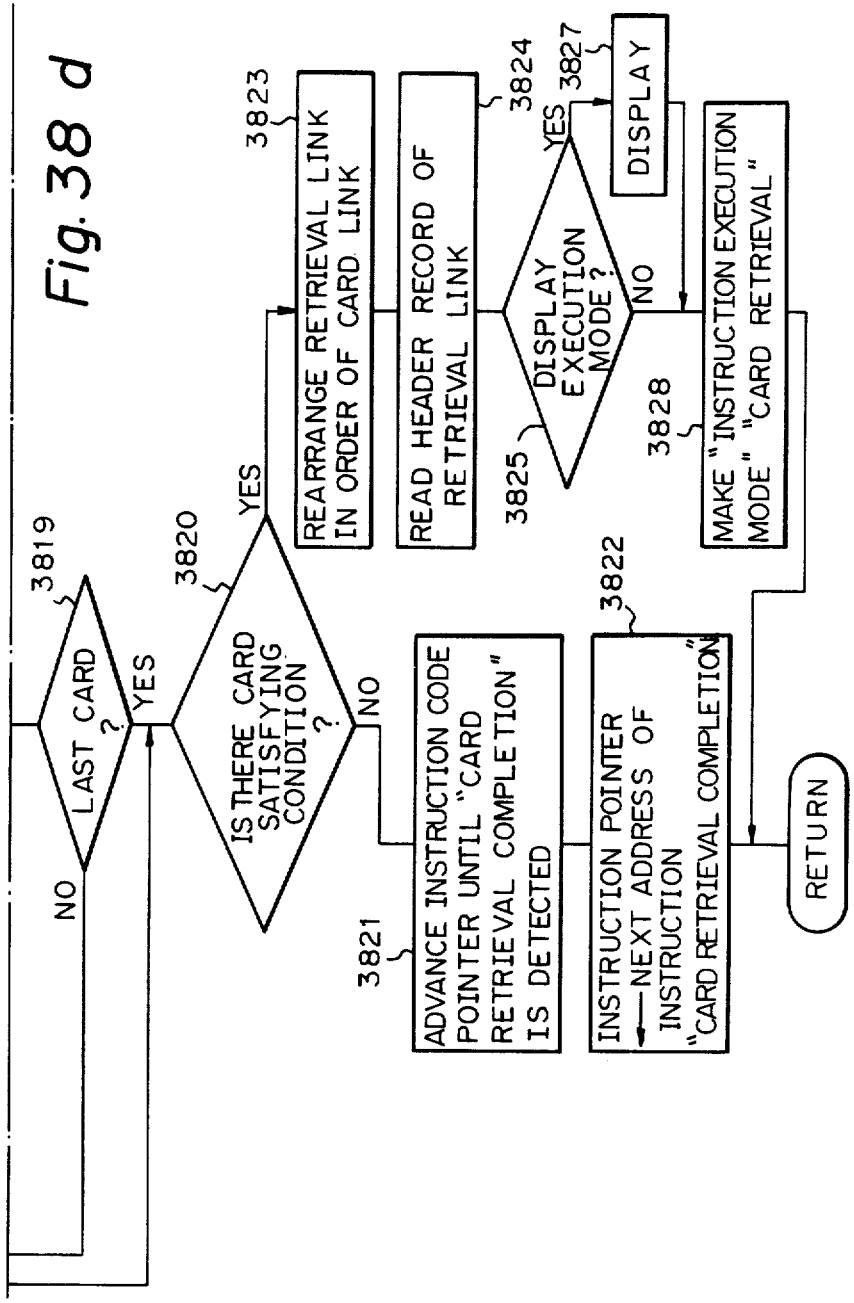

FIG. 38 is a detailed flowchart of step 3221 of FIG. 32. At step 3801, the card retrieval instruction code is taken out of the instruction code buffer 1201. At step 3802, it is determined whether or not a high speed retrieval field is included in the retrieval objective in reference to the high speed retrieval field area 3401. When a high speed retrieval field is covered by the retrieval, steps 3803 to 3808 are executed.

At step 3803, the index buffer 3804 (3804') is retrieved and the record numbers satisfying the conditions are extracted. In such a case, if another field of another box or the same box is given as a condition, a retrieval is conducted with the value of the corresponding field of the card currently under processing. At step 3804, it is determined whether or not the retrieval buffer is initially loaded. If not loaded, the record numbers satisfying the conditions are memorized at step 3805. In other words, the retrieval link buffer is initially loaded. On the other hand, if the retrieval buffer is initially loaded, control advances to step 3806. At step 3806, it is determined whether the symbol for combining the conditions is an AND logic symbol or an OR logic symbol. If an AND logic symbol, at step 3807, only the AND results of the record numbers of the card satisfying the conditions and the record numbers currently memorized in the retrieval link buffer 3408 (3408') are left in the retrieval link buffer and the other record numbers are erased. If the OR logic symbol, at step 3808, the record numbers satisfying the conditions are added to the retrieval link buffer. Of course, at step 3808, double entry is not performed. Such steps 3803 to 3808 are repeated for high speed retrieval fields covered by the retrieval.

When there are no high speed retrieval fields or when control of steps 3803 to 3808 for high speed retrieval fields covered by the retrieval is completed, control advances to step 3809. At step 3809, it is determined whether or not the retrieval of all the conditions has been completed. When not completed, steps 3810 to 3819 are executed. When completed, control advances to step 3820.

Steps 3810 to 3819 are executed for all conditions except those retrieved by index. First, at step 3810, the initial card is read from the floppy disk 90. However, if the retrieval link buffer 3408 (3408') is loaded, the first card of the same is read. The flow of control in steps 3811 to 3817 differs according to (1) whether or not the read card satisfies the conditions, (2) whether or not the retrieval condition is the first condition, and (3) whether the combination of the conditions is by AND logic or OR logic.

If the card satisfies the conditions, control advances from step 3811 to step 3812 and it is determined whether or not a high speed retrieval field is included in the conditions. If not included, the record number of the card is added at step 3814 to the retrieval link buffer. Further, even if the result of the determination at step 3812 is positive, if the combination of the conditions is OR, control advances through step 3813 to step 3814.

If the combination of conditions is AND, control advances from step 3813 to step 3818 and no change is made on the retrieval link buffer.

If the card does not satisfy the conditions, the flow of control advances from step 3811 to step 3815. If the combination of conditions is by OR logic, no change is made on the retrieval link buffer. If the combination of conditions is by AND logic, at step 3816 and it is determined whether the record number of that card is in the retrieval link buffer. As a result, if that record number is in the retrieval link buffer, the flow of control advances to step 3817, in which that record number is erased from the retrieval line buffer.

At steps 3818 and 3819, control of steps 3811 to 3817 is repeated for all of the cards.

At step 3820, it is determined whether or not there is a card satisfying a series of conditions, i.e., first, second, ... conditions of the AND logic or OR logic combinations. If there is not even one card satisfying the conditions, the pointer 1202 is advanced at step 3821 until "CARD RETRIEVAL COMPLETION" is detected. At step 3822, the pointer 1202 indicates the address of the "CARD RETRIEVAL COMPLETION" instruction.

On the other hand, if there is a card at step 3820, the record number of the retrieval link buffer is rearranged at step 3823 in the order memorized in the card link buffer. At step 3824, the record of the header of the retrieval link buffer is read from the floppy disk. At step 3825, it is determined whether the display mode is the above-mentioned "1" or "3" mode. If the "1" or "3" mode, the card image of the retrieval results is displayed at step 3827. At step 3828, the "INSTRUCTION EXECUTION MODE" is made "CARD RETRIEVAL".

At step 3223 of the execution of the card retrieval completion of FIG. 32, the card retrieval state flag 3407 (3407') of the "INSTRUCTION EXECUTION MODE" is reset and the routine completed.

Figure 39:
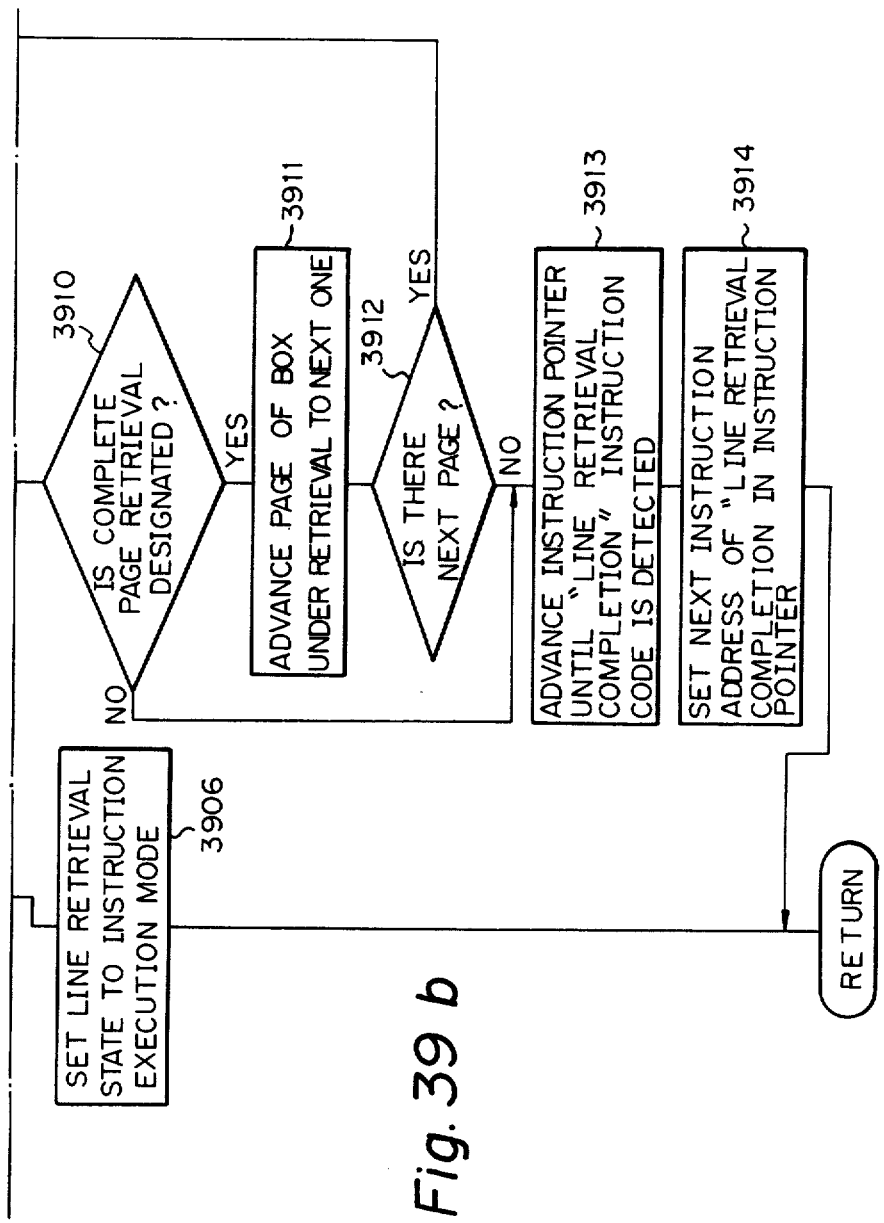
FIG. 39 including 39a and 39b, is a detailed flowchart of step 3225 of FIG. 32.

FIG. 39 is a detailed flowchart of step 3225 of FIG. 32. At step 3901, the line retrieval instruction code is taken out from the instruction code buffer 1201. At step 3902, the line pointer (not shown) is set to the header line of the repetition fields of the field definition information table 905 (905'). At step 3903, it is determined whether or not the line of the current position of the line pointer satisfies the retrieval conditions. Incidentally, when another field is the condition, a comparison is made with the contents of the fields of the corresponding field number of the page currently under processing for both the same box and other boxes. If the result is that the conditions are satisfied, control advances from step 3904 to step 3905 and the current value of the line pointer is stored in the line conversion table (not shown). Next, at step 3906, the line retrieval state is set to the "INSTRUCTION EXECUTION MODE" and the routine is completed. The line conversion table shows the correspondence between the line number in the instruction code buffer and the line number of the line pointer. This is, as shown in FIG. 12, based on the fact that these two line numbers generally do not match.

If the result of determination at step 3904 is negative, at steps 3907 and 3908, if the line pointer does not indicate the final line of the repetition fields, its value is increased by one and control returns to step 3902. If the line pointer indicates the final line of the repetition field, control advances from step 3907 to step 3908 and it is determined whether or not a complete page retrieval is designated. If a complete page retrieval is designated, the above-mentioned steps are executed on the card of the next page by steps 3911 and 3912 until a line satisfying the conditions is detected.

If a complete page retrieval is not designated at step 3910, control advances to step 3913. Further, even if a complete page retrieval is executed, if a line satisfying the conditions is detected, control advances to step 3913.

At step 3913, the pointer 1202 is advanced until a "LINE RETRIEVAL COMPLETION" instruction code is detected. In other words, when there is no repetition field satisfying the line retrieval conditions, the instruction between the line retrieval and the line retrieval completion is not executed. At step 3914, the address of the next instruction after "LINE RETRIEVAL COMPLETION" is set in the pointer 1202 and the routine is completed.

At step 3227 of the execution of the line retrieval completion of FIG. 32, the line retrieval state flag 3407 (3407') of the "INSTRUCTION EXECUTION MODE" is reset and the routine is completed.

Figure 40:
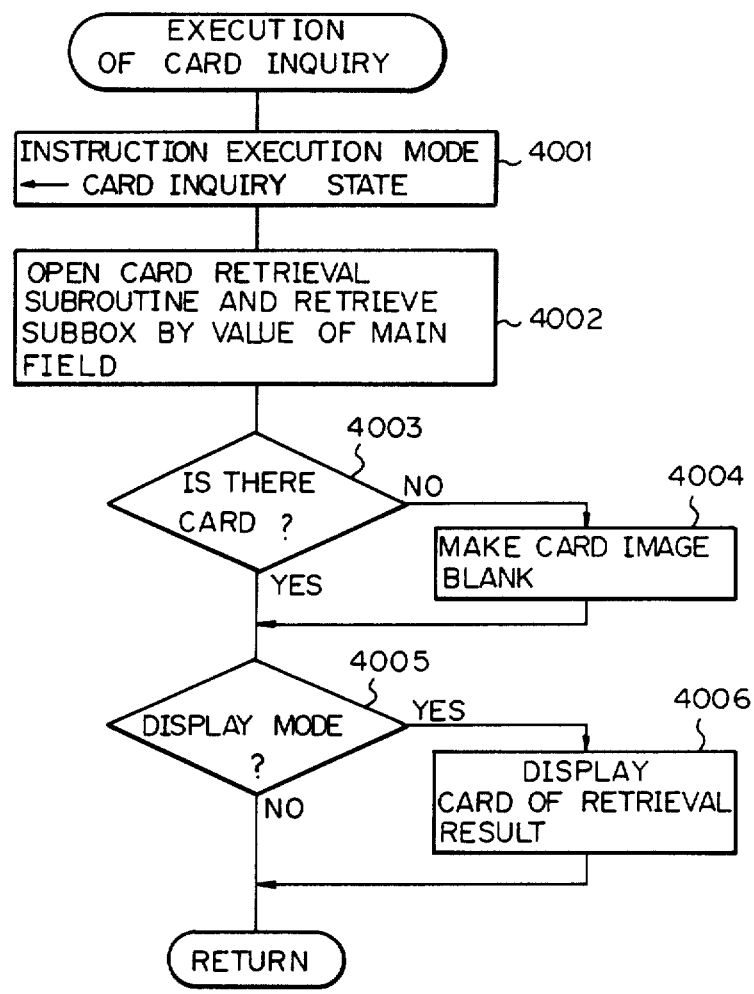
FIG. 40 is a detailed flowchart of step 3229 of FIG. 32.

FIG. 40 is a detailed flowchart of step 3229 of FIG. 32. First, at step 4001, the card inquiry instruction code is taken out from the instruction code buffer 1201. At step 4002, the card retrieval subroutine (see FIG. 38) is used so as to retrieve the card of the subbox by the value of the main field. If the result is that there is no card, control advances from step 4003 to step 4004 and the card image of the window of the subbox is made blank. In other words, it is made a card image with no card data but only form data. At step 4005, it is determined whether or not the display mode is the above-mentioned "1" mode. If the "1" mode, the card image of the retrieval results is displayed at step 4006.

At step 3231 of the execution of card inquiry completion of FIG. 32, the card inquiry state flag 3407 of the "INSTRUCTION EXECUTION MODE" is reset and, further, the "CARD RETRIEVAL COMPLETION" subroutine called up for the subbox, then the routine is completed.

Figure 41A:
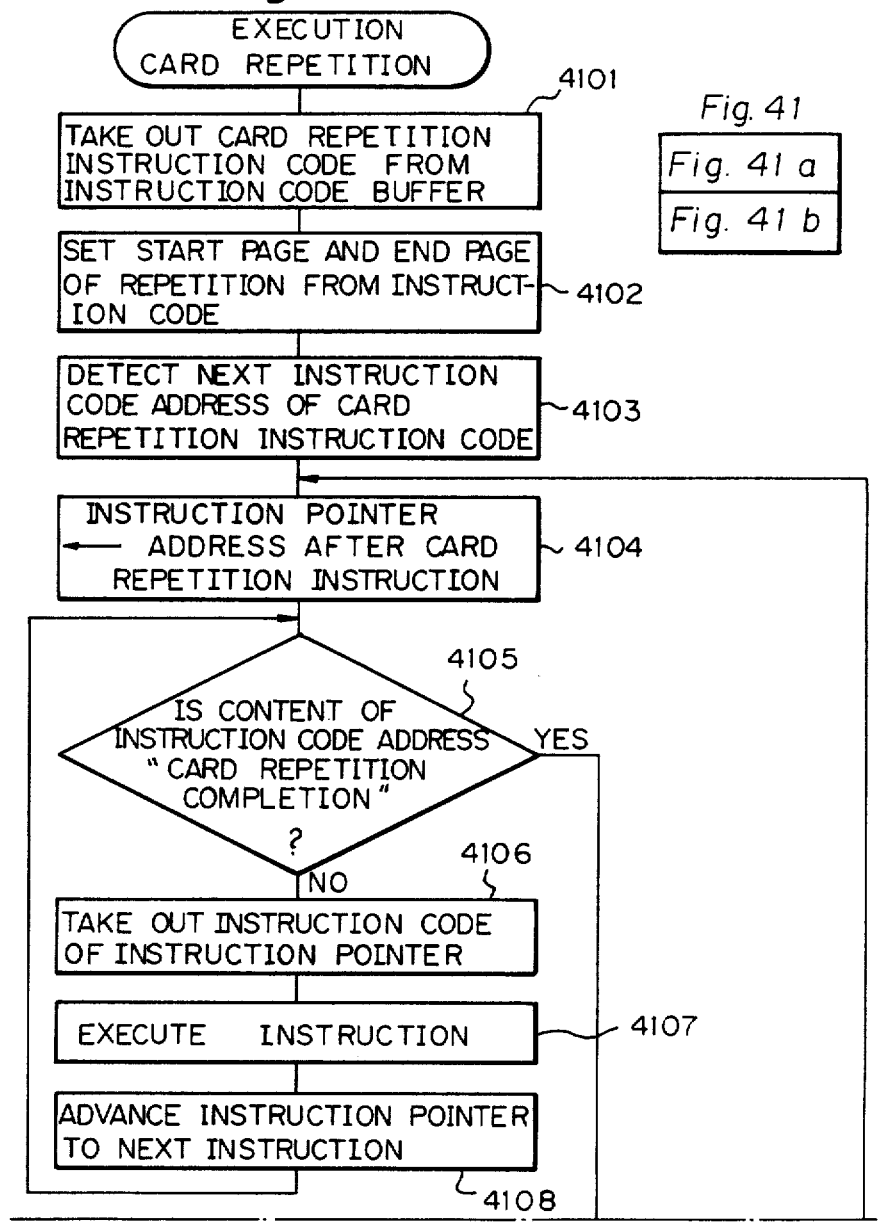
FIG. 41 including 41a and 41b, is a detailed flowchart of step 3233 of FIG. 32.
Figure 41:
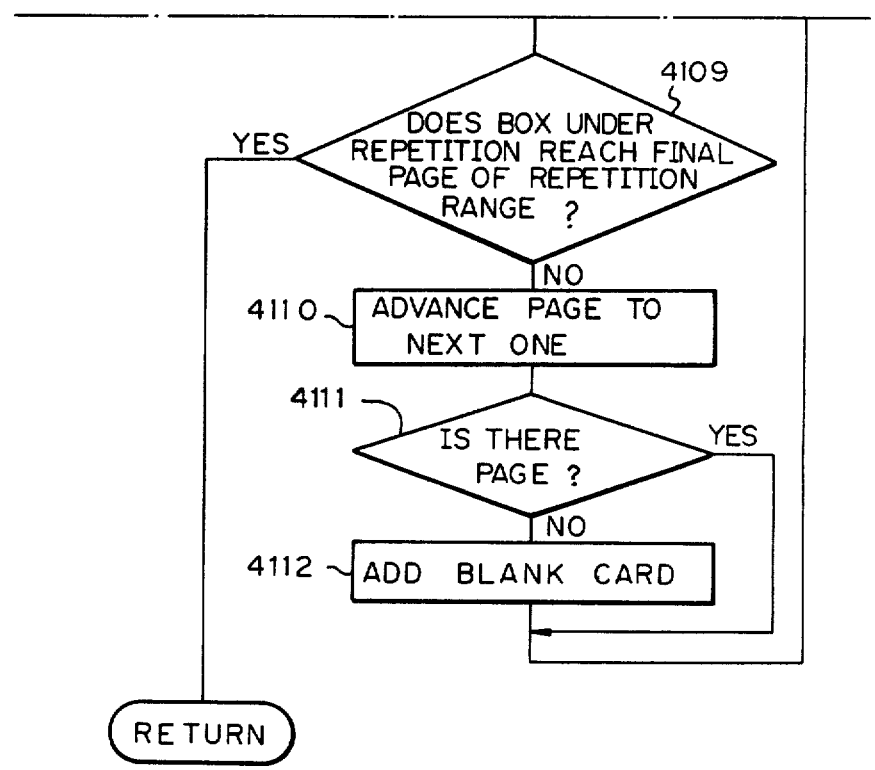

FIG. 41 is a detailed flowchart of step 3233 of FIG. 32. First, at step 4101, the card repetition instruction code is taken out from the instruction code buffer 1201. At step 4102, the repletion start page and repetition end page are loaded from the instruction code. At step 4103, the address of the instruction code after the card repetition instruction code is detected and, at step 4104, set in the pointer 1202. At steps 4105 and 4108, the instruction code designated by the pointer 1022, which counts up until the contents of the instruction code address which the pointer 1022 designates reaches "CARD REPETITION COMPLETION", is executed. In other words, the instruction code for the card of one page is executed. Later, control advances to step 4109 and it is determined whether or not the box under repetition has reached the final page of the repetition range set at step 4102. If it has not reached the final page, the next page is advanced to step 4110. In this case, if there is no page, a blank card is added at steps 4110 and 4111. Then, control returns to step 4104 and the same operation is performed. If the final page of the repetition range has been reached at step 4109, the routine is completed.

Figure 42:
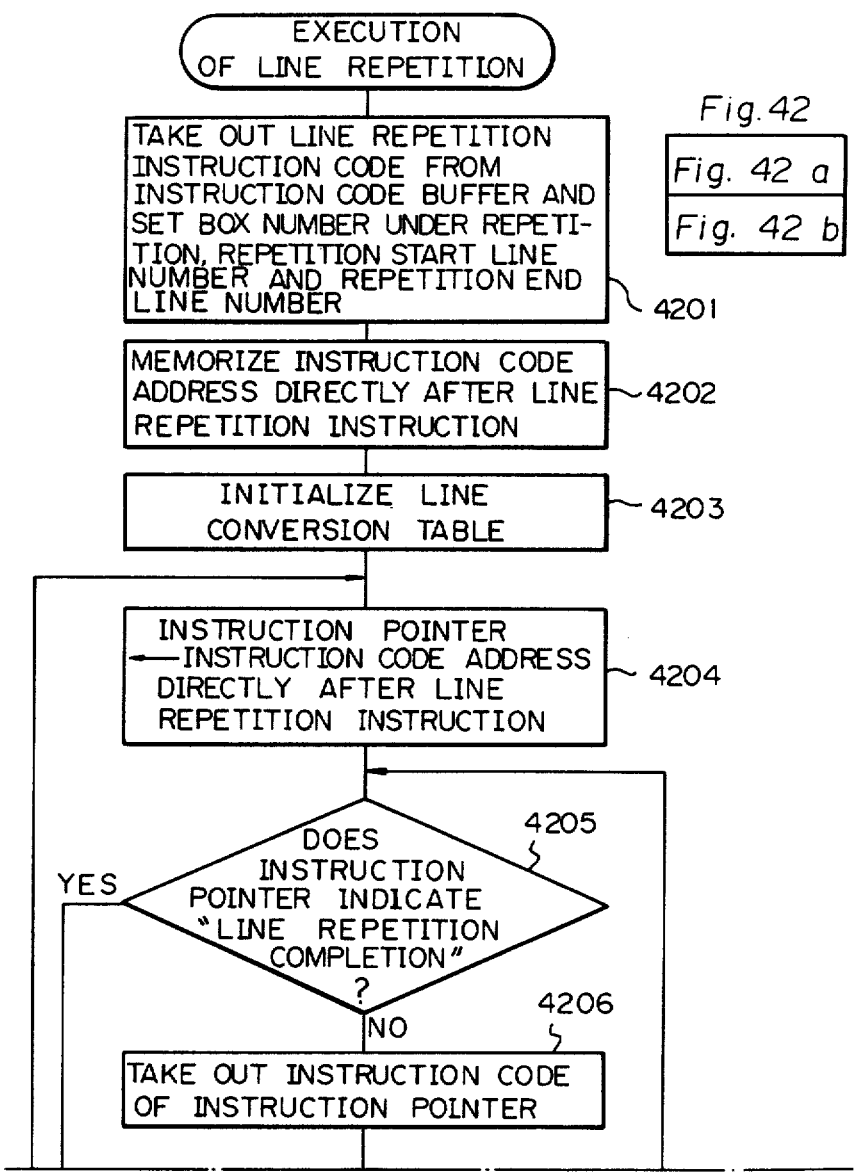
FIG. 42 including 42a and 42b, is a detailed flowchart of step 3235 of FIG. 32.
Figure 42:
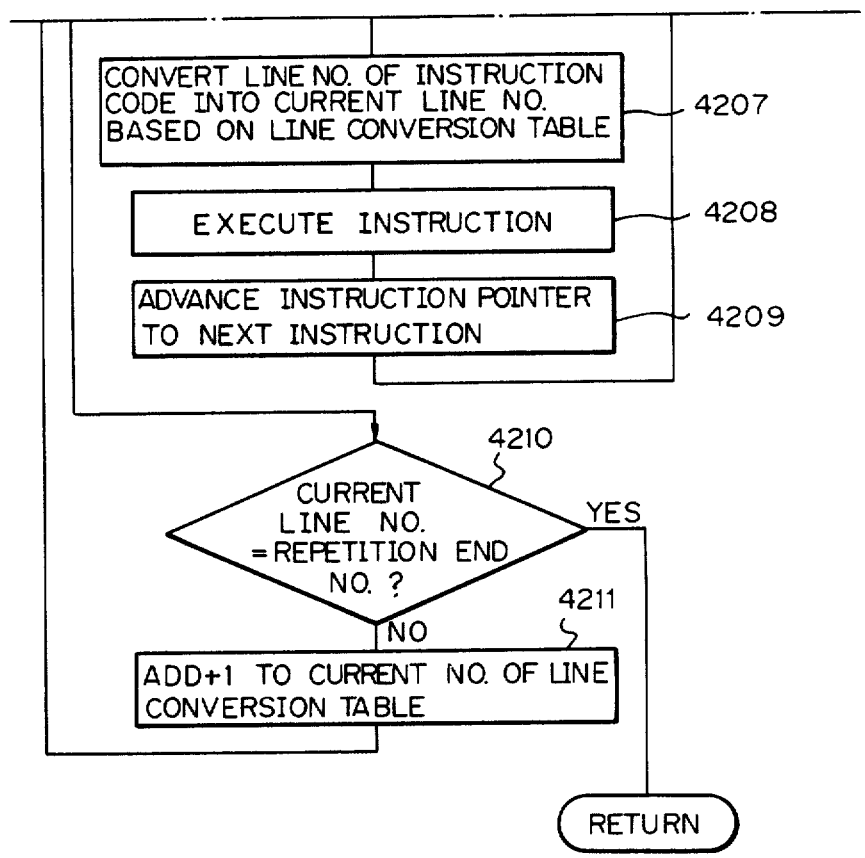

FIG. 42 is a detailed flowchart of step 3235 of FIG. 32. First, at step 4201, the line repetition instruction code is taken out from the instruction code buffer 1201 and the box number under repetition, repetition start line number, and repetition end line number are loaded. Next, at step 4202, the instruction code address directly after the line repetition instruction is memorized. At step 4203, the above-mentioned line conversion table is initialized. In other words, a comparison is prepared between the repetition start line number in the instruction code and the current repetition start line number. At step 4204, the final instruction code address of the line repetition instruction is set in the pointer 1202. At steps 4205 to 4209, the instruction code designated by the pointer 1202, which counts up until the contents of the instruction code designated by the pointer 1202 reaches "LINE REPETITION COMPLETION" is executed. In other words, an instruction code for a card of one page is executed. This corresponds to steps 4105 to 4108 of the card repetition execution routine, but differs in that at step 4207, the line number in the instruction code is converted to the current line number based on the line conversion table.

When the contents designated by the pointer 1202 reach "LINE REPETITION COMPLETION" at step 4204, control advances from step 4205 to step 4210. At step 4210, it is determined whether or not the current line number has reached the repetition end number. If the result of determination at step 4210 is negative, control returns to step 4204. If positive, the routine is completed.

The step 3237 of the execution of conditional branching of FIG. 32 is performed by judging whether or not conditions are satisfied. If the result is that the conditions are satisfied, the instructions until "CONDITIONAL BRANCHING COMPLETION" are executed. On the other hand, if the conditions are not satisfied, the instructions until "CONDITIONAL BRANCHING COMPLETION" are not executed and the pointer 1202 jumps to the next address after "CONDITIONAL BRANCHING COMPLETION".

Figure 43:
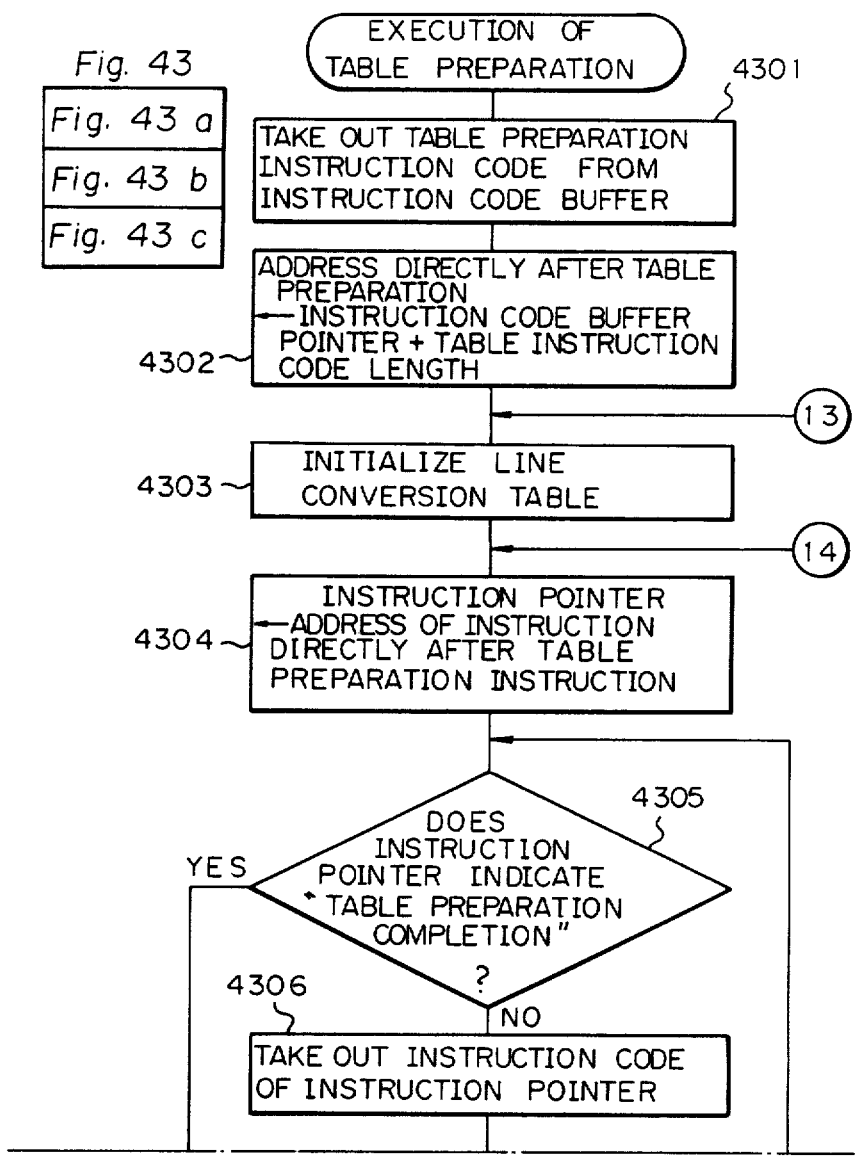
FIG. 43 including 43a–43c, is a detailed flowchart of step 3239 of FIG. 32.
Figure 43:
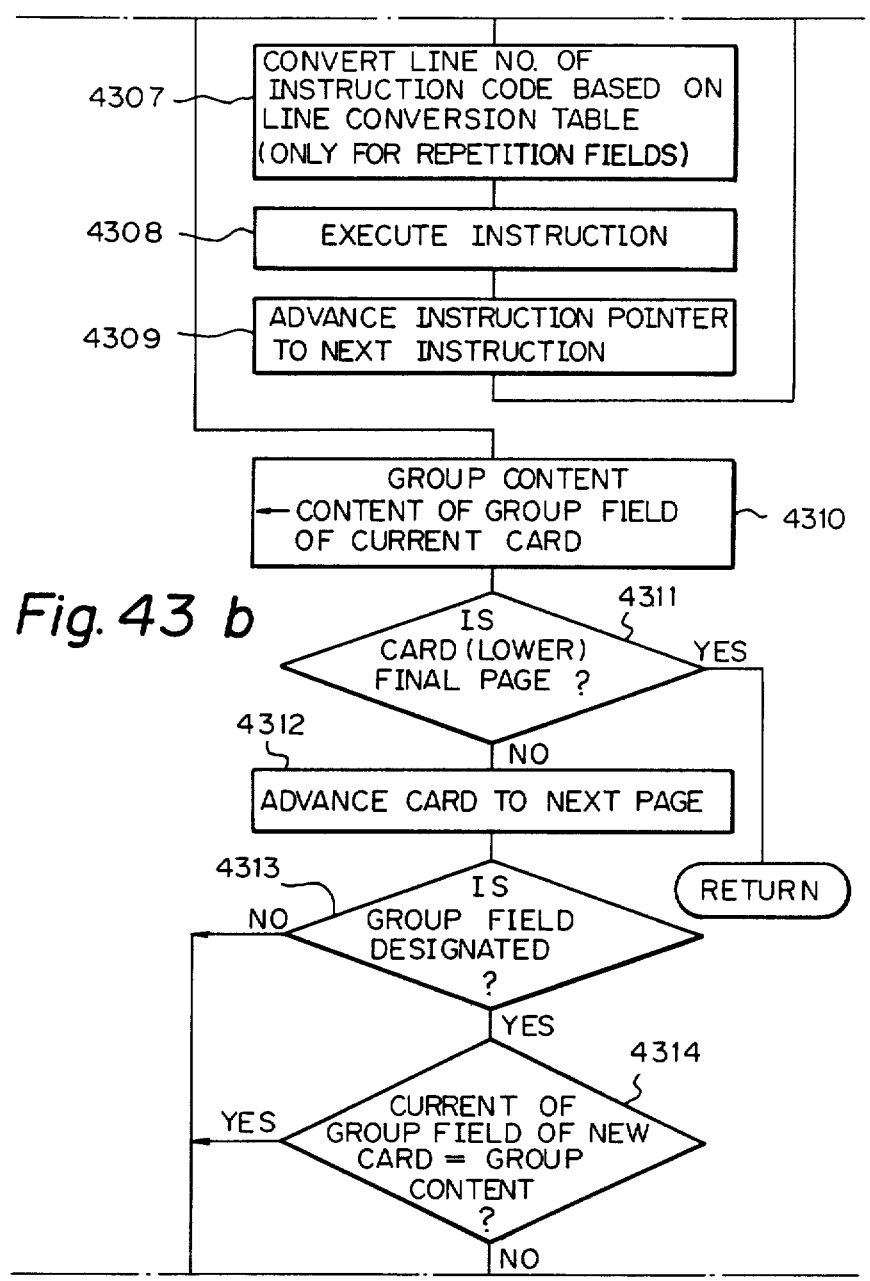
Figure 43:
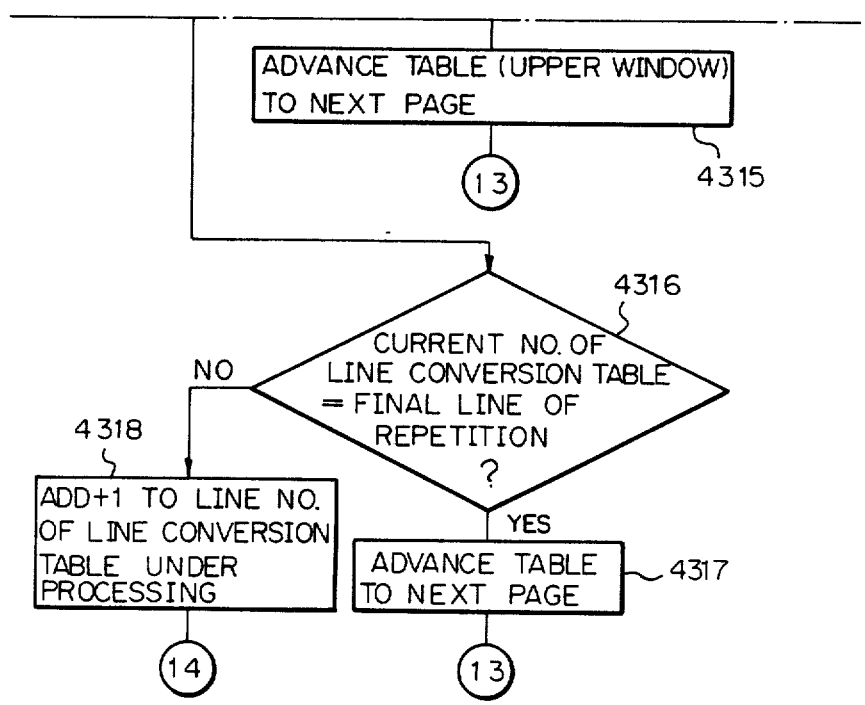

FIG. 43 is a detailed flowchart of step 3239 of FIG. 32. First, at step 4301, the table preparation instruction code is taken out from the instruction code buffer 1201. At step 4302, the address directly after the table preparation is calculated from the address of the pointer 1202 + the code length of the table instruction. At step 4303, the line conversion table is initialized. At step 4304, the address directly after the table preparation instruction is set in the pointer 1202. Steps 4305 to 4309 are the same as steps 4205 to 4209 of FIG. 42, except that step 4307 is effected only for repetition fields.

At step 4305, when the pointer 1202 indicates "TABLE PREPARATION COMPLETION", at step 4310, the contents of the group field of the current card is made the group content. At step 4311, it is determined whether or not the card of the lower window is the final page. If not the final page, the card is advanced to a new card of the next page at step 4312.

If the contents of the group field of the new card are different from the prior group contents, control advances through steps 4313 and 4314 to step 4315, the front card of the upper window is advanced to the next card, and control returns to step 4303. On the other hand, when there is no group designated field in the new card or when the group designated card of the new card is the same as the previous card, control advances to step 4316.

At step 4316, it is determined whether or not the current line number of the line conversion table is the final line of the repetition. If the result of determination at step 4316 is positive, the front card of the upper window is advanced to the next page at step 4317 and control returns to step 4303. Conversely, if negative, control advances to step 4318 and the line number currently under processing in the line conversion table is increased by one.

Data written in a card is often of the same type repeated on line units, even on a single card. If it is possible, for sections wherein the arrangement of fields of the same attributes are repeated in line units, to just give form instructions for one line and thus be able to determine the form for all the repetition lines in the processing apparatus and to have the processing of data by the above-mentioned processing instructions also effected in consideration of the repetition lines, it would be extremely convenient in that it would enable high speed data processing of card images based on the minimum necessary input. It is possible for this purpose to construct the device to detect the start line/end line of table repetition fields of the same attributes by line units, store the results of this detection in the field repetition line table, and perform the data processing for the fields included in said table all in one.

As explained above, according to the present invention, a series of processing instructions is entered while being displayed on the display unit. Therefore, it is possible to execute common processing for various card images at a high speed.

What we claim is:

1. A card image data processing system wherein a plurality of card images are recognized as related and designated as a file, said card images are defined by card image form data defining the image of the cards in a file and a record including card data written in fields defined by field definition information for said form data said field definition information designating information fields within a record, and said fields are designated for processing the contents of said fields in said records, said system comprising:
   a display unit;
   an instruction code buffer;
   processing instruction preparation means for displaying said card images, including said form data, in a first window of said display unit, for designating fields of said displayed card image of said record in the file, producing processing instructions for said card data of said record displaying said processing instructions in an instruction window designated in said display unit and storing the processing instructions in said instruction code buffer, for displaying on said display unit a plurality of card image records belonging to different files simultaneously in instruction windows of said display unit and preparing and storing processing instructions for fields of the records of each of said displayed plurality of card images, and for producing processing instructions for processing of the fields of each of a plurality of records for card images belonging to the file and displaying the field names as instruction operands of said records for said card images when displaying said processing instructions in the instruction window of said display unit;
   processing instruction execution means for executing processing of the card data of said records based on said processing instructions;
   field cursor display means for displaying a field cursor on said display unit for indicating a field position in said records for said card images; and
   instruction cursor display means for displaying an instruction cursor on said display unit for indicating processing of an instruction in said instruction window.

2. A card image data processing system according to claim 1, wherein:
   said processing instruction preparation means comprises registration means for registering or storing calculation equations for designating calculations to be performed on the fields of said records for said card images; and
   said processing instruction execution means comprises execution means for executing calculation equation processing for the fields of said records for said card images based on display contents of said display unit and in accordance with said registered calculation equations.

3. A card image data processing system according to claim 1, said system further comprising:
   a keyboard having keys; and
   processing instruction selection control means for selecting one of a plurality of processing instructions prepared in advance based on a key input from said keyboard, said processing instruction selection control means comprising buffering means for buffering said key input, and said processing instruction being selected based on input key information from said buffering means.

4. A card image data processing system according to claim 1, further comprising:
   a keyboard having keys; and
   processing instructions selection control means for selecting one of a plurality of processing instructions prepared in advance based on key input from said keyboard, said instruction selection control means comprising:
   a memory storing a valid instruction processing table listing processing instructions that can be selected and executed and listing processing instructions that cannot be selected and executed in various states of said system; and
   menu display means for menu-displaying processing instructions from said instruction processing table that can be selected and executed, and for menu displaying processing instructions from said instruction processing table that can not selected and executed.

5. A card image data processing system according to claim 1, where files of records are processed and further comprises a main memory; and wherein:
   said processing instruction preparation means comprises registration means for registering card retrieval processing instructions as record retrieval conditions based on display contents of said display unit; and
   said processing instruction execution means comprises execution means for retrieving individual records from files loaded in said main memory based on said registered card retrieval processing instructions and storing record numbers corresponding to records meeting said card retrieval conditions into said main memory.

6. A card image data processing system according to claim 1, where the records include lines and said system further comprises a keyboard; and wherein:
   said processing instruction preparation means comprises preparation means for registering line retrieval processing instructions as line retrieval conditions based on a plurality of display contents of said display unit; and
   said processing instruction execution means comprises execution means for retrieving contents of fields of one of said plurality of display contents in accordance with said registered line retrieval processing instructions or contents of fields of other display contents based on contents input by said keyboard, for deriving a correspondence between field contents, and for updating line number designations of said processing instructions based on said correspondence results.

7. A card image data processing system according to claim 1, wherein:
   said processing instruction preparation means comprises registration means for designating field contents in one record for one card image of a plurality of card images displayed on said display unit and registering, as processing instructions, card inquiry conditions for retrieving records with fields having the same contents as said field contents on the one card image; and
   said processing instruction execution means comprises execution means for records for card images from the file in accordance with said registered card inquiry conditions.

8. A card image data processing system according to claim 1, wherein:

the records include lines of data;

said processing instruction preparation means comprises registration means for registering, as processing instructions, line repetition conditions for repeating predetermined processing instructions on a plurality of records; and said processing instruction execution means comprises execution means for designating beginning positions of liens covered by the repeated processing instruction execution for each processing execution on the records in accordance with said registered card repetition conditions.

9. A card image data processing system according to claim 1, wherein:

the records include lines of data;

said processing instruction preparation means comprises registration means for registering, as processing instructions with line numbers, line repetition conditions designating the repeating of predetermined processing instructions over a plurality of lines of the record; and said processing instruction execution means comprises execution means for executing an update of line numbers of said processing instructions in accordance with said registered card repetition conditions.

10. A card image data processing system according to claim 1; wherein:

said processing instruction registration means comprises registration means for registering, as processing instructions, conditional branching conditions for executing predetermined processing instructions only where predetermined conditions are satisfied; and said processing instruction execution means comprises execution means for executing said predetermined processing instructions when said registered conditional branching conditions are satisfied.

11. A card image data processing system according to claim 1, wherein:

said processing instruction preparation means comprises registration means for registering, as processing instructions, table preparation commands for preparing, as a table, a correspondence between field contents in records belonging to the file for a plurality of records of the file, the processing instructions having line numbers; and said processing instruction execution means comprises execution means for continuously updating the line numbers of said processing instructions in accordance with said registered table preparation commands and executing copying of correspondence of field contents of said plurality of records on the display of table card images belonging to another file.

12. A card image data processing system according to claim 1, wherein:

said processing instruction preparation means comprises registration means for storing, as processing instructions, table preparation commands for preparing, as a table, a correspondence of field contents in records belonging to the same file for a plurality of records of said file and for dividing said table in accordance with the commands, the processing instructions having line numbers; and said processing instruction execution means comprises execution means for continuously updating the line numbers of said processing instructions in accordance with said registered table preparation commands and executing copying of correspondence of field contents of said plurality of records on the display of table card images belonging to another file.

13. A card image data processing system according to claim 1, further comprising means for setting an interim result display mode for successively displaying processing results, due to execution of said registered processing instructions, on said display unit after completion of processing of a related group of said processing instructions during a preset continuous execution display mode.

14. A card image data processing system according to claim 1, further comprising means for setting a no interim result display mode for displaying processing results, due to execution of said registered processing instructions, on said display unit after completion of execution of all of said processing instructions during a preset continuous execution display mode.

15. A card image data processing system according to claim 1, further comprising means for setting a single step display mode for displaying processing results, due to execution of said registered processing instructions, on said display unit with each completion of execution of one of said processing instructions during a preset processing unit execution display mode, and for temporarily stopping execution of processing with each completion of execution of each processing unit, and, upon key input, for beginning execution of the next processing unit.

16. A card image data processing system according to claim 1, further comprising:

first means for setting an interim result display mode for successively displaying processing results, due to execution of said registered processing instructions, on said display unit after completion of processing a related group of said processing instructions during a preset continuous execution display mode;

second means for setting a no interim result display mode for displaying processing results, due to execution of said registered processing instructions, on said display unit after completion of execution of all of said processing instructions during a preset continuous execution display mode;

third means for setting a single step display mode for displaying processing results, due to execution of said registered processing instructions, on said display unit with each completion of execution of one of said processing instructions during a preset processing unit execution display mode, and for temporarily stopping execution of processing with each completion of execution of each processing unit, and, upon key input, for beginning execution of the next processing unit; and selection means for selecting one of said first, second and third means.

17. A card image data processing system according to claim 5, further comprising means for outputting results of execution of card image retrieval of processing in said files and/or between said files by linking record numbers corresponding to said card images.

18. A card image data processing system according to claim 7, further comprising means for outputting results of execution of card image retrieval processing in said files and/or between said files by linking record numbers corresponding to said card images.

19. A card image processing system, comprising:
a display having a card image display portion displaying an image of a record including fields with field names and having an instruction window display portion; and
processing means for processing the records, said processing means including:
field designation means for designating fields for combination using a cursor positioned on the field to be combined;
combination designation means for designating the function used for the combination; and
display means for displaying the field names and function in the instruction window display portion; and
said processing means combining the fields in accordance with the field names and the function.

* * * * *

UNITED STATES PATENT AND TRADEMARK OFFICE
CERTIFICATE OF CORRECTION

PATENT NO. : 4,835,735

DATED : May 30, 1989

INVENTOR(S) : Ikegami et al.

It is certified that error appears in the above-identified patent and that said Letters Patent is hereby corrected as shown below:

ON THE TITLE PAGE:

[56] first 3 references not cited

[57] Line 5, after "is" insert --part--.

Col. 1, line 33, "in" should be --on--.

Col. 3, line 11, "39" should be --39,--;

line 13, "40" should be --40,--;

line 15, "41" should be --41,--;

line 17, "42" should be --42,--;

line 19, "43" should be --43,--;

line 25, after "invention," insert --information--.

Col. 4, line 53, "gfield" should be --field--.

Col. 5, line 55, "gthe" should be --the--.

Col. 11, line 60, "if" should be --If--.

Col. 15, line 51, after "execution" insert --key--.

Col. 16, line 10, after "of" (second occurrence) insert --a--.

UNITED STATES PATENT AND TRADEMARK OFFICE
CERTIFICATE OF CORRECTION

PATENT NO. : 4,835,735

DATED : May 30, 1989

INVENTOR(S) : Ikegami et al.

It is certified that error appears in the above-identified patent and that said Letters Patent is hereby corrected as shown below:

Col. 19, line 13, "conditoin" should be --condition--.

Col. 26, line 18, "can not" should be --cannot--.

Col. 27, line 9, "liens" should be --lines--.

Signed and Sealed this

Nineteenth Day of March, 1991

Attest:

HARRY F. MANBECK, JR.

*Attesting Officer*  *Commissioner of Patents and Trademarks*